(12) United States Patent
Nishimoto et al.

(10) Patent No.: US 11,018,509 B2
(45) Date of Patent: May 25, 2021

(54) POWER TRANSMISSION SYSTEM CAPABLE OF SYNCHRONIZING POWER TRANSMITTER APPARATUS HAVING MULTIPLE OPERATION MODES, WITH POWER RECEIVER APPARATUS HAVING MULTIPLE OPERATION

(71) Applicant: PANASONIC INTELLECTUAL PROPERTY MANAGEMENT CO., LTD., Osaka (JP)

(72) Inventors: Taiki Nishimoto, Osaka (JP); Masahiro Yamaoka, Osaka (JP); Atsushi Yamamoto, Kyoto (JP); Motohiko Fujimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 97 days.

(21) Appl. No.: 16/490,491

(22) PCT Filed: Feb. 26, 2018

(86) PCT No.: PCT/JP2018/007025
§ 371 (c)(1),
(2) Date: Aug. 30, 2019

(87) PCT Pub. No.: WO2018/159553
PCT Pub. Date: Sep. 7, 2018

(65) Prior Publication Data
US 2020/0014214 A1 Jan. 9, 2020

(30) Foreign Application Priority Data
Mar. 3, 2017 (JP) .............................. JP2017-040602

(51) Int. Cl.
*H02J 3/00* (2006.01)
*H02J 4/00* (2006.01)

(52) U.S. Cl.
CPC ..................................... *H02J 4/00* (2013.01)

(58) Field of Classification Search
CPC ......................................................... H02J 4/00
(Continued)

(56) References Cited

U.S. PATENT DOCUMENTS

2002/0171374 A1 11/2002 Yasui et al.
2012/0173035 A1 7/2012 Abe
(Continued)

FOREIGN PATENT DOCUMENTS

JP 03-235671 A 10/1991
JP 2002-110337 A 4/2002
(Continued)

OTHER PUBLICATIONS

English translation of International Preliminary Report on Patentability issued in International Patent Application No. PCT/JP2018/007025; dated Sep. 12, 2019.
(Continued)

*Primary Examiner* — Rexford N Barnie
*Assistant Examiner* — Dru Parries
(74) *Attorney, Agent, or Firm* — McDermott Will and Emery LLP

(57) ABSTRACT

A current meter measures a current value associated with input power inputted to a code modulator. A code modulation circuit modulates the input power to generate a code-modulated wave by code modulation using a modulation code based on a code sequence, and transmits the code-modulated wave to the code demodulator via a transmission path. A control circuit controls the code modulation circuit. The code modulation circuit has operation modes different (Continued)

from each other depending on a direction of the input power, and a direction of the code-modulated wave to be generated. The control circuit generates waveform information indicating variations of direction of the input power over time, based on the current value measured by the current meter, and determines the operation mode of the code modulation circuit based on the waveform information.

17 Claims, 30 Drawing Sheets

(58) Field of Classification Search
 USPC .......................................................... 307/31
 See application file for complete search history.

(56) References Cited

U.S. PATENT DOCUMENTS

2012/0185708 A1    7/2012  Rekimoto et al.
2013/0226484 A1    8/2013  Rouvala et al.

FOREIGN PATENT DOCUMENTS

JP    2011-091954 A    5/2011
JP        5612718 B2   10/2014
JP        5612920 B2   10/2014

OTHER PUBLICATIONS

International Search Report and Written Opinion dated Mar. 27, 2018, issued in International Patent Application No. PCT/JP2018/007025; with partial English translation.

Fig.12A

THIRD IMPLEMENTATION EXAMPLE (AC→AC)

MODULATION CODE OF CODE MODULATOR 2A

| m1: | c1a | 0 |
| m2: | c1b | 0 |
| m3: | 0 | c1a |
| m4: | 0 | c1b |

DEMODULATION CODE OF CODE DEMODULATOR 4A

| d1: | c1a | 0 |
| d2: | c1b | 0 |
| d3: | 0 | c1a |
| d4: | 0 | c1b |

$$\begin{cases} c1a = [1\ 0\ 1\ 1\ 1\ 0\ 0] \\ c1b = [0\ 1\ 0\ 0\ 0\ 1\ 1] \\ m1 = [\underbrace{1\ 0\ 1\ 1\ 1\ 0\ 0}_{c1a}\ \underbrace{0\ 0\ 0\ 0\ 0\ 0\ 0}_{0}] \end{cases}$$

Fig.12B

FOURTH IMPLEMENTATION EXAMPLE (DC→DC)

MODULATION CODE OF CODE MODULATOR 2A

| m1: | c1a | c1b |
| m2: | c1b | c1a |
| m3: | 0 | 0 |
| m4: | 0 | 0 |

DEMODULATION CODE OF CODE DEMODULATOR 4A

| d1: | c1a | c1b |
| d2: | c1b | c1a |
| d3: | 0 | 0 |
| d4: | 0 | 0 |

$$\begin{cases} c1a = [1\ 0\ 1\ 1\ 1\ 0\ 0] \\ c1b = [0\ 1\ 0\ 0\ 0\ 1\ 1] \\ m1 = [\underbrace{1\ 0\ 1\ 1\ 1\ 0\ 0}_{c1a}\ \underbrace{0\ 1\ 0\ 0\ 0\ 1\ 1}_{c1b}] \end{cases}$$

POWER TRANSMISSION SYSTEM CAPABLE OF SYNCHRONIZING POWER TRANSMITTER APPARATUS HAVING MULTIPLE OPERATION MODES, WITH POWER RECEIVER APPARATUS HAVING MULTIPLE OPERATION

CROSS-REFERENCE OF RELATED APPLICATIONS

This application is the U.S. National Phase under 35 U.S.C. § 371 of International Patent Application No. PCT/JP2018/007025, filed on Feb. 26, 2018, which in turn claims the benefit of Japanese Application No. 2017-040602, filed on Mar. 3, 2017, the entire disclosures of which Applications are incorporated by reference herein.

TECHNICAL FIELD

The present disclosure relates to a power transmitter apparatus which transmits power (electric power) via a transmission path, a power receiver apparatus which receives power via a transmission path, and a power transmission system including the power transmitter apparatus and the power receiver apparatus.

BACKGROUND ART

In recent years, power supplies of renewable energy, typically photovoltaic power generation, wind power generation, and biofuel power generation, are increasingly used, as well as conventional power supplies provided by power companies, such as thermal power generation, hydropower generation, and nuclear power generation. In addition, apart from large-scale commercial power networks currently provided, local and small-scale power networks capable of achieving local production and local consumption of power have been being spread worldwide in order to reduce losses of long-distance power transmission.

In a small-scale power network, power can be supplied self-sufficiently by using a natural energy power generator, and electric load equipment capable of efficient power regeneration. This type of power network is highly promising as a power transmission system for supplying electricity to non-electrified areas, such as desert oasis and remote islands.

For example, each of Patent Documents 1 to 3 discloses a power transmission system which transmits power from a power supply to a load via a power line.

CITATION LIST

Patent Documents

PATENT DOCUMENT 1: Japanese Patent Publication No. JP 5612718 B
PATENT DOCUMENT 2: Japanese Patent Publication No. JP 5612920 B
PATENT DOCUMENT 3: Japanese Patent laid-open Publication No. JP 2011-091954 A

SUMMARY OF INVENTION

Technical Problem

In order to transmit power from a power supply to a load via a power line, a power transmission system includes: a power transmitter apparatus which transmits power supplied from the power supply via a transmission path; and a power receiver apparatus which receives the power via the transmission path and supplies the power to the load.

When transmitting power from an alternating-current power supply to an alternating-current load in a power transmission system, in some case, the phase of power of the power supply should match the phase of power of the load. In this case, it is necessary to surely synchronize the power transmitter apparatus and the power receiver apparatus with each other.

An object of the present disclosure is to solve the aforementioned problems, and to provide a power transmitter apparatus capable of surely synchronizing with a power receiver apparatus.

Solution to Problem

According an aspect of the present disclosure, a power transmitter apparatus transmits power to at least one power receiver apparatus via a transmission path. The power transmitter apparatus is provided with: a measuring device that measures a current value or voltage value associated with input power inputted to the power transmitter apparatus; a code modulation circuit that modulates the input power to generate a code-modulated wave by code modulation using a modulation code based on a code sequence, and transmits the code-modulated wave to the power receiver apparatus via the transmission path; and a control circuit that controls the code modulation circuit. The code modulation circuit has operation modes different from each other depending on a direction of the input power, and a direction of the code-modulated wave to be generated. The control circuit generates waveform information indicating variations of direction of the input power over time, based on the current value or voltage value measured by the measuring device, and determines the operation mode of the code modulation circuit based on the waveform information.

These generic and specific aspects may be implemented as a system, as a method, or as any combination of systems and methods.

Advantageous Effects of Invention

According to the aspect of the present disclosure, the power transmitter apparatus can surely synchronize with a power receiver apparatus.

BRIEF DESCRIPTION OF DRAWINGS

FIG. 12A is a diagram showing an example of a modulation code of the code modulator 2A and a demodulation code of the code demodulator 4A in the power transmission system according to the second embodiment, as a third implementation example in which alternating-current power is transmitted and received.

FIG. 12B is a diagram showing an example of a modulation code of the code modulator 2A and a demodulation code of the code demodulator 4A in the power transmission system according to the second embodiment, as a fourth implementation example in which direct-current power is transmitted and received.

DESCRIPTION OF EMBODIMENTS

Findings Underlying Present Disclosure

Figure 1:
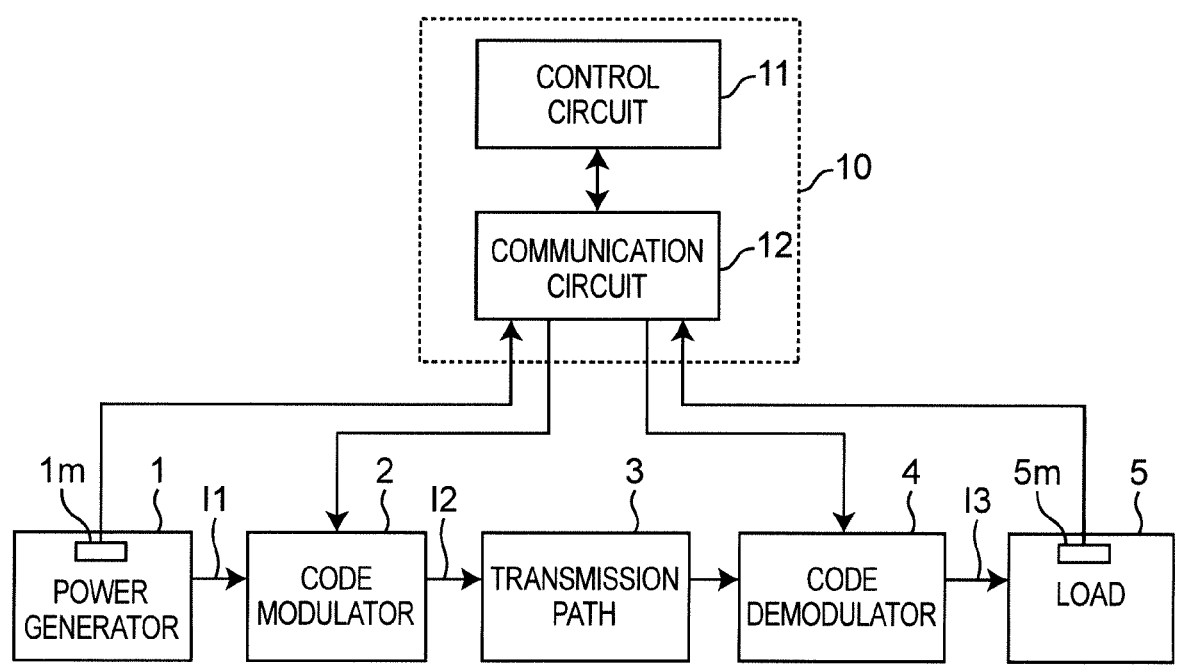
FIG. 1 is a block diagram showing a configuration of a power transmission system according to a first embodiment.

Patent Document 1 discloses an interconnection apparatus for power transmitter apparatuses, the interconnection apparatus being capable of transmitting and receiving power among a plurality of power systems. According to Patent Document 1, the interconnection apparatus is provided with a converter and an inverter. For power transmission, the converter converts transmitting power from alternating current to direct current, and the converted power is transmitted to the interconnection apparatus connected to a receiving power system. At the interconnection apparatus of the receiving power system, the inverter converts the power so as to have a desired frequency, thus providing power having an optimum frequency for the power system to which the interconnection apparatus is connected. Moreover, Patent Document 2 discloses a configuration further provided with a power storage apparatus, in addition to the components of Patent Document 1.

On the other hand, Patent Document 3 discloses a method of transmitting power from a plurality of power transmitter apparatuses to a plurality of power receiver apparatuses. According to Patent Document 3, power is transmitted from the plurality of power transmitter apparatuses to the plurality of power receiver apparatuses in a time division manner. According to Patent Document 3, control signals are wirelessly transmitted among the power transmitter apparatuses and the power receiver apparatuses in order to transmit and receive power.

However, according to Patent Documents 1 and 2, the interconnection apparatus is provided with the inverter and converter, and basically, individual power transmission cables are required for all combinations of the power systems transmitting and receiving power. According to Patent Documents 1 and 2, the interconnection apparatus may be configured so as to reduce the number of power transmission cables, however, in any case, a large number of power transmission cables are required. Thus, installation costs and the cables' material costs increase. In addition, the interconnection apparatus should be provided with the same number of pairs of the inverter and the converter as the number of the power systems to be connected. Accordingly, the cables' costs may increase, and costs may further increase due to the increased size of the interconnection apparatus.

In addition, according to Patent Document 3, it is possible to transmit and receive power among the plurality of power transmitter apparatuses and the plurality of power receiver apparatuses in a time division manner, and advantageously, it is possible to reduce the number of power transmission cables. However, in case of time-division power transmission, it is not possible to transmit and receive power among the plurality of power systems, simultaneously. In other words, it may not be possible to immediately handle a power demand from a load connected to a power receiver. Furthermore, when transmitting and receiving power among a large number of pairs of the power transmitter apparatuses and the power receiver apparatuses, only a short time is allocated for one pair of the power transmitter apparatus and the power receiver apparatus to transmit and receive power, and therefore, large pulse power is transmitted via the power transmission cable. Accordingly, the transmission cable with a high power durability is required, and thus, it may increase costs. In addition, since time intervals in which power can not be received occur, it may be required to provide the power receiver apparatuses with a buffer for large power. Furthermore, in order to transmit and receive power in a time division manner, time-synchronization is required among the plurality of power transmitter apparatuses and the plurality of power receiver apparatuses. In order to achieve such synchronization, very accurate controls among the apparatuses are required, and thus, it may increase the entire system costs.

As described above, according to both Patent Documents 1 and 2, a large number of power transmission cables are used, and therefore, it is not possible to reduce the power transmission cables by multiplexed power transmission. Further, the interconnection apparatus requires a pair of inverter and converter for each of the power transmission cables, and therefore, it is not possible to reduce the size of the interconnection apparatus. Accordingly, it is difficult to transmit and receive power among a large number of power systems. On the other hand, according to Patent Document 3, power is transmitted and received among the plurality of power transmitter apparatuses and the plurality of power receiver apparatuses via the power transmission cables in a time division manner, thus reducing the number of the power transmission cables. However, it is not possible to provide a transmission system capable of transmitting and receiving power among the plurality of power systems, simultaneously. Accordingly, there is a demand for a power transmission system with a reduced number of power transmission cables, and capable of transmitting and receiving power from a plurality of power transmitter apparatuses to a plurality of power receiver apparatuses, simultaneously, and more reliably, while reducing sizes and thicknesses of the power transmitter apparatuses and the power receiver apparatuses.

Further, as described above, when transmitting power from an alternating-current power supply to an alternating-current load, in some case, the phase of power of the power supply should match the phase of power of the load. In this case, it is necessary to surely synchronize the power transmitter apparatus and the power receiver apparatus with each other.

In addition, when an alternating-current power supply is connected to a power transmitter apparatus, the waveform of power transmitted over the transmission path depends on an operation mode of the power transmitter apparatus. Therefore, in order for a power receiver apparatus to receive the transmitted power in an appropriate manner, the power receiver apparatus should surely synchronize with the power transmitter apparatus, and an appropriate operation mode should be selected corresponding to the operation mode of the power transmitter apparatus.

Based on the above consideration, the inventors provide the following aspects of the invention.

Hereinafter, embodiments according to the present disclosure will be described with reference to the drawings. In the following embodiments, similar constituent elements are denoted by identical reference numerals.

An object of the present disclosure is to provide a power transmitter apparatus and a power receiver apparatus, capable of selecting appropriate operation modes, respectively, and capable of surely synchronizing with each other, and provide a power transmission system including such a power transmitter apparatus and a power receiver apparatus. In first to third embodiments, we describe preparatory overviews of power transmission systems. Thereafter, in fourth to eighth embodiments, we describe power transmission systems which solves the problems.

First Embodiment

FIG. 1 is a block diagram showing a configuration of a power transmission system according to the first embodiment. Referring to FIG. 1, the power transmission system according to the first embodiment is provide with a power generator 1, a code modulator 2, a transmission path 3, a code demodulator 4, a load 5, and a controller 10. The transmission path 3 is, for example, a wired transmission path including two power lines, or a wireless transmission path.

The controller 10 is provided with a control circuit 11 and a communication circuit 12. The control circuit 11 communicates with the code modulator 2 and the code demodulator 4 via the communication circuit 12, and controls operations of the code modulator 2 and the code demodulator 4.

In the power transmission system of FIG. 1, the code modulator 2 operates as a power transmitter apparatus, and the code demodulator 4 operates as a power receiver apparatus. The code modulator 2 modulates first power to generate a code-modulated wave by code modulation using a modulation code based on a code sequence, and transmits the code-modulated wave to the code demodulator 4 via the transmission path 3. The code demodulator 4 receives the code-modulated wave from the code modulator 2 via the transmission path 3, and demodulates the received code-modulated wave to generate second power by code demodulation using a demodulation code based on a code sequence identical to the code sequence of the modulation code used for the code modulation. The first power is, for example, direct-current power generated by the power generator 1, and is shown as a generated current I1 in FIG. 1. The code-modulated wave is alternating-current power modulated by code modulation, and is shown as a modulated current I2 in FIG. 1. The second power is, for example, direct-current power to be supplied to the load 5, and is shown as a demodulated current I3 in FIG. 1.

The power transmission system of FIG. 1 is further provided with power meters 1m and 5m. The power meter 1m is first power measuring means which measures an amount of the first power. More specifically, the power meter 1m measures an amount of direct-current power generated by the power generator 1 and transmitted from the power generator 1 to the code modulator 2. The power meter 1m may be provided to the power generator 1, or disposed between the power generator 1 and the code modulator 2. The power meter 5m is second power measuring means for measuring an amount of the second power. More specifically, the power meter 5m measures an amount of direct-current power transmitted from the code demodulator 4 to the load 5, and used by the load 5. The power meter 5m may be provided to the load 5, or may be disposed between the code demodulator 4 and the load 5. The amounts of powers measured by the power meters 1m and 5m are transmitted to the controller 10.

The controller 10 controls operations of the code modulator 2 and the code demodulator 4 based on the amounts of powers received from the power meters 1m and 5m. For example, the controller 10 transmits control signals to the code modulator 2 and the code demodulator 4, the control signals including synchronization signals for synchronizing the code modulator 2 and the code demodulator 4 to each other, thus achieving code modulation and code demodulation of power in an accurately synchronized manner.

The controller 10 sets a modulation code to the code modulator 2, and a demodulation code to the code demodulator 4, based on one code sequence. The code sequence of the modulation code used for modulation by the code modulator 2, and the code sequence of the demodulation code used for demodulation by the code demodulator 4 may be set in advance to the code modulator 2 and the code demodulator 4. In addition, for example, the controller 10 may transmit, as the control signals, the code sequence of the modulation code used for modulation by the code modulator 2, and the code sequence of the demodulation code used for demodulation by the code demodulator 4. Further, the controller 10 may transmit, as the control signals, only information specifying the code sequences, without transmitting the code sequences themselves, so that the code modulator 2 and the code demodulator 4 to generates the code sequences, respectively. In this case, it is possible to achieve code modulation and code demodulation between the code modulator 2 and the code demodulator 4 corresponding to each other in an accurately synchronized manner.

Figure 2:
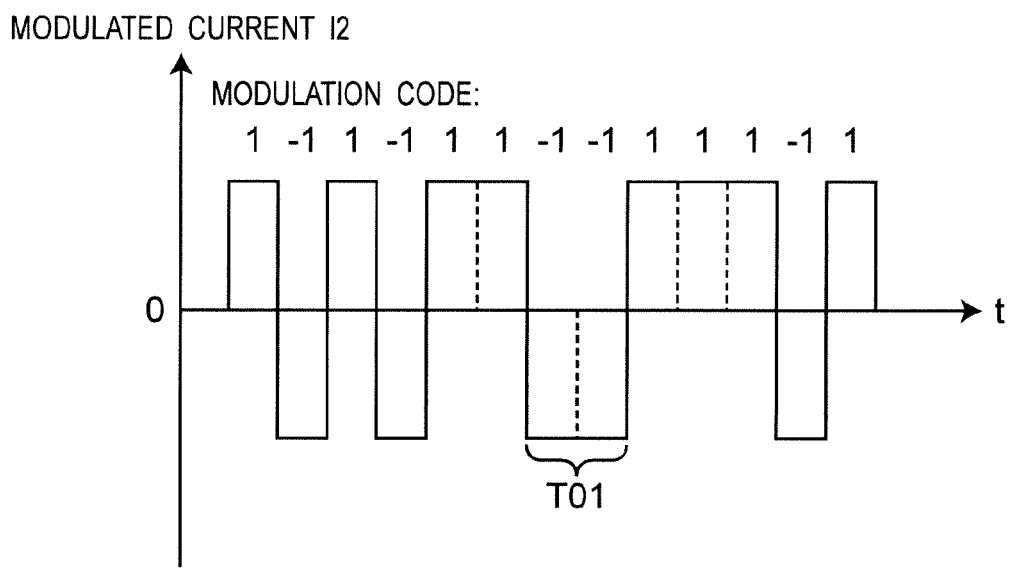
FIG. 2 is a waveform diagram showing an exemplary signal waveform of a modulated current I2 of the power transmission system of FIG. 1.

FIG. 2 is a waveform diagram showing an exemplary signal waveform of the modulated current I2 of the power transmission system of FIG. 1. In addition, FIG. 3 is a waveform diagram showing an exemplary signal waveform of a modulated current I2 of a communication system according to a comparison example.

The code modulator 2 of FIG. 1 modulates a current of power, which is generated by the power generator 1, by code modulation using a modulation code based on a predetermined code sequence. In this case, the code modulator 2 generates an alternating-current code-modulated wave made of currents flowing in directions corresponding to code values of "1" and "−1", respectively, as shown in FIG. 2. This code-modulated wave can transmit power in both periods of positive current flows, and periods of negative current flows (e.g., period T01 of FIG. 2). While the first embodiment indicates an example in which direct-current power is modulated by code modulation, alternating-current power may be modulated by code modulation as in a second embodiment described below.

Figure 3:
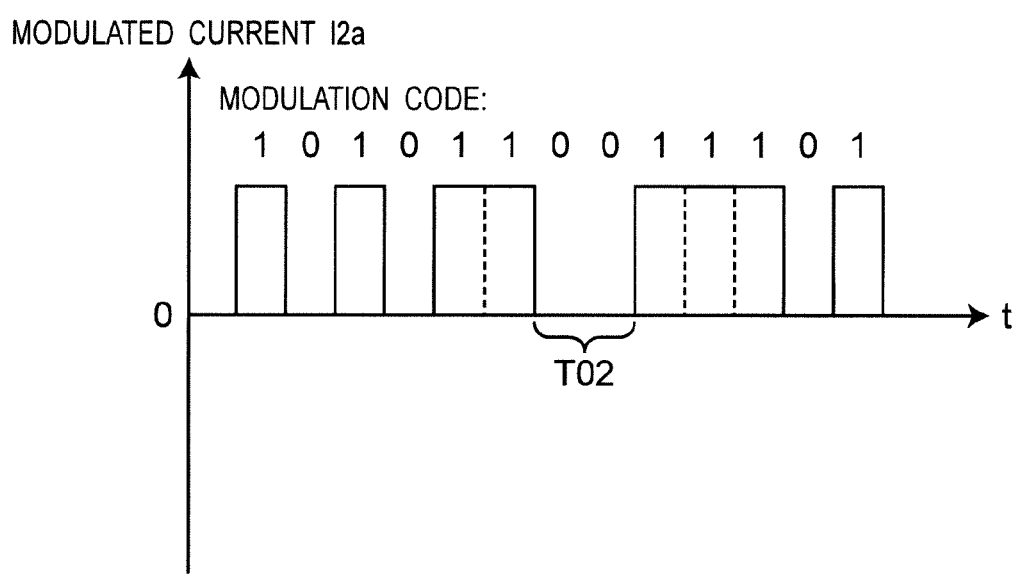
FIG. 3 is a waveform diagram showing an exemplary signal waveform of a modulated current I2 of a communication system according to a comparison example.

In the data transmission system according to the comparison example, e.g., to be used for communication, code values of "1" and "0" are typically used for code modulation, as shown in FIG. 3. However, according to the code-modulated wave as shown in FIG. 3, when the code value of the modulation code is "0" (e.g., period T02 of FIG. 3), a modulated current or voltage becomes zero, that is, a period of no power transmission occurs. Such periods of no power transmission may reduce overall power transmission efficiency. More specifically, for the case of communication, since information such as data should be transmitted in an accurately synchronized manner, it is only required that the code demodulator accurately distinguish between "0" and "1". On the other hand, for the case of power transmission, a power loss due to the period of no power transmission is not permissible from a viewpoint of efficiency in use of energy. Accordingly, by using an alternating-current code-modulated wave flowing in directions corresponding to the code values of "1" and "−1", respectively, as shown in FIG. 2, it is possible to transmit power with higher transmission efficiency than that of the comparison example.

Figure 4:
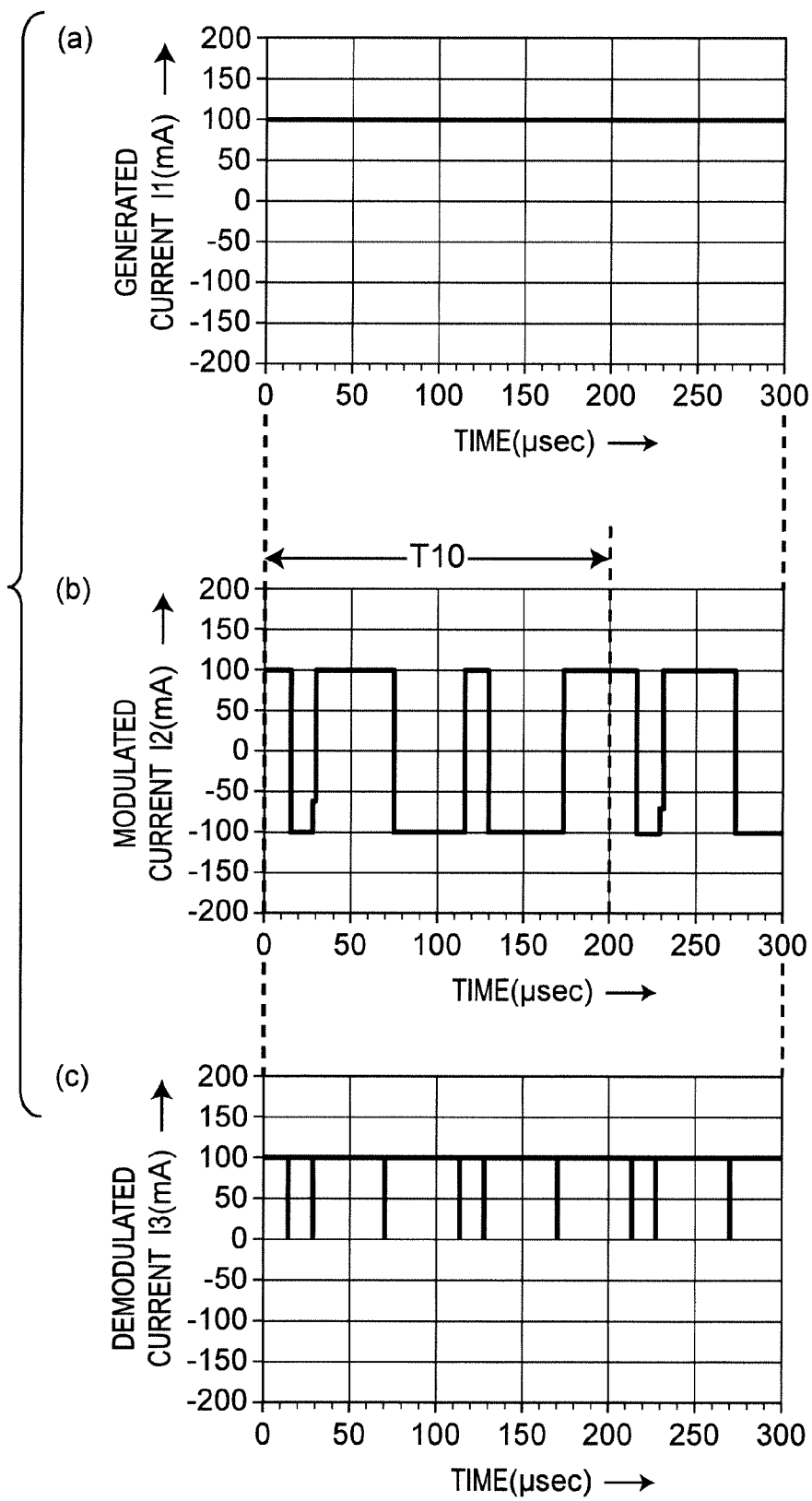
FIG. 4 is a waveform diagram showing exemplary signal waveforms in the power transmission system of FIG. 1, in which: (a) shows a signal waveform of a generated current I1; (b) shows a signal waveform of a modulated current I2; and (c) shows a signal waveform of a demodulated current I3.

FIG. 4 is a waveform diagram, where (a) to (c) show exemplary signal waveforms in the power transmission system of FIG. 1. In FIG. 4, (a) shows a signal waveform of the generated current I1, (b) shows a signal waveform of the modulated current I2, and (c) shows a signal waveform of the demodulated current I3. The power generator 1 generates the direct-current generated current I1. The code modulator 2 multiplies the generated current I1 by a modulation code m0 to generate the alternating-current modulated current I2. The code demodulator 4 multiplies the modulated current I2 by a demodulation code d0 identical to the modulation code m0 to reproduce the direct-current power generated by the power generator 1, and supply the reproduced direct-current power to the load 5.

Referring to FIG. 4, T10 indicates a period of one cycle of the modulation code m0 and the demodulation code d0. The same also applies to subsequent drawings.

According to the exemplary signal waveform of FIG. 4, the direct-current generated current I1 (FIG. 4(a)) is multiplied by the modulation code m0 having a frequency of 35 kHz, to generate the modulated current I2 (FIG. 4(b)) of the code-modulated wave. In this case, the duration of each bit of the modulation code m0 is 1/(35 kHz)/2=14.2 microseconds.

Each bit of the modulation code m0 and the demodulation code d0 has a code value "1" or "−1". The code value "1" of the modulation code m0 indicates that the code modulator 2 outputs a current in the same direction as the direction of an inputted current, and the code value "−1" of the modulation code m0 indicates that the code modulator 2 outputs a current in the direction opposite to the direction of the inputted current. Similarly, the code value "1" of the demodulation code d0 indicates that the code demodulator 4 outputs a current in the same direction as the direction of an inputted current, and the code value "−1" of the demodulation code d0 indicates that the code demodulator 4 outputs a current in the direction opposite to the direction of the inputted current.

For example, the modulation code m0 and the demodulation code d0 are given as follows.

$$m0=[1\ -1\ 1\ 1\ 1\ -1\ -1\ -1\ 1\ -1\ -1\ -1\ 1\ 1]\quad(1)$$

$$d0=m0=[1\ -1\ 1\ 1\ 1\ -1\ -1\ -1\ 1\ -1\ -1\ -1\ 1\ 1]\quad(2)$$

Subsequently, the modulated current I2 of the code-modulated wave generated by the modulation code m0 is multiplied by the demodulation code d0. This multiplication is denoted as follows.

$$m0\times d0=[1\ 1\ 1\ 1\ 1\ 1\ 1\ 1\ 1\ 1\ 1\ 1\ 1\ 1]\quad(3)$$

As apparent from Mathematical Expression (3), the demodulated current I3 (FIG. 4(c)) is obtained, which is direct current similarly to the original generated current I1.

As described above, it is possible to achieve direct-current power transmission in an accurately synchronized manner, without power loss, by using the code modulator 2 and the code demodulator 4 according to the present embodiment. In addition, it is possible to achieve efficient power transmission for a longer period, for example, by repeatedly using the modulation code m0 and demodulation code d0 as described above.

Further, the modulation code m0 can be divided into its first half code portion m0a, and its second half code portion m0b, as follows.

$$m0a=[1\ -1\ 1\ 1\ 1\ -1\ -1]\quad(4)$$

$$m0b=[-1\ 1\ -1\ -1\ -1\ 1\ 1]\quad(5)$$

In this case, the code portion m0b is generated by inverting the sign of the code value of each bit of the code portion m0a. More specifically, when the code value of a certain bit of the code portion m0a is "1", the code value of a corresponding bit of the code portion m0b is "−1". Similarly, when the code value of a certain bit of the code portion m0a is "−1", the code value of a corresponding bit of the code portion m0b is "1".

Figure 5:
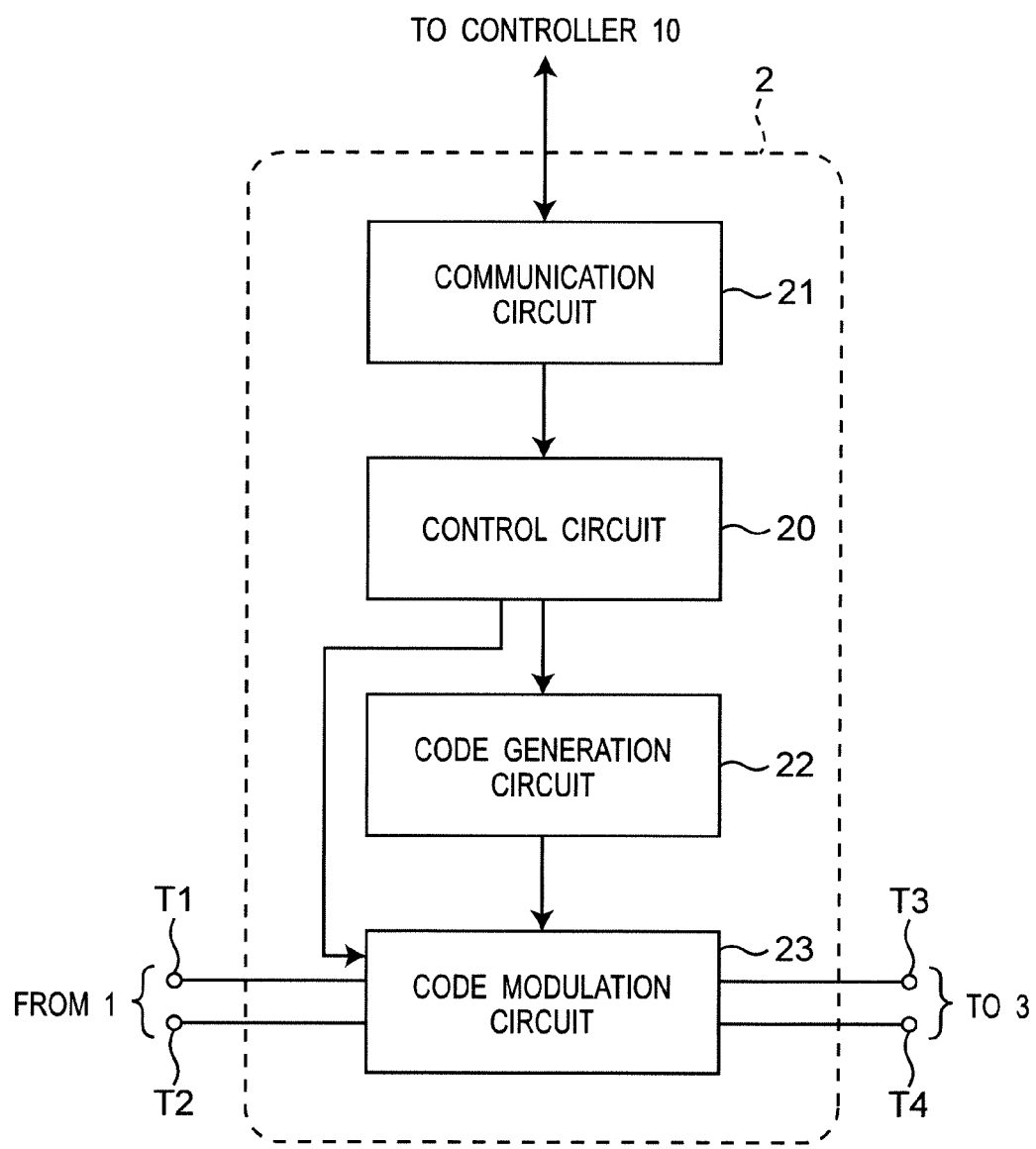
FIG. 5 is a block diagram showing a configuration of a code modulator 2 of FIG. 1.

FIG. 5 is a block diagram showing a configuration of the code modulator 2 of FIG. 1. Referring to FIG. 5, the code modulator 2 is provided with a control circuit 20, a communication circuit 21, a code generation circuit 22, and a code modulation circuit 23. The communication circuit 21 receives a synchronization signal and a control signal from the controller 10, the control signal including a code sequence itself or information specifying the code sequence, and outputs the received signals to the control circuit 20. In this case, the synchronization signal may be, for example, trigger signals to start and end modulation, or time information indicating a start time and an end time of modulation. Based on the control signal, the control circuit 20 controls the code generation circuit 22 so as to generate a modulation code based on a code sequence and output the modulation code to the code modulation circuit 23, and controls start and end of operation of the code modulation circuit 23. The code modulation circuit 23 has input ports T1 and T2 connected to the power generator 1, and output ports T3 and T4 connected to the transmission path 3.

Figure 6:
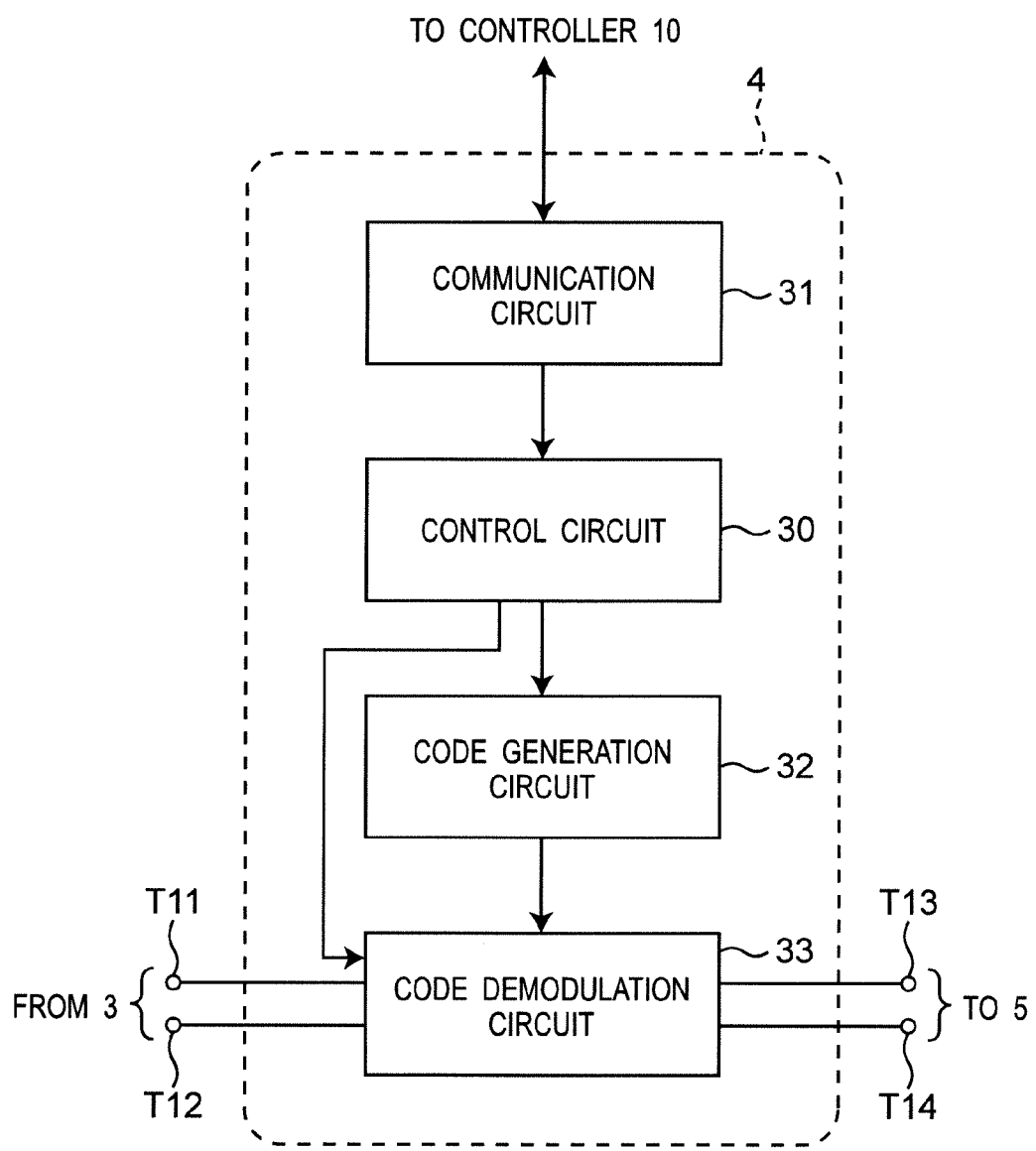
FIG. 6 is a block diagram showing a configuration of a code demodulator 4 of FIG. 1.

FIG. 6 is a block diagram showing a configuration of the code demodulator 4 of FIG. 1. Referring to FIG. 6, The code demodulator 4 is provided with a control circuit 30, a communication circuit 31, a code generation circuit 32, and a code demodulation circuit 33. The communication circuit 31 receives a synchronization signal and a control signal from the controller 10, the control signal including a code sequence itself or information specifying the code sequence, and outputs the received signals to the control circuit 30. In this case, the synchronization signal may be, for example, trigger signals to start and end demodulation, or time information indicating a start time and an end time of demodulation. Based on the control signal, the control circuit 30 controls the code generation circuit 32 so as to generate a demodulation code based on a code sequence and output the demodulation code to the code demodulation circuit 33, and controls start and end of operation of the code demodulation circuit 33. The code demodulation circuit 33 has input ports T11 and T12 connected to the transmission path 3, and output ports T13 and T14 connected to the load 5.

Note that in the power transmission system of FIG. 1, the control signals from the controller 10 to the code modulator 2 and the code demodulator 4 may be transmitted via control signal lines different from the transmission path 3, or may be transmitted via the transmission path 3 in a manner multiplexed with the code-modulated wave using some multiplexing scheme. In the latter case, it is possible to omit cables provided for communication from the controller 10 to the code modulator 2 and the code demodulator 4, and reduce cost.

Figure 7:
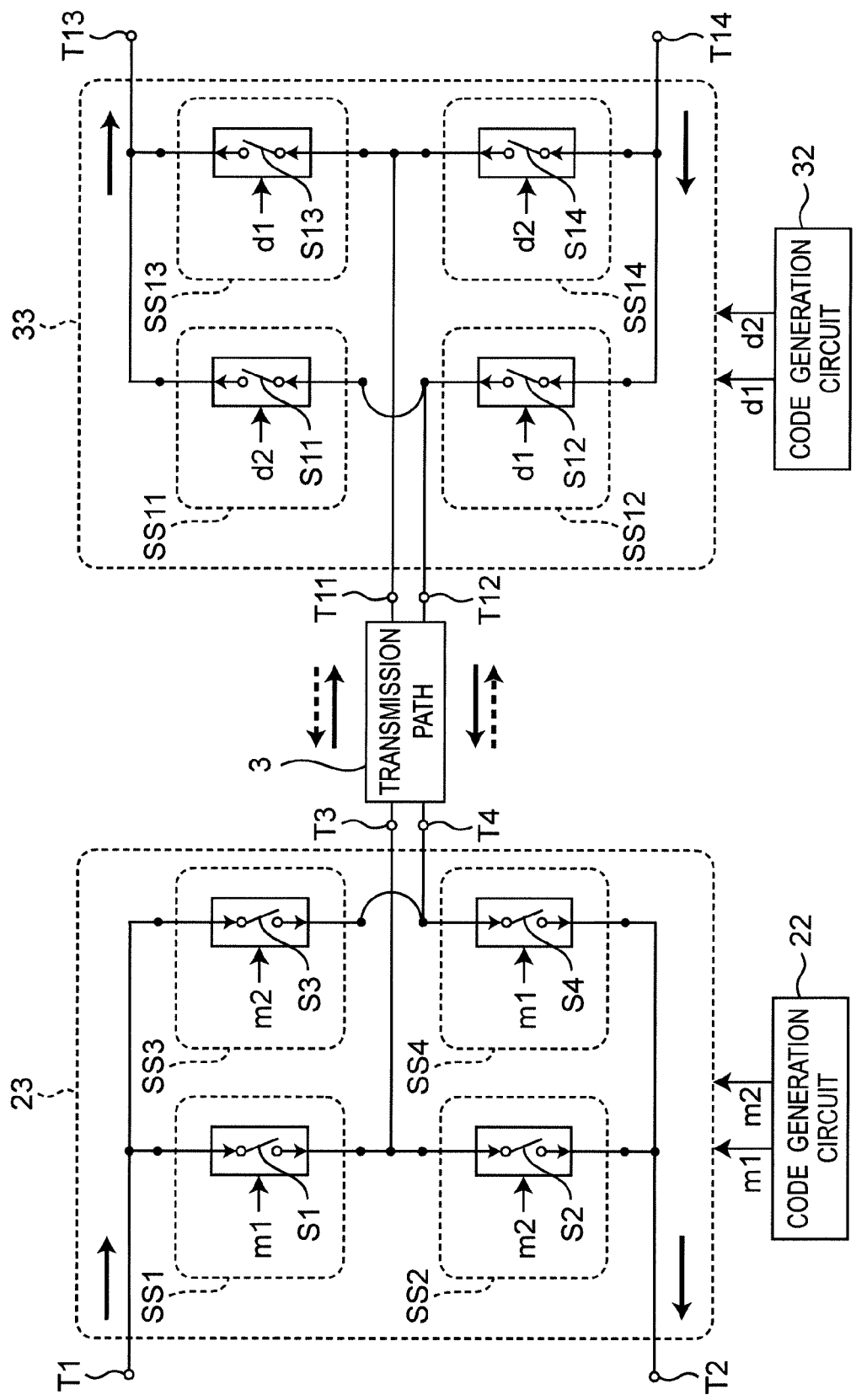
FIG. 7 is a block diagram showing configurations of a code modulation circuit 23 and a code demodulation circuit 33 of FIG. 1.

FIG. 7 is a block diagram showing configurations of the code modulation circuit 23 and the code demodulation circuit 33 of FIG. 1. Referring to FIG. 7, the code modulation circuit 23 is provided with four switch circuits SS1 to SS4 connected in a bridge configuration. The switch circuits SS1 to SS4 include unidirectional switch elements S1 to S4, respectively, each made of, for example, a metal-oxide-semiconductor (MOS) transistor. In addition, the code demodulation circuit 33 is provided with four switch circuits SS11 to SS14 connected in a bridge configuration. The switch circuits SS11 to SS14 include unidirectional switch elements S11 to S14, respectively, each made of, for example, an MOS transistor.

The code generation circuit 22 generates and outputs the modulation codes m1 and m2 to the code modulation circuit 23 under control of the control circuit 20, in order to operate the code modulator 2 according to the modulation code m0 as described above. The switch elements S1 and S4 of the code modulation circuit 23 are controlled according to the modulation code m1, and the switch elements S2 and S3 of the code modulation circuit 23 are controlled according to the modulation code m2. Each of the modulation codes m1 and m2 has code values "1" and "0". For example, when a signal of the code value "1" is inputted to each of the switch elements S1 to S4, each of the switch elements S1 to S4 is turned on. When a signal of the code value "0" is inputted to each of the switch elements S1 to S4, each of the switch elements S1 to S4 is turned off. Note that switch elements other than the switch elements S1 to S4 described in the present description operate in a similar manner. In this case, the switch elements S1 to S4 have directionality as follows. When the switch element S1 is turned on, the switch element S1 outputs a generated current inputted from the port T1, to the port T3. When the switch element S3 is turned on, the switch element S3 outputs a generated current inputted from the port T1, to the port T4. When the switch element S2 is turned on, the switch element S2 outputs a modulated current inputted from the port T3, to the port T2. When the switch element S4 is turned on, the switch element S4 outputs a modulated current inputted from the port T4, to the port T2.

The code generation circuit 32 generates and outputs the demodulation codes d1 and d2 to the code demodulation circuit 33 under control of the control circuit 30, in order to operate the code demodulator 4 according to the demodulation code d0 as described above. The switch elements S11 and S14 of the code demodulation circuit 33 are controlled according to the demodulation code d2, and the switch elements S12 and S13 of the code demodulation circuit 33 are controlled according to the demodulation code d1. Each of the demodulation codes d1 and d2 has code values "1" and "0". In this case, the switch elements S11 to S14 have directionality as described below. When the switch element S11 is turned on, the switch element S11 outputs a modulated current inputted from the port T12, to the port T13. When the switch element S13 is turned on, the switch element S13 outputs a modulated current inputted from the port T11, to the port T13. When the switch element S12 is turned on, the switch element S12 outputs a demodulated current inputted from the port T14, to the port T12. When the switch element S14 is turned on, the switch element S14 outputs a demodulated current inputted from the port T14, to the port T11.

In the notation of FIG. 7, directions of current flows in the switch elements S11 to S14 of the code demodulator 4 are opposite to directions of current flows in the switch elements S1 to S4 of the code modulator 2.

Figure 8A:
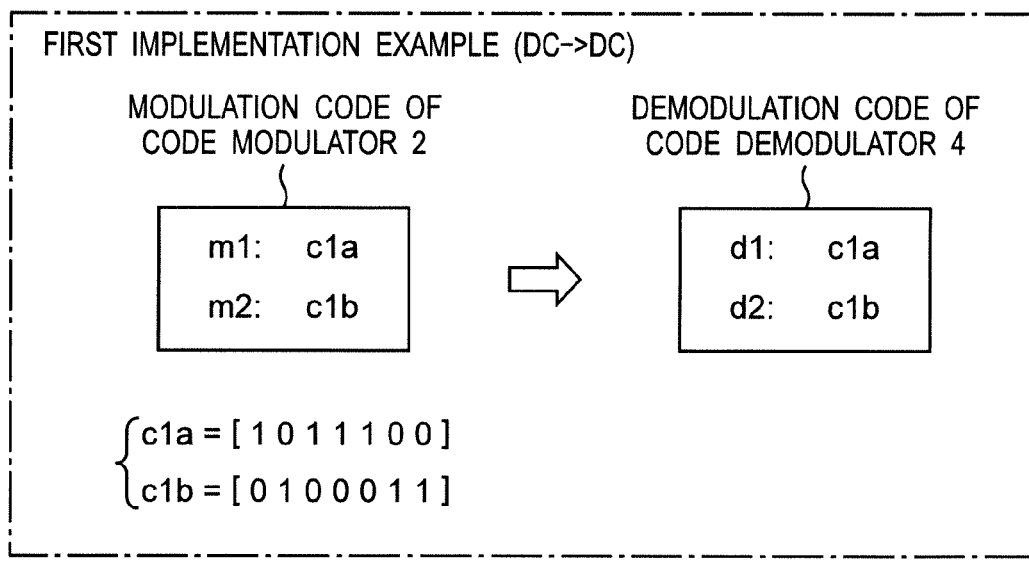
FIG. 8A is a diagram showing an example of a modulation code of the code modulator 2 and a demodulation code of the code demodulator 4 in the power transmission system of FIG. 1, as a first implementation example in which direct-current power is transmitted and received.

FIG. 8A is a diagram showing an example of a modulation code of the code modulator 2 and a demodulation code of the code demodulator 4 in the power transmission system of FIG. 1, as a first implementation example in which direct-current power is transmitted and received. More specifically, FIG. 8A shows an example of the modulation codes m1 and m2 inputted to the switch elements S1 to S4 of the code modulator 2, and the demodulation codes d1 and d2 inputted to the switch elements S11 to S14 of the code demodulator 4.

As shown in FIG. 8A, the modulation code m1 and the demodulation code d1 are identical to each other, and each is made of a code sequence $c1a$. In addition, the modulation code m2 and the demodulation code d2 are identical to each other, and each is made of a code sequence $c1b$. In addition, the code sequences $c1a$ and $c1b$ are configured such that when the code value of a certain bit of the code sequence $c1a$ is "1", the code value of a corresponding bit of the code sequence $c1b$ is "0"; and when the code value of a certain bit of the code sequence $c1a$ is "0", the code value of a corresponding bit of the code sequence $c1b$ is "1".

Accordingly, among the switch elements S1 to S4 and S11 to S14 of FIG. 7, when a switch element receiving the code value of a certain bit of the code sequence $c1a$ is turned on, the switch element receiving the code value of a corresponding bit of the code sequence $c1b$ is turned off. In addition, when the switch element receiving the code value of a certain bit of the code sequence $c1a$ is turned off, the switch element receiving the code value of a corresponding bit of the code sequence $c1b$ is turned on.

According to the code modulation circuit 23 of FIG. 7, when the switch elements S1 and S4 are turned on, the switch elements S2 and S3 are turned off; and when the switch elements S1 and S4 are turned off, the switch elements S2 and S3 are turned on. Thus, when the switch elements S1 and S4 are turned on, and the switch elements S2 and S3 are turned off, the modulated current I2 flows in the transmission path 3 in a positive direction, i.e., in a direction of solid arrows. On the other hand, when the switch elements S1 and S4 are turned off, and the switches S2 and S3 are turned on, the modulated current I2 flows in the transmission path 3 in a negative direction, i.e., in a direction of dotted arrows. Accordingly, as shown in FIG. 4, when the direct-current generated current I1 is inputted to the code modulator 2, the alternating-current modulated current I2 can be transmitted to the transmission path 3.

In the code demodulation circuit 33 of FIG. 7, the switch elements S11 to S14 are turned on or off in response to the demodulation codes d1 and d2 in synchronization with the code modulation circuit 23. In this case, the switch elements S12 and S13 are turned on or off in accordance with the demodulation code d1 identical to the modulation code m1, and the switch elements S11 and S14 are turned on or off in accordance with the demodulation code d2 identical to the modulation code m2. Thus, when the code value of the modulation code m1 is "1", and the code value of the modulation code m2 is "0", i.e., when the modulated current I2 flows in the transmission path 3 in the positive direction, the code value of the demodulation code d1 is "1", and the code value of the demodulation code d2 is "0". Accordingly, by turning on the switch elements S13 and S12 and turning off the switch elements S11 and S14, the demodulated current I3 flows at the output ports T13 and T14 of the code demodulation circuit 33 in the positive direction, i.e., in the direction of the solid arrows. On the other hand, when the code value of the modulation code m1 is "0", and the code value of the modulation code m2 is "1", i.e., when the modulated current I2 flows in the transmission path 3 in the negative direction, the code value of the demodulation code d1 is "0", and the code value of the demodulation code d2 is "1". Accordingly, by turning on the switch elements S11 and S14 and turning off the switch elements S12 and S13, the demodulated current I3 again flows at the output ports T13 and T14 of the code demodulation circuit 33 in the positive direction, i.e., in the direction of the solid arrows.

As described above, when using the modulation codes m1 and m2 and the demodulation codes d1 and d2 of FIG. 8A, equivalently, the code modulator 2 operates according to the modulation code m0 of Mathematical Expression (1), and the code demodulator 4 operates according to the demodulation code d0 of Mathematical Expression (2).

As described above, according to FIGS. 7 and 8A, when the direct-current generated current I1 is inputted to the code modulator 2, it is possible to extract the demodulated current I3 from the code demodulator 4, the demodulated current I3 being also a direct current similarly to the generated current I1 inputted to the code modulator 2. Therefore, according to the first embodiment, it is possible to modulate the direct-current generated current I1 by code modulation into the alternating-current modulated current I2, and then, transmit the modulated current I2 via the transmission path 3, and then, demodulate the modulated current I2 into the direct-current demodulated current I3.

Figure 8B:
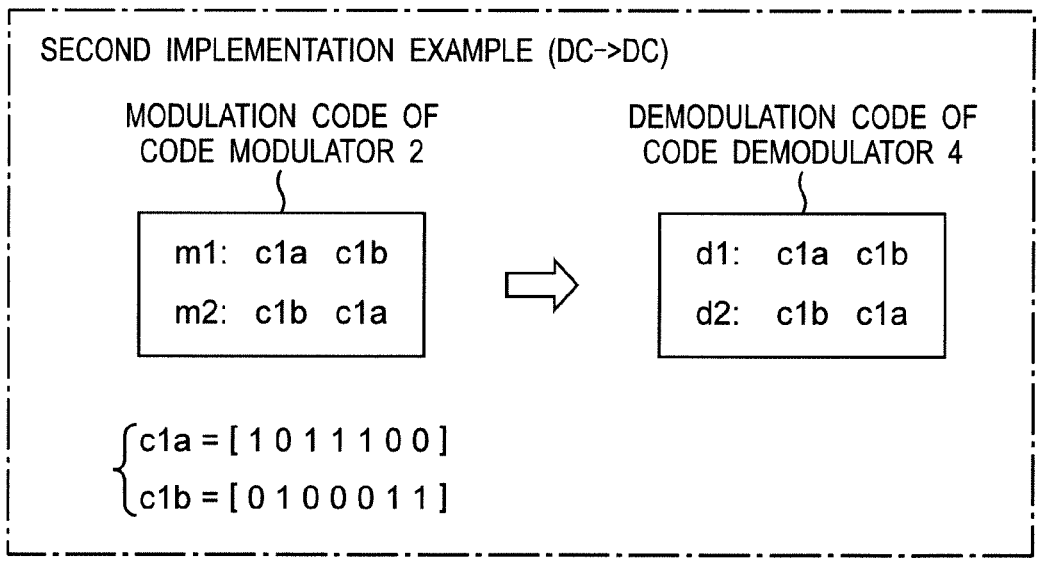
FIG. 8B is a diagram showing an example of a modulation code of the code modulator 2 and a demodulation code of the code demodulator 4 in the power transmission system of FIG. 1, as a second implementation example in which direct-current power is transmitted and received.

FIG. 8B is a diagram showing an example of a modulation code of the code modulator 2 and a demodulation code of the code demodulator 4 in the power transmission system of FIG. 1, as a second implementation example in which direct-current power is transmitted and received. When in each of the code sequences c1a and c1b, the number of bits of the code value "1" is equal to the number of bits of the code value "0", the modulated current I2 being modulated by code modulation and flowing in the transmission path 3 includes, in average, no direct-current component, but includes only an alternating-current component. However, in some code sequence, the number of bits of the code value "1" is different from the number of bits of the code value "0", and thus, a direct-current component occurs. When using such a code sequence, by concatenating the code sequence with a code sequence of bits having code values inverted from those of corresponding bits, respectively, it is possible to generate a modulation code and a demodulation code, in each of which the number of bits of the code value "1" is equal to the number of bits of the code value "0". According to the example of FIG. 8B, each of the modulation code m1 and the demodulation code d1 is a code sequence [c1a c1b] which is a concatenation of the code sequence c1a and the code sequence c1b, and each of the modulation code m2 and the demodulation code d2 is a code sequence [c1b c1a] which is a concatenation of the code sequence c1b and the code sequence c1a. As a result, the average value of the code-modulated current I2 flowing in the transmission path 3 becomes zero, and the modulated current I2 includes only an alternating-current component.

Note that the power generator 1 or the load 5 may be a power storage apparatus, such as a battery and a capacitor. When a power storage apparatus is incorporated in the power transmission system according to the present embodiment, it is possible to effectively utilize power generated during hours of low or no power consumption, and thus, improve overall power efficiency.

Second Embodiment

In the first embodiment, we have described the power transmission system which modulates and transmits a direct-current generated current by code modulation. Meanwhile, in a second embodiment, we describe a power transmission system which modulates and transmits an alternating-current generated current by code modulation.

The power transmission system according to the second embodiment includes a code modulator 2A and a code demodulator 4A, which will be described below with reference to FIGS. 10 and 11, in place of the code modulator 2 and the code demodulator 4 of FIG. 1. The other portions of the power transmission system according to the second embodiment are configured in a manner similar to that of the power transmission system according to the first embodiment.

Figure 9:
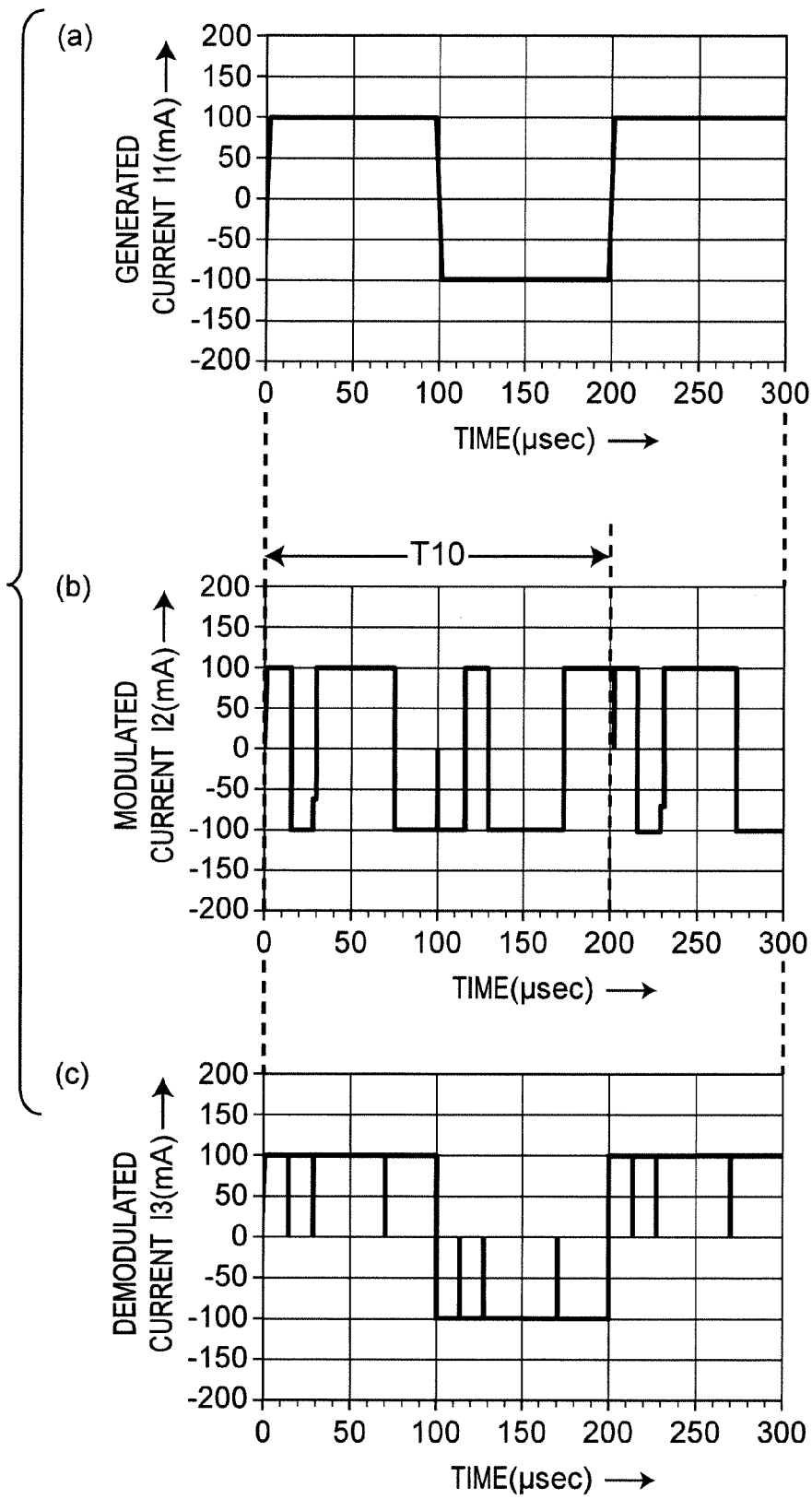
FIG. 9 is a waveform diagram showing exemplary signal waveforms in the power transmission system according to a second embodiment, in which: (a) shows a signal waveform of a generated current I1; (b) shows a signal waveform of a modulated current I2; and (c) shows a signal waveform of a demodulated current I3.

FIG. 9 is a waveform diagram, where (a) to (c) show exemplary signal waveforms in the power transmission system according to the second embodiment. In FIG. 9, (a) shows a signal waveform of a generated current I1; (b) shows a signal waveform of a modulated current I2; and (c) shows a signal waveform of a demodulated current I3. More specifically, FIG. 9 shows exemplary signal waveforms generated as follows: the code modulator 2A modulates the (single-phase) alternating-current generated current I1 by code modulation, and then, the modulated current I2 is transmitted via a transmission path 3, and then, the code demodulator 4A demodulates the modulated current I2 by code demodulation.

The power generator 1 generates the alternating-current generated current I1. For example, the alternating-current generated current I1 has a rectangular waveform at a frequency of 5 kHz, which cyclically repeats positive and negative periods every 200 microseconds. Also in this case, the code modulator 2A multiplies the generated current I1 by a modulation code m0 to generate the alternating modulated current I2, in a manner similar to the code modulation of the direct-current generated current I1 as shown in FIG. 4. The code demodulator 4A multiplies the modulated current I2 by a demodulation code d0 identical to the modulation code m0 to reproduce the alternating-current power generated by the power generator 1, and supply the reproduced alternating-current power to a load 5.

The frequency of the modulation code m0 and the demodulation code d0 is set to frequencies higher than the frequency of the generated current I1 and the frequency of the demodulated current I3. According to the exemplary signal waveform of FIG. 9, the alternating-current generated current I1 (FIG. 9(a)) is multiplied by the modulation code m0 having a frequency of 35 kHz to generate the modulated current I2 (FIG. 9(b)) of the code-modulated wave. In this case, the duration of each bit of the modulation code m0 is 1/(35 kHz)/2=14.2 microseconds.

Each bit of the modulation code m0 and the demodulation code d0 has a code value "1" or "−1". In case of transmission of the alternating-current generated current I1, the meaning of the code value "1" or "−1" in a period when the generated current I1 is positive (period from 0 to 100 microsecond in FIG. 9(a)) is different from that of a period when the generated current I1 is negative (period from 100 to 200 microsecond in FIG. 9(a)). In the period when the generated current I1 is positive, the code value "1" of the modulation code m0 indicates that the code modulator 2A outputs a current in the same direction as the direction of an inputted current, and the code value "−1" of the modulation code m0 indicates that the code modulator 2A outputs a current in the direction opposite to the direction of an inputted current. Similarly, in the period when the generated current I1 is positive, the code value "1" of the demodulation code d0 indicates that the code demodulator 4A outputs a current in the same direction as the direction of an inputted current, and the code value "−1" of the demodulation code d0 indicates that the code demodulator 4A outputs a current in the direction opposite to the direction of an inputted current. In the period when the generated current I1 is negative, the code value "1" of the modulation code m0 indicates that the code modulator 2A outputs a current in the direction opposite to the direction of an inputted current, and the code value "−1" of the modulation code m0 indicates that the code modulator 2A outputs a current in the same direction as the direction of an inputted current. Similarly, in the period when the generated current I1 is negative, the code value "1" of the demodulation code d0 indicates that the code demodulator 4A outputs a current in the direction opposite to the direction of an inputted current, and the code value "−1" of the demodulation code d0 indicates that the code demodulator 4A outputs a current in the same direction as the direction of an inputted current.

For example, the modulation code m0 and the demodulation code d0 are given as follows.

$$m0=[1\ -1\ 1\ 1\ 1\ -1\ -1\ -1\ 1\ -1\ -1\ -1\ 1\ 1] \quad (6)$$

$$d0=m0=[1\ -1\ 1\ 1\ 1\ -1\ -1\ -1\ 1\ -1\ -1\ -1\ 1\ 1] \quad (7)$$

Similarly to the code demodulation according to the first embodiment, the modulated current I2 of the code-modulated wave generated by the modulation code m0 is multiplied by the demodulation code d0. This multiplication is denoted as follows.

$$m0 \times d0=[1\ 1\ 1\ 1\ 1\ 1\ 1\ 1\ 1\ 1\ 1\ 1\ 1\ 1] \quad (8)$$

As apparent from Mathematical Expression (8), the demodulated current I3 (FIG. 8(c)) is obtained, which is an alternating current similarly to the original generated current I1.

As described above, it is possible to achieve power transmission in an accurately synchronized manner, without power loss, by using the method of code modulation and code demodulation according to the present embodiment. In addition, it is possible to achieve efficient power transmission for a longer period, for example, by repeatedly using the modulation code m0 and demodulation code d0 as described above.

Figure 10:
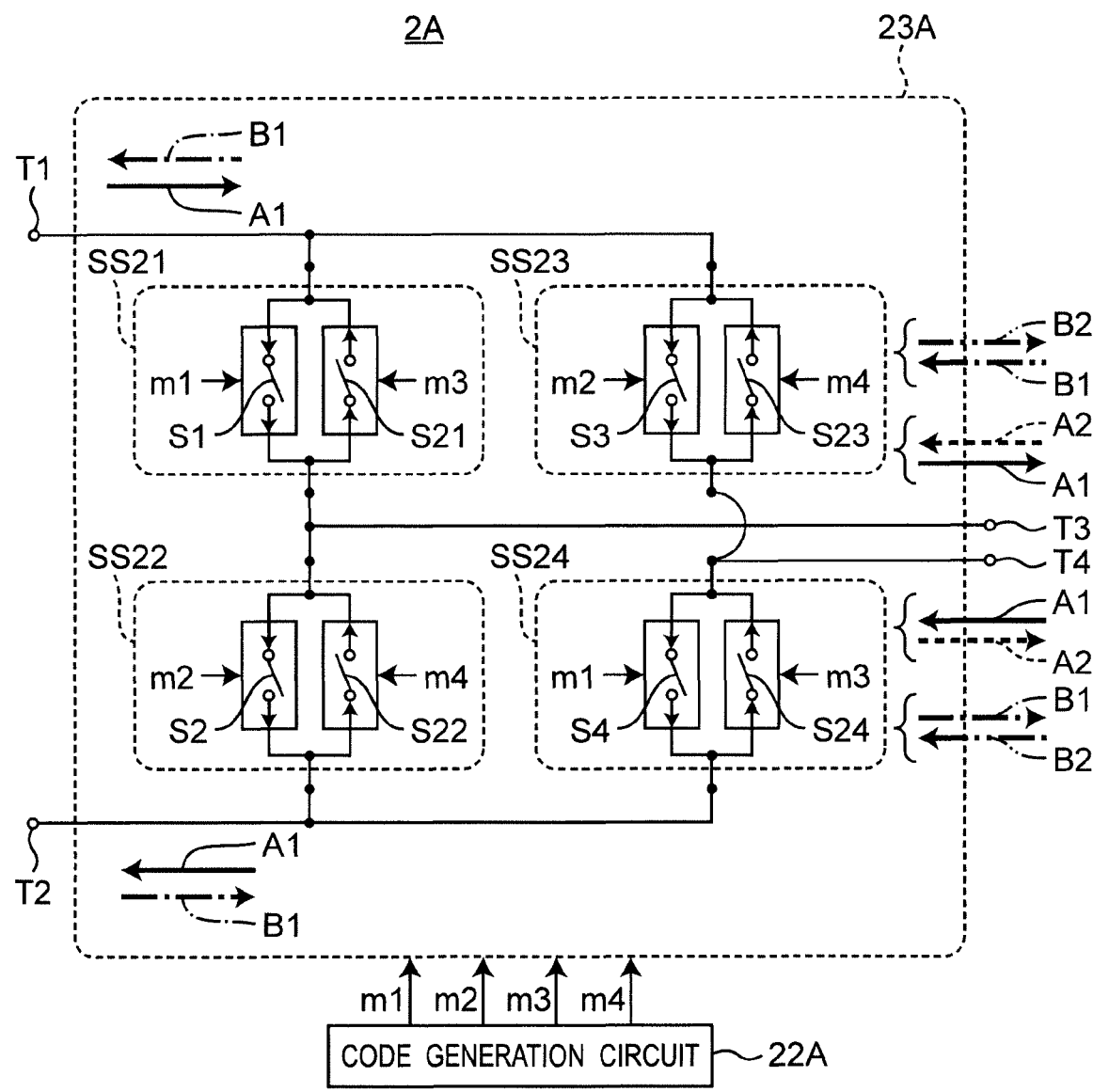
FIG. 10 is a block diagram showing a partial configuration of a code modulator 2A of the power transmission system according to the second embodiment.

FIG. 10 is a block diagram showing a partial configuration of the code modulator 2A of the power transmission system according to the second embodiment. The code modulator 2A of FIG. 10 is provided with a code generation circuit 22A and a code modulation circuit 23A, in place of the code generation circuit 22 and the code modulation circuit 23 of FIG. 5. The code modulator 2A of FIG. 10 is further provided with a control circuit 20 and a communication circuit 21 similarly to the code modulator 2 of FIG. 5, which are omitted in FIG. 10 for ease of illustration.

The code generation circuit 22A and the code modulation circuit 23A of FIG. 10 are different from the code generation circuit 22 and the code modulation circuit 23 of FIG. 7 in following points.

(1) The code generation circuit 22A generates four modulation codes m1 to m4 in place of the two modulation codes m1 and m2, and outputs the generated modulation codes m1 to m4 to the code modulation circuit 23A.

(2) The code modulation circuit 23A is provided with four bidirectional switch circuits SS21 to SS24 connected in a bridge configuration, in place of the unidirectional switch circuits SS1 to SS4.

The code generation circuit 22A generates and outputs the modulation codes m1 to m4 to the code modulation circuit 23A under control of the control circuit 20, in order to operate the code modulator 2A according to the modulation code m0 as described above. Each of the modulation codes m1 to m4 has code values "1" and "0".

In the code modulation circuit 23A, the switch circuit SS21 is provided with the switch element S1 of FIG. 7 to be turned on and off in response to the modulation code m1, and further provided with a switch element S21 having directionality opposite to that of the switch element S1, connected in parallel to the switch element S1, and to be turned on and off in response to the modulation code m3. The switch circuit SS22 is provided with the switch element S2 of FIG. 7 to be turned on and off in response to the modulation code m2, and further provided with a switch element S22 having directionality opposite to that of the switch element S2, connected in parallel to the switch element S2, and to be turned on and off in response to the modulation code m4. The switch circuit SS23 is provided with the switch element S3 of FIG. 7 to be turned on and off in response to the modulation code m2, and further provided with a switch element S23 having directionality opposite to that of the switch element S3, connected in parallel to the switch element S3, and to be turned on and off in response to the modulation code m4. The switch circuit SS24 is provided with the switch element S4 of FIG. 7 to be turned on and off in response to the modulation code m1, and further provided with a switch element S24 having directionality opposite to that of the switch element S4, connected in parallel to the switch element S4, and to be turned on and off in response to the modulation code m3. Each of the switch elements S21 to S24 is made of, for example, an MOS transistor. The code modulation circuit 23A has ports T1 and T2 connected to a power generator 1, and ports T3 and T4 connected to the transmission path 3. Alternating-current power is inputted from the power generator 1 to the code modulation circuit 23A. The code modulation circuit 23A modulates the alternating-current power by code modulation, and then, outputs a code-modulated wave to the transmission path 3.

Figure 11:
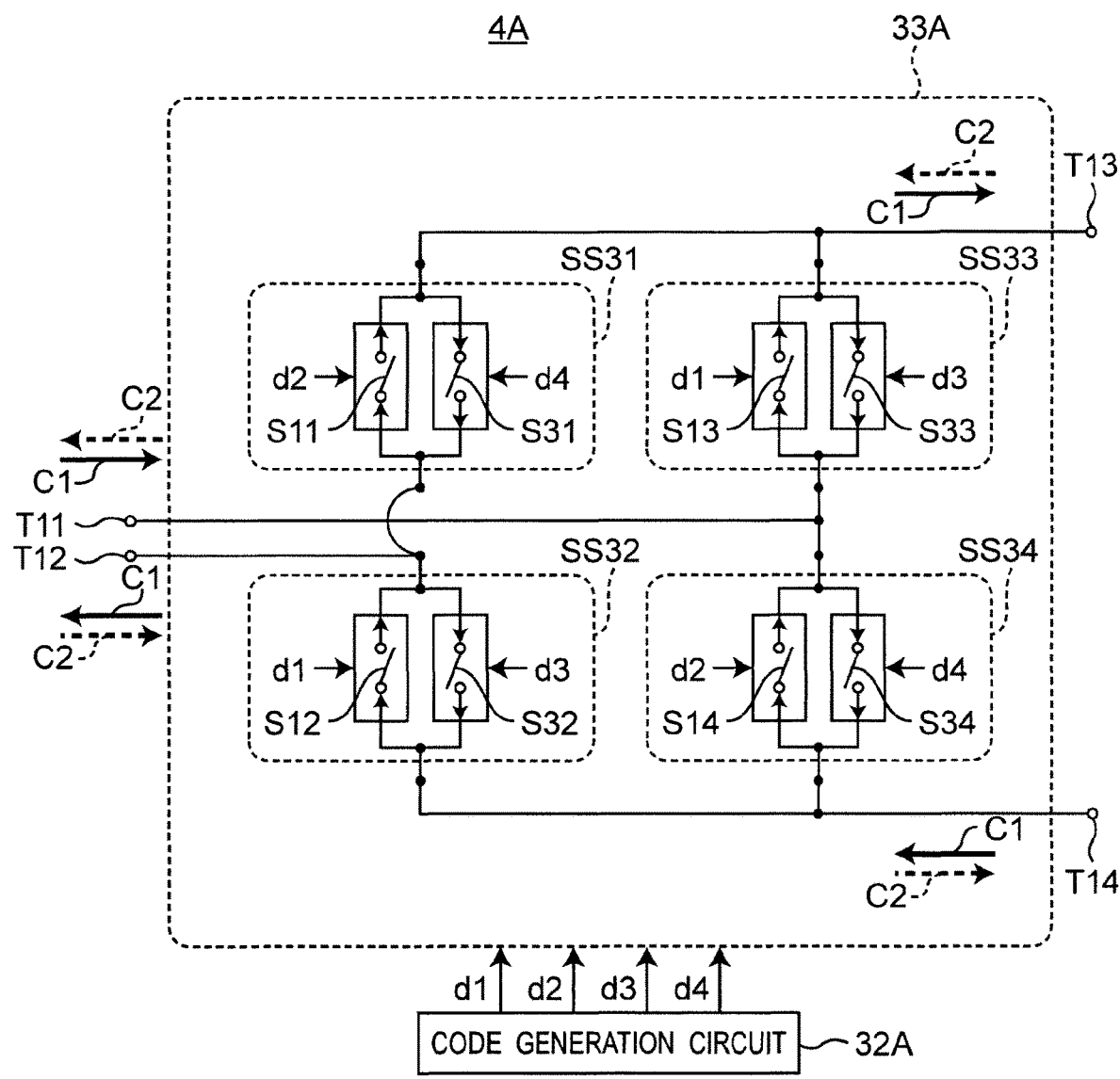
FIG. 11 is a block diagram showing a partial configuration of a code demodulator 4A of the power transmission system according to the second embodiment.

FIG. 11 is a block diagram showing a partial configuration of the code demodulator 4A of the power transmission system according to the second embodiment. The code demodulator 4A of FIG. 11 is provided with a code generation circuit 32A and a code demodulation circuit 33A, in place of the code generation circuit 32 and the code demodulation circuit 33 of FIG. 6. The code demodulator 4A of FIG. 11 is further provided with a control circuit 30 and a communication circuit 31 similarly to the code demodulator 4 of FIG. 5, which are omitted in FIG. 11 for ease of illustration.

The code generation circuit 32A and the code demodulation circuit 33A of FIG. 11 are different from the code generation circuit 32 and the code demodulation circuit 33 of FIG. 7 in following points.

(1) The code generation circuit 32A generates four demodulation codes d1 to d4 in place of the two modulation codes d1 and d2, and outputs the generated demodulation codes d1 to d4 to the code demodulation circuit 33A.

(2) The code demodulation circuit 33A is provided with four bidirectional switch circuits SS31 to SS34 connected in a bridge configuration, in place of the unidirectional switch circuits SS11 to SS14.

The code generation circuit 32A generates and outputs the demodulation codes d1 to d4 to the code demodulation circuit 33A under control of the control circuit 30, in order to operate the code demodulator 4A according to the demodulation code d0 as described above. Each of the demodulation codes d1 and d4 has code values "1" and "0".

In the code demodulation circuit 33A, the switch circuit SS31 is provided with the switch element S11 of FIG. 7 to be turned on and off in response to the demodulation code d2, and further provided with a switch element S31 having directionality opposite to that of the switch element S11, connected in parallel to the switch element S11, and to be turned on and off in response to the demodulation code d4. The switch circuit SS32 is provided with the switch element S12 of FIG. 7 to be turned on and off in response to the demodulation code d1, and further provided with a switch element S32 having directionality opposite to that of the switch element S12, connected in parallel to the switch element S12, and to be turned on and off in response to the demodulation code d3. The switch circuit SS33 is provided with the switch element S13 of FIG. 7 to be turned on and off in response to the demodulation code d1, and further provided with a switch element S33 having directionality opposite to that of the switch element S13, connected in parallel to the switch element S13, and to be turned on and off in response to the demodulation code d3. The switch circuit SS34 is provided with the switch element S14 of FIG. 7 to be turned on and off in response to the demodulation code d2, and further provided with a switch element S34 having directionality opposite to that of the switch element S14, connected in parallel to the switch element S14, and to be turned on and off in response to the demodulation code d4. Each of the switch elements S31 to S34 is made of, for example, an MOS transistor. The code demodulation circuit 33A has ports T11 and T12 connected to the transmission path 3, and ports T13 and T14 connected to the load 5. An alternating-current code-modulated wave is inputted from the transmission path 3 to the code demodulation circuit 33A. The code demodulation circuit 33A demodulates the code-modulated wave by code demodulation into alternating-current demodulated power, and then outputs the demodulated power to the load 5.

FIG. 12A is a diagram showing an example of a modulation code of the code modulator 2A and a demodulation code of the code demodulator 4A in the power transmission system according to the second embodiment, as a third implementation example in which alternating-current power is transmitted and received. More specifically, FIG. 12A shows an example of the modulation codes m1 to m4 inputted to the bidirectional switch circuits SS21 to SS24 of the code modulation circuit 23A, and the demodulation codes d1 to d4 inputted to the bidirectional switch circuits SS31 to SS34 of the code demodulation circuit 33A.

As shown in FIG. 12A, the modulation code m1 and the demodulation code d1 are identical to each other, and the modulation code m2 and the demodulation code d2 are identical to each other. Similarly, the modulation code m3 and the demodulation code d3 are identical to each other, and the modulation code m4 and the demodulation code d4 are identical to each other. In addition, similarly to the case of direct-current power transmission, code sequences c1a and c1b are configured such that when the code value of a certain bit of the code sequence c1a is "1", the code value of a corresponding bit of the code sequence c1b is "0"; and when the code value of a certain bit of the code sequence c1a is "0", the code value of a corresponding bit of the code sequence c1b is "1".

FIG. 12A shows a case in which the duration of the code sequence c1a and the code sequence c1b is set to be equal to a half of the cycle of the alternating-current generated current I1. In a period when the alternating-current generated current I1 flows in the positive direction (in example of FIG. 12A, first half period of each cycle), the modulation codes m1 and m2 are the code sequences c1a and c1b, respectively, and on the other hand, all code values of the modulation codes m3 and m4 are "0". In a period when the alternating-current generated current I1 flows in the negative direction (in example of FIG. 12A, second half period of each cycle), all the code values of the modulation codes m1 and m2 are "0", and on the other hand, the modulation codes m3 and m4 are the code sequences c1a and c1b, respectively. Each of the modulation codes m1 to m4 for one cycle is generated by concatenating bits for a first half of each cycle with bits for a second half of each cycle. Accordingly, in the first half of each cycle, the switch elements S1 to S4 are turned on and off according to the modulation codes m1 and m2, and on the other hand, the switch elements S21 to S24 are disconnected and no current flows. In addition, in the second half of each cycle, the switch elements S1 to S4 are disconnected and no current flows, and on the other hand, the switch elements S21 to S24 are turned on and off according to the modulation codes m3 and m4. Similarly to the modulation codes m1 to m4, each of the demodulation codes d1 to d4 for one cycle is generated by concatenating bits for the first half of each cycle with bits for the second half of each cycle.

Now, operation of the code modulation circuit 23A is described.

At first, operation is described for a case in which the generated current I1 flows at the input ports T1 and T2 in the positive direction, i.e., in a direction of solid arrows A1. In this case, when the switch elements S1 and S4 receiving the code value "1" of the modulation code m1 are turned on, the switch elements S2 and S3 receiving the code value "0" of the modulation code m2 are turned off. In addition, when the switch elements S1 and S4 receiving the code value "0" of the modulation code m1 are turned off, the switch elements S2 and S3 receiving the code value "1" of the modulation code m2 are turned on. Thus, when the switch elements S1 and S4 are turned on, and the switch elements S2 and S3 are turned off, the modulated current I2 flows in the transmission path 3 in a positive direction, i.e., in a direction of the solid arrows A1. On the other hand, when the switch elements S1 and S4 are turned off, and the switch elements S2 and S3 are turned on, the modulated current I2 flows in the transmission path 3 in a negative direction, i.e., in a direction of dotted arrows A2. Accordingly, when the current of positive period of the alternating-current generated current I1 is inputted to the code modulation circuit 23A, it is possible to transmit the alternating-current modulated current I2 to the transmission path 3, as shown in FIG. 9(b).

Next, operation is described for a case in which the generated current I1 flows at the input ports T1 and T2 in a negative direction, i.e., in a direction of chain arrows B1. In this case, when the switch elements S21 and S24 receiving the code value "1" of the modulation code m3 are turned on, the switch elements S22 and S23 receiving the code value "0" of the modulation code m4 are turned off. In addition, when the switch elements S21 and S24 receiving the code value "0" of the modulation code m3 are turned off, the switch elements S22 and S23 receiving the code value "1" of the modulation code m4 are turned on. Thus, when the switch elements S21 and S24 are turned on, and the switch elements S22 and S23 are turned off, the modulated current I2 flows in the transmission path 3 in a negative direction, i.e., in a direction of the chain arrows B1. On the other hand, when the switch elements S21 and S24 are turned off, and the switch elements S22 and S23 are turned on, the modulated current I2 flows in the transmission path 3 in a positive direction, i.e., in a direction of two-dot chain arrows B2. Accordingly, when the current of negative period of the alternating-current generated current I1 is inputted to the code modulation circuit 23A, it is possible to transmit the alternating-current modulated current I2 to the transmission path 3, as shown in FIG. 9(b).

As described with reference to FIG. 10, the code modulation circuit 23A can generate the alternating-current modulated current I2, as shown in FIG. 9(b), in both the positive and negative periods of the alternating-current generated current I1.

Next, operation of the code demodulation circuit 33A of FIG. 11 is described.

At first, we consider a case in which the generated current I1 flows at the input ports T1 and T2 of the code modulation circuit 23A in the positive direction, i.e., in the direction of the solid arrows A1. In this case, the alternating-current modulated current I2 flowing in the positive and negative directions is inputted to the input ports T11 and T12 of the code demodulation circuit 33A via the transmission path 3. When the code demodulation circuit 33A correctly performs demodulation operation, the demodulated current I3 flows at the output ports T13 and T14 of the code demodulation circuit 33A in a positive direction, i.e., in a direction of solid arrows C1. These operations are described below. In this case, all code values of the demodulation code d3 and the demodulation code d4 are "0", and all the switch elements S31 to S34 are turned off.

At first, operation of the code demodulation circuit 33A is described for a case in which the generated current I1 flows at the input ports T1 and T2 of the code modulation circuit 23A in the positive direction, and the modulated current I2 flows at the input ports T11 and T12 of the code demodulation circuit 33A in the positive direction, i.e., in the direction of the solid arrows C1. In this case, the code value of the code sequence c1a is "1", and the code value of the code sequence c1b is "0". Accordingly, the switch elements S12 and S13 receiving the code value "1" of the demodulation code d1 are turned on, and the switch elements S11 and S14 receiving the code value "0" of the demodulation code d2 are turned off. Therefore, the demodulated current I3 flows at the output ports T13 and T14 in the positive direction, i.e., in the direction of the solid arrows C1.

Next, operation of the code demodulation circuit 33A is described for a case in which the generated current I1 flows at the input ports T1 and T2 of the code modulation circuit 23A in the positive direction, and the modulated current I2 flows at the input ports T11 and T12 of the code demodulation circuit 33A in the negative direction, i.e., in the direction of dotted arrows C2. In this case, the code value of the code sequence c1a is "0", and the code value of the code sequence c1b is "1". Accordingly, the switch elements S12 and S13 receiving the code value "0" of the demodulation code d1 are turned off, and the switch elements S11 and S14 receiving the code value "1" of the demodulation code d2 are turned on. Therefore, the demodulated current I3 flows at the output ports T13 and T14 in the positive direction, i.e., in the direction of the solid arrows C1. Accordingly, when the current of positive period of the alternating-current generated current I1 is inputted to the code modulation circuit 23A, the code demodulation circuit 33A can output the demodulated current I3 which is correctly demodulated with positive polarity, to the load 5, as shown in FIG. 9(c).

Next, we consider a case in which the generated current I1 flows at the input ports T1 and T2 of the code modulation circuit 23A in the negative direction, i.e., in the direction of the chain arrows B1. Similarly to the above case, the alternating-current modulated current I2 flowing in the positive and negative directions is inputted to the input ports T11 and T12 of the code demodulation circuit 33A via the transmission path 3. When the code demodulation circuit 33A correctly performs demodulation operation, the demodulated current I3 flows at the output ports T13 and T14 of the code demodulation circuit 33A in the negative direction, i.e., in a direction of the dotted arrows C2. These operations are described below. In this case, all code values of the demodulation codes d1 and d2 are "0", and all the switch elements S11 to S14 are turned off.

At first, described is operation of the code demodulation circuit 33A for a case in which the generated current I1 flows at the input ports T1 and T2 of the code modulation circuit 23A in the negative direction, and the modulated current I2 flows at the input ports T11 and T12 of the code demodulation circuit 33A in the negative direction, i.e., in the direction of dotted arrows C2. In this case, the code value of the code sequence c1a is "1", and the code value of the code sequence c1b is "0". Accordingly, the switch elements S32 and S33 receiving the code value "1" of the demodulation code d3 are turned on, and the switch elements S31 and S34 receiving the code value "0" of the demodulation code d4 are turned off. Therefore, the demodulated current I3 flows at the output ports T13 and T14 in the negative direction, i.e., in the direction of the dotted arrows C2.

Next, operation of the code demodulation circuit 33A is described for a case in which the generated current I1 flows at the input ports T1 and T2 of the code modulation circuit 23A in the negative direction, and the modulated current I2 flows at the input ports T11 and T12 of the code demodulation circuit 33A in the positive direction, i.e., in the direction of the solid arrows C1. In this case, the code value of the code sequence c1a is "0", and the code value of the code sequence c1b is "1". Accordingly, the switch elements S32 and S33 receiving the code value "0" of the demodulation code d3 are turned off, and the switch elements S31 and S34 receiving the code value "1" of the demodulation code d4 are turned on. Therefore, the demodulated current I3 flows at the output ports T13 and T14 in the negative direction, i.e., in the direction of the dotted arrows C2. Accordingly, when the current of negative period of the alternating-current generated current I1 is inputted to the code modulation circuit 23A, the code demodulation circuit 33A can output the demodulated current I3 which is correctly demodulated with negative polarity, to the load 5, as shown in FIG. 9(c).

As described above, when using the modulation codes m1 to m4 and the demodulation codes d1 to d4 of FIG. 12A, equivalently, the code modulator 2A operates according to the modulation code m0 of Mathematical Expression (6), and the code demodulator 4A operates according to the demodulation code d0 of Mathematical Expression (7).

As described above, according to FIGS. 10, 11, and 12A, when the alternating-current generated current I1 is inputted to the code modulator 2A, it is possible to extract the demodulated current I3 from the code demodulator 4A, the demodulated current I3 being also an alternating current similarly to the generated current I1 inputted to the code modulator 2A. Therefore, according to the second embodiment, it is possible to modulate the alternating-current generated current I1 by code modulation into the alternating-current modulated current I2, and then, transmit the modulated current I2 via the transmission path 3, and then, demodulate the modulated current I2 into the alternating-current demodulated current I3.

Figure 15:
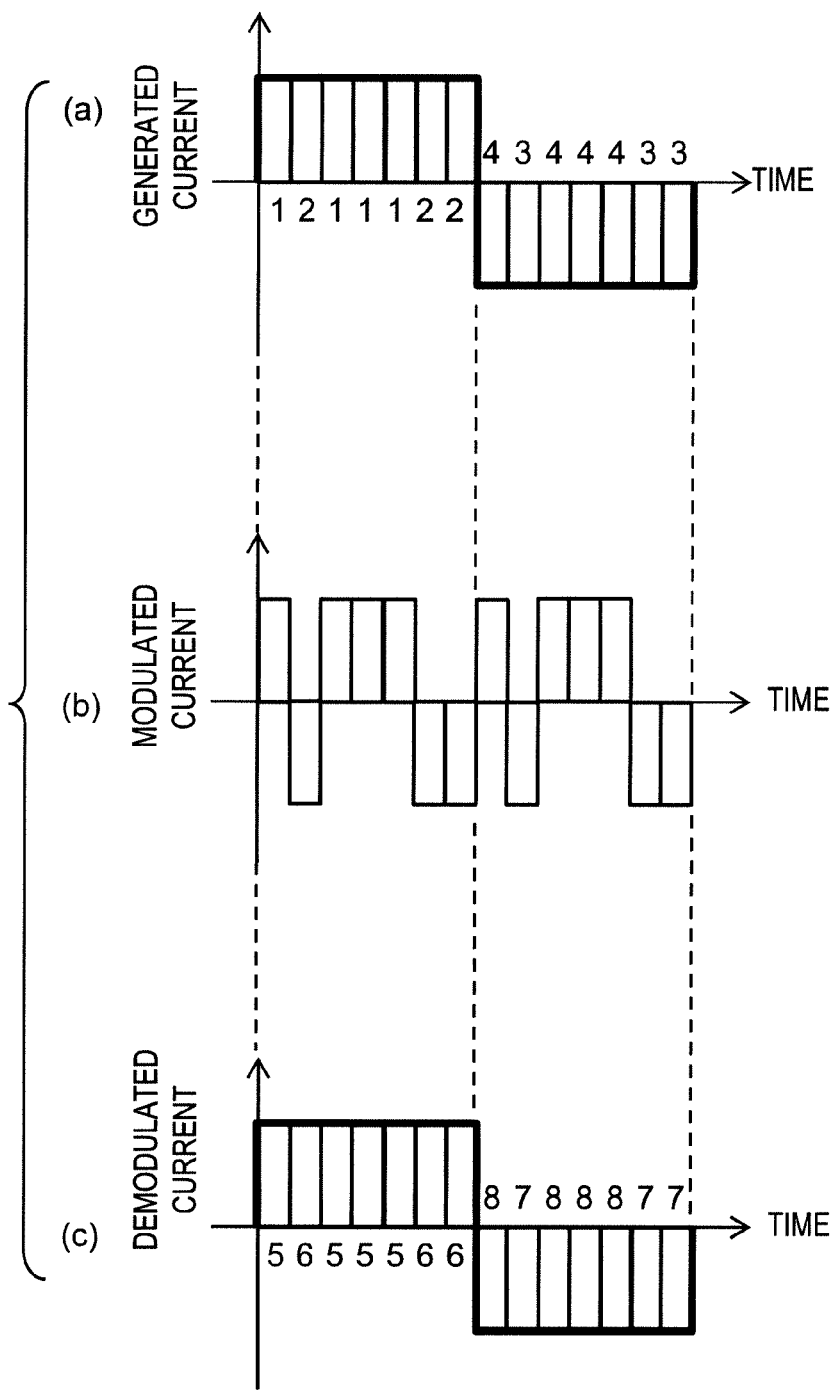
FIG. 15 is a diagram showing waveforms of a generated current, a modulated current, and a demodulated current, when using the modulation code and the demodulation code of FIG. 12A.

FIG. 15 is a diagram showing waveforms of a generated current, a modulated current, and a demodulated current, when using the modulation code and the demodulation code of FIG. 12A.

As described with reference to FIG. 10, the code modulation circuit 23A operates in one of the following operation modes (1) to (4) dependent on the direction of current at the input terminals T1 and T2, and the direction of current outputted from the output terminals T3 and T4.

(1) When a positive current (arrow A1) is inputted into the input terminals T1 and T2, the switch elements S1 and S4 are turned on, and the switch elements S2 and S3 are turned off, and therefore, a positive currents (arrow A1) are outputted from the output terminals T3 and T4.

(2) When a positive current (arrow A1) is inputted into the input terminals T1 and T2, the switch elements S1 and S4 are turned off, and the switch elements S2 and S3 are turned on, and therefore, a negative currents (arrow A2) are outputted from the output terminals T3 and T4.

(3) When a negative currents (arrow B1) is inputted into the input terminals T1 and T2, the switch elements S21 and S24 are turned on, and the switch elements S22 and S23 are turned off, and therefore, a negative currents (arrow B1) are outputted from the output terminals T3 and T4.

(4) When a negative currents (arrow B1) is inputted into the input terminals T1 and T2, the switch elements S21 and S24 are turned off, and the switch elements S22 and S23 are turned on, and therefore, a positive currents (arrow B2) are outputted from the output terminals T3 and T4.

The control circuit 20 of the code modulator 2A determines an operation mode of the code modulation circuit 23A, based on the direction of the current at the input terminals T1 and T2, and the direction of the current outputted from the output terminals T3 and T4. The code generation circuit 22A generates a modulation code in accordance with the determined operation mode.

In addition, as described with reference to FIG. 11, the code demodulation circuit 33A operates in one of the following operation modes (5) to (8) dependent on the direction of current at the input terminals T11 and T12, and the direction of current outputted from the output terminals T13 and T14.

(5) When a positive currents (arrow C1) is inputted into the input terminals T11 and T12, the switch elements S12 and S13 are turned on, and the switch elements S11 and S14 are turned off, and therefore, a positive currents (arrow C1) are outputted from the output terminals T13 and T14.

(6) When a negative currents (arrow C2) is inputted into the input terminals T11 and T12, the switch elements S12 and S13 are turned off, and the switch elements S11 and S14 are turned on, and therefore, a positive currents (arrow C1) are outputted from the output terminals T13 and T14.

(7) When a negative currents (arrow C2) is inputted into the input terminals T11 and T12, the switch elements S32 and S33 are turned on, and the switch elements S31 and S34 are turned off, and therefore, a negative currents (arrow C2) are outputted from the output terminals T13 and T14.

(8) When a positive currents (arrow C1) is inputted into the input terminals T11 and T12, the switch elements S32 and S33 are turned off, and the switch elements S31 and S34 are turned on, and therefore, a negative currents (arrow C2) are outputted from the output terminals T13 and T14.

The control circuit 30 of the code demodulator 4A determines an operation mode of the code demodulation circuit 33A based on the direction of the current at the input terminals T11 and T12, and the direction of the current outputted from the output terminals T13 and T14. The code generation circuit 32A generates a demodulation code in accordance with the determined operation mode.

Numerals "1" to "8" in FIG. 15 indicate operation modes (1) to (8), respectively. For example, as shown in FIG. 15, power can be modulated and demodulated by changing the operation mode of the code modulation circuit 23A and the operation mode of the code demodulation circuit 33A.

FIG. 12B is a diagram showing an example of a modulation code of the code modulator 2A and a demodulation code of the code demodulator 4A in the power transmission system according to the second embodiment, as a fourth implementation example in which direct-current power is transmitted and received. In this case, in the code modulation circuit 23A of FIG. 10 and the code demodulation circuit 33A of FIG. 11, all code values of the modulation codes m3 and m4 and the demodulation codes d3 and d4 are set to "0" as shown in FIG. 12B, and thus, the switch elements S21 to S24 and S31 to S34 are turned off. Thus, the code modulation circuit 23A of FIG. 10 and the code demodulation circuit 33A of FIG. 11 operate as the code modulation circuit 23 and the code demodulation circuit 33 of FIG. 7, respectively. Accordingly, it is possible to achieve direct-current power transmission of FIG. 4 by generating the modulation codes m1 and m2 and the demodulation codes d1 and d2 from the code sequences c1a and c1b as shown in FIG. 12B. Thus, by changing the modulation codes m1 to m4 and the demodulation codes d1 to d4, it is possible to achieve a favorable power transmission system capable of supporting both direct-current power transmission and alternating-current power transmission using the code modulation circuit 23A of FIG. 10 and the code demodulation circuit 33A of FIG. 11.

The direct-current power generator 1 may be, for example, a photovoltaic power generator. The alternating-current power generator 1 may be, for example, a power generator provided with a turbine rotated by thermal power, hydraulic power, wind power, nuclear power, tidal power, or the like.

As described above, by using the modulation code and the demodulation code identical to each other, the power transmission system according to the second embodiment is capable of modulating and transmitting the direct-current generated current I1 and demodulating the modulated current into the direct-current demodulated current I3, and is also capable of modulating and transmitting the alternating-current generated current I1 and demodulating the modulated current into the alternating-current demodulated current I3. In addition, by using the demodulation code different from the modulation code, the power transmission system according to the second embodiment is capable of modulating and transmitting the direct-current generated current I1 and demodulating the modulated current into the alternating-current demodulated current I3, and is also capable of modulating and transmitting the alternating-current generated current I1 and demodulating the modulated current into the direct-current demodulated current I3.

Since the code modulation circuit 23A of FIG. 10 and the code demodulation circuit 33A of FIG. 11 are provided with the bidirectional switch circuits SS21 to SS24 and SS31 to SS34, these circuits are reversible. More specifically, the code modulation circuit 23A is also operable as a code demodulation circuit to demodulate a modulated current inputted from the ports T3 and T4 and output the demodulated current from the ports T1 and T2. The code demodulation circuit 33A is also operable as a code modulation circuit to modulate a generated current inputted from the ports T13 and T14 and output the modulated current from the ports T11 and T12. Thus, it is possible to transmit power from the code demodulator 4A provided with the code demodulation circuit 33A, to the code modulator 2A provided with the code modulation circuit 23A.

FIGS. 10 to 11 show the example in which each of the bidirectional switch circuits SS21 to SS34 is made of a pair of switch elements connected in parallel such that currents flow in opposite directions (S1, S21; S2, S22; S3, S23; S4, S24; S11, S31; S12, S32; S13, S33; S14, S34). Alternatively, each of the bidirectional switch circuits SS21 to SS34 may be made of a pair of switch elements connected in series, as shown in FIGS. 13A to 14D (S41, S51; S42, S52; S43, S53; S44, S54). In each of FIGS. 13A to 14D, the direction from top to bottom is referred to as a "positive direction", and the direction from bottom to top is referred to as a "negative direction".

Figure 13A:
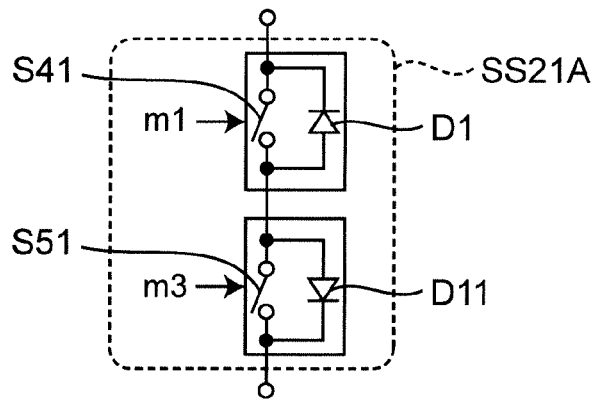
FIG. 13A is a circuit diagram showing a configuration of a bidirectional switch circuit SS21A for a code modulation circuit 23A used in a power transmission system according to a modified embodiment of the second embodiment.

FIG. 13A is a circuit diagram showing a configuration of a bidirectional switch circuit SS21A for a code modulation circuit 23A used in a power transmission system according to a modified embodiment of the second embodiment. The switch circuit SS21A of FIG. 13A corresponds to the switch circuit SS21 of FIG. 10, and is made of series connection of: (1) a switch element S41 connected in parallel with a diode D1 allowing a current to flow in the negative direction, and turned on and off in accordance with the modulation code m1; and (2) a switch element S51 connected in parallel with a diode D11 allowing a current to flow in the positive direction, and turned on and off in accordance with the modulation code m3.

Figure 13B:
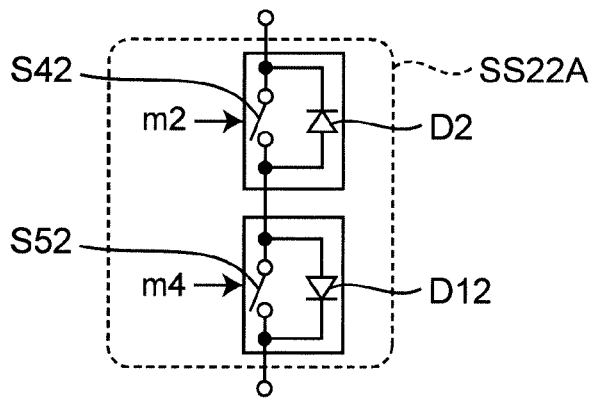
FIG. 13B is a circuit diagram showing a configuration of a bidirectional switch circuit SS22A for the code modulation circuit 23A used in the power transmission system according to the modified embodiment of the second embodiment.

FIG. 13B is a circuit diagram showing a configuration of a bidirectional switch circuit SS22A for the code modulation circuit 23A used in the power transmission system according to the modified embodiment of the second embodiment. The switch circuit SS22A of FIG. 13B corresponds to the switch circuit SS22 of FIG. 10, and is made of series connection of: (1) a switch element S42 connected in parallel with a diode D2 allowing a current to flow in the negative direction, and turned on and off in accordance with the modulation code m2; and (2) a switch element S52 connected in parallel with a diode D12 allowing a current to flow in the positive direction, and turned on and off in accordance with the modulation code m4.

Figure 13C:
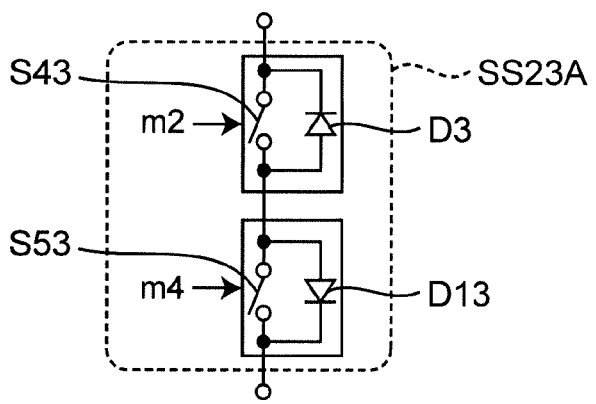
FIG. 13C is a circuit diagram showing a configuration of a bidirectional switch circuit SS23A for the code modulation circuit 23A used in the power transmission system according to the modified embodiment of the second embodiment.

FIG. 13C is a circuit diagram showing a configuration of a bidirectional switch circuit SS23A for the code modulation circuit 23A used in the power transmission system according to the modified embodiment of the second embodiment. The switch circuit SS23A of FIG. 13C corresponds to the switch circuit SS23 of FIG. 10, and is made of series connection of: (1) a switch element S43 connected in parallel with a diode D3 allowing a current to flow in the negative direction, and turned on and off in accordance with the modulation code m2; and (2) a switch element S53 connected in parallel with a diode D13 allowing a current to flow in the positive direction, and turned on and off in accordance with the modulation code m4.

Figure 13D:
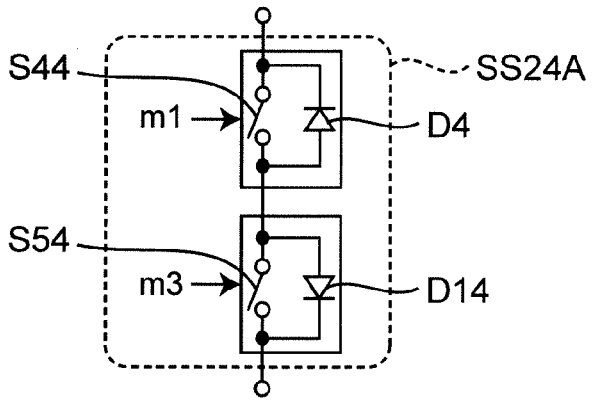
FIG. 13D is a circuit diagram showing a configuration of a bidirectional switch circuit SS24A for the code modulation circuit 23A used in the power transmission system according to the modified embodiment of the second embodiment.

FIG. 13D is a circuit diagram showing a configuration of a bidirectional switch circuit SS24A for the code modulation circuit 23A used in the power transmission system according to the modified embodiment of the second embodiment. The switch circuit SS24A of FIG. 13D corresponds to the switch circuit SS24 of FIG. 10, and is made of series connection of: (1) a switch element S44 connected in parallel with a diode D4 allowing a current to flow in the negative direction, and turned on and off in accordance with the modulation code m1; and (2) a switch element S54 connected in parallel with a diode D14 allowing a current to flow in the positive direction, and turned on and off in accordance with the modulation code m3.

Figure 14A:
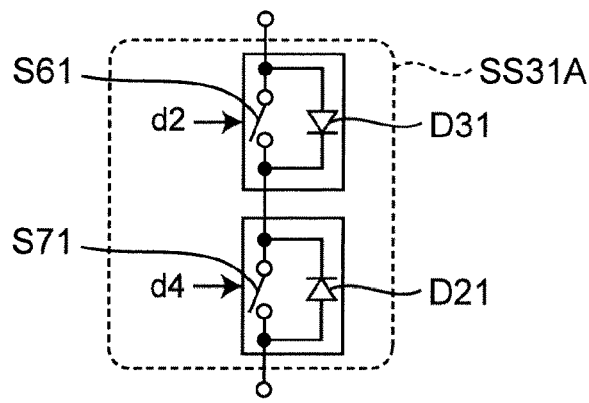
FIG. 14A is a circuit diagram showing a configuration of a bidirectional switch circuit SS31A for a code demodulation circuit 33A used in the power transmission system according to the modified embodiment of the second embodiment.

FIG. 14A is a circuit diagram showing a configuration of a bidirectional switch circuit SS31A for a code demodulation circuit 33A used in the power transmission system according to the modified embodiment of the second embodiment. The switch circuit SS31A of FIG. 14A corresponds to the switch circuit SS31 of FIG. 11, and is made of series connection of: (1) a switch element S61 connected in parallel with a diode D31 allowing a current to flow in the positive direction, and turned on and off in accordance with the demodulation code d2; and (2) a switch element S71 connected in parallel with a diode D21 allowing a current to flow in the negative direction, and turned on and off in accordance with the demodulation code d4.

Figure 14B:
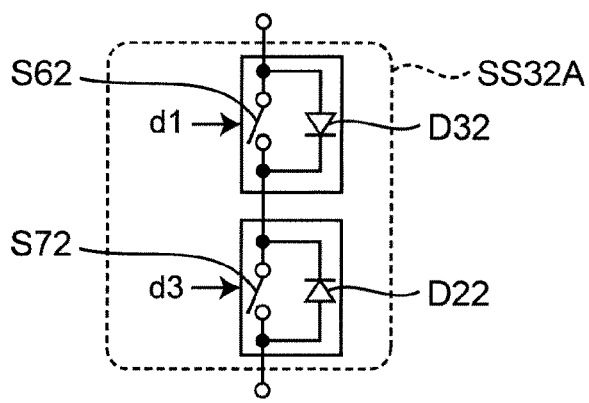
FIG. 14B is a circuit diagram showing a configuration of a bidirectional switch circuit SS32A for the code demodulation circuit 33A used in the power transmission system according to the modified embodiment of the second embodiment.

FIG. 14B is a circuit diagram showing a configuration of a bidirectional switch circuit SS32A for the code demodulation circuit 33A used in the power transmission system according to the modified embodiment of the second embodiment. The switch circuit SS32A of FIG. 14B corresponds to the switch circuit SS32 of FIG. 11, and is made of series connection of: (1) a switch element S62 connected in parallel with a diode D32 allowing a current to flow in the positive direction, and turned on and off in accordance with the demodulation code d1; and (2) a switch element S72 connected in parallel with a diode D22 allowing a current to flow in the negative direction, and turned on and off in accordance with the demodulation code d3.

Figure 14C:
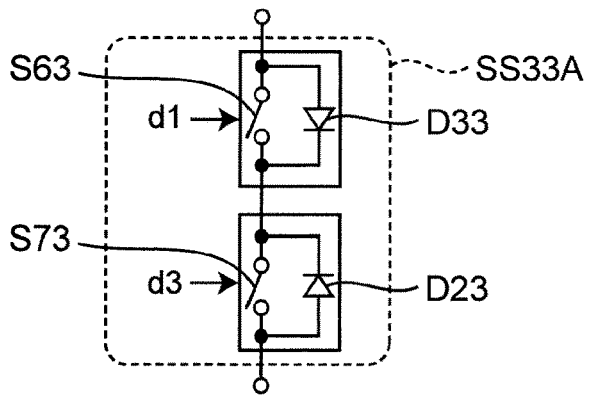
FIG. 14C is a circuit diagram showing a configuration of a bidirectional switch circuit SS33A for the code demodulation circuit 33A used in the power transmission system according to the modified embodiment of the second embodiment.

FIG. 14C is a circuit diagram showing a configuration of a bidirectional switch circuit SS33A for the code demodulation circuit 33A used in the power transmission system according to the modified embodiment of the second embodiment. The switch circuit SS33A of FIG. 14C corresponds to the switch circuit SS33 of FIG. 11, and is made of series connection of: (1) a switch element S63 connected in parallel with a diode D33 allowing a current to flow in the positive direction, and turned on and off in accordance with the demodulation code d1; and (2) a switch element S73 connected in parallel with a diode D23 allowing a current to flow in the negative direction, and turned on and off in accordance with the demodulation code d3.

Figure 14D:
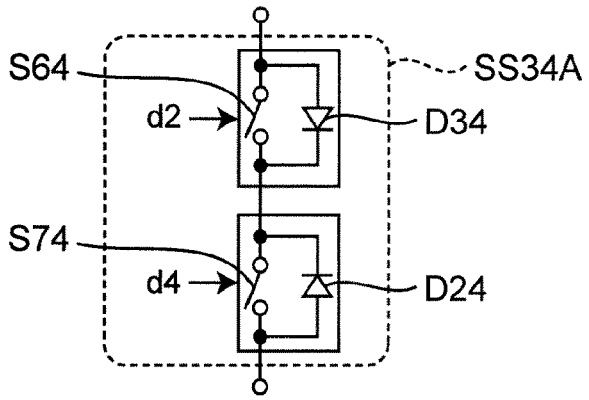
FIG. 14D is a circuit diagram showing a configuration of a bidirectional switch circuit SS34A for the code demodulation circuit 33A used in the power transmission system according to the modified embodiment of the second embodiment.

FIG. 14D is a circuit diagram showing a configuration of a bidirectional switch circuit SS34A for the code demodulation circuit 33A used in the power transmission system according to the modified embodiment of the second embodiment. The switch circuit SS34A of FIG. 14D corresponds to the switch circuit SS34 of FIG. 11, and is made of series connection of: (1) a switch element S64 connected in parallel with a diode D34 allowing a current to flow in the positive direction, and turned on and off in accordance with the demodulation code d2; and (2) a switch element S74 connected in parallel with a diode D24 allowing a current to flow in the negative direction, and turned on and off in accordance with the demodulation code d4.

Referring to FIG. 13A to FIG. 14D, each of the switch elements S41 to S74 may be made of, for example, an MOS transistor. Parallel parasitic (body) diodes D1 to D34 of MOS transistors may be used. For example, when each of the switch circuits SS21A to SS34A of FIGS. 13A to 14D is implemented by a switch element of an MOS transistor and one diode, two MOS transistors and two diodes are required for each one of the bidirectional switch circuit SS21A to SS34A. Meanwhile, packaged MOS transistors are widely available, including a built-in diode having good reverse characteristics. When using such packaged MOS transistors, each of the bidirectional switch circuits SS21A to SS34A can be made of two switch elements, and thus, size can be reduced.

Third Embodiment

In the first and second embodiments, we have described the power transmission systems which transmit power from the one power generator 1 to the one load 5. Meanwhile, in a third embodiment, we describe a power transmission system which transmits powers from a plurality of power generators to a plurality of loads.

Figure 16:
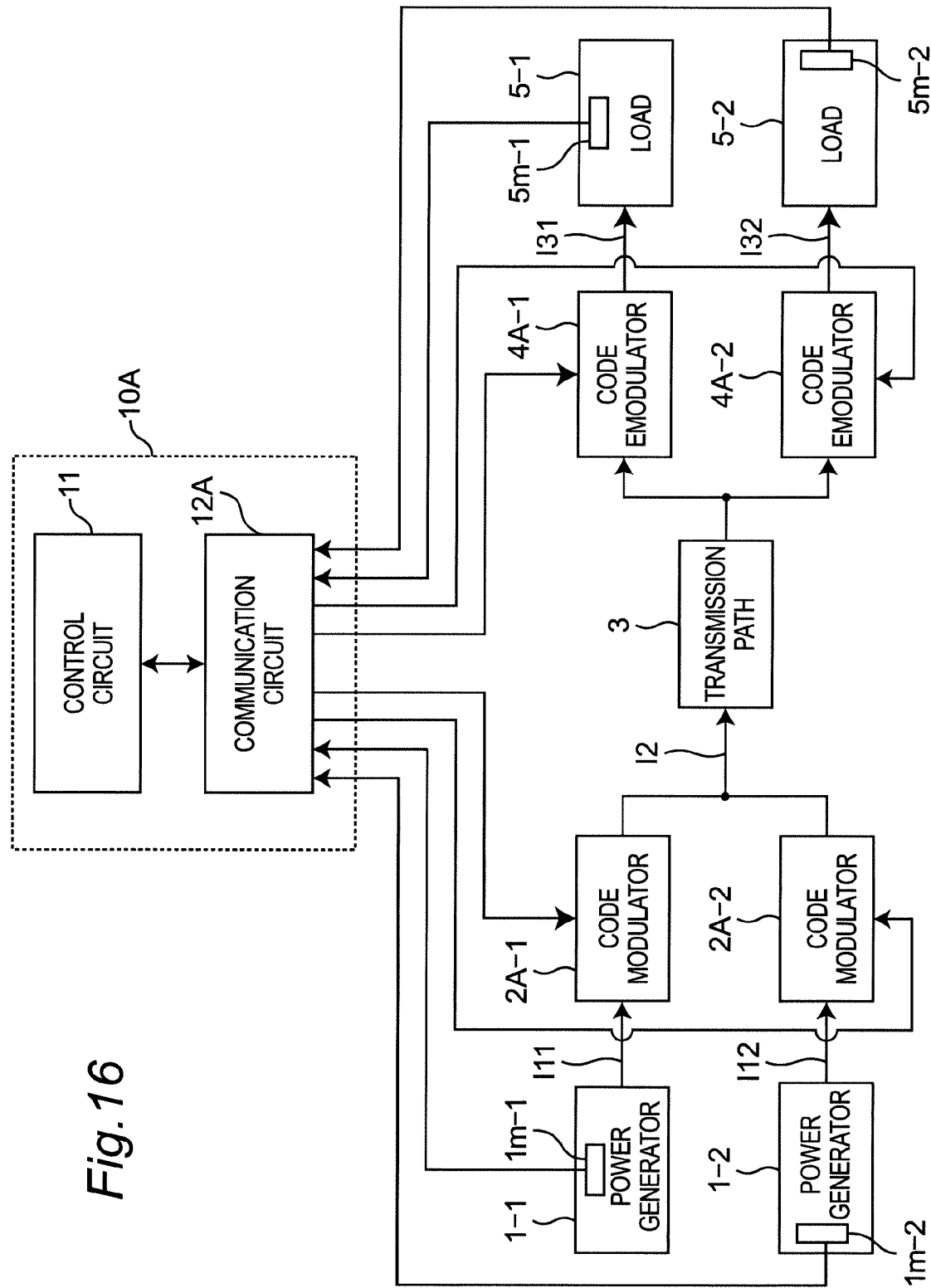
FIG. 16 is a block diagram showing a configuration of a power transmission system according to a third embodiment.

FIG. 16 is a block diagram showing a configuration of a power transmission system according to the third embodiment. Referring to FIG. 16, the power transmission system according to the third embodiment includes a plurality of power generators 1-1 and 1-2, a plurality of code modulators 2A-1 and 2A-2, a transmission path 3, a plurality of code demodulators 4A-1 and 4A-2, a plurality of loads 5-1 and 5-2, and a controller 10A.

The controller 10A is provided with a control circuit 11 and a communication circuit 12A. The control circuit 11 communicates with the code modulators 2A-1 and 2A-2 and the code demodulators 4A-1 and 4A-2 via the communication circuit 12A, and controls operations of the code modulators 2A-1 and 2A-2 and the code demodulators 4A-1 and 4A-2.

In the power transmission system of FIG. 16, each of the code modulators 2A-1 and 2A-2 operates as a power transmitter apparatus, and each of the code demodulators 4A-1 and 4A-2 operates as a power receiver apparatus. Each code modulator of the code modulators 2A-1 and 2A-2 modulates first power to generate a code-modulated wave by code modulation using a modulation code based on a code sequence, and transmits the code-modulated wave to one of the code demodulators 4A-1 and 4A-2 via the transmission path 3. Each one of the code demodulators 4A-1 and 4A-2 receives the code-modulated wave from one of the code modulators 2A-1 and 2A-2 via the transmission path 3, and demodulates the received code-modulated wave to generate second power by code demodulation using a demodulation code based on a code sequence identical to the code sequence of the modulation code used for the code modulation. The first powers are, for example, powers generated by the power generators 1-1 and 1-2, and are shown as generated currents I11 and I12 in FIG. 16. The code-modulated wave is alternating-current power modulated by code modulation, and is shown as a modulated current I2 in FIG. 16. The second power are, for example, powers to be supplied to the loads 5-1 and 5-2, and are shown as demodulated currents I31 and I32 in FIG. 16.

In this case, the code modulators 2A-1 and 2A-2 and the code demodulators 4A-1 and 4A-2 of FIG. 16 are configured and operated similarly to the code modulator 2A and the code demodulator 4A according to the second embodiment.

The power transmission system of FIG. 16 is further provided with power meters 1m-1, 1m-2, 5m-1, and 5m-2. Each of the power meters 1m-1 and 1m-2 is first power measuring means which measures an amount of the first power. More specifically, each of the power meters 1m-1 and 1m-2 measures an amount of power generated by the power generators 1-1 and 1-2 and transmitted from the power generators 1-1 and 1-2 to the code modulators 2A-1 and 2A-2. Each of the power meters 5m-1 and 5m-2 is second power measuring means which measures an amount of the second power. More specifically, each of the power meters 5m-1 and 5m-2 measures an amount of power transmitted from the code demodulators 4A-1 and 4A-2 to the loads 5-1 and 5-2, and used by the loads 5-1 and 5-2. The amounts of powers measured by the power meters 1m-1, 1m-2, 5m-1, and 5m-2 are transmitted to the controller 10A.

The controller 10A controls operations of the code modulators 2A-1 and 2A-2 and the code demodulators 4A-1 and 4A-2 based on the amounts of powers received from the power meters 1m-1, 1m-2, 5m-1, and 5m-2. For example, the controller 10A transmits control signals to the code modulators 2A-1 and 2A-2 and the code demodulators 4A-1 and 4A-2, the control signals including synchronization signals for synchronizing the code modulators 2A-1 and 2A-2 and the code demodulators 4A-1 and 4A-2 to each other, thus achieving code modulation and code demodulation of power in an accurately synchronized manner.

The controller 10A transmits the code sequences of the modulation codes, or information specifying the code sequences, to at least one of the code modulators 2A-1 and 2A-2, which is to transmit power, and transmits the code sequences of the demodulation codes, or information specifying the code sequences, to at least one of the code demodulators 4A-1 and 4A-2, which is to receive power. For example, when transmitting power from the code modulator 2A-1 to the code demodulator 4A-1, the controller 10A sets a modulation code to the code modulator 2A-1, and a demodulation code to the code demodulator 4A-1, based on one code sequence. When simultaneously transmitting power from the code modulator 2A-2 to the code demodulator 4A-2, the controller 10A sets a modulation code to the code modulator 2A-2, and a demodulation code to the code demodulator 4A-2, based on another different code sequence. When simultaneously transmitting powers from the plurality of code modulators 2A-1 and 2A-2 to the plurality of code demodulators 4A-1 and 4A-2, a plurality of low-correlated (e.g., orthogonal) code sequences may be used.

Thus, it is possible to transmit powers from the plurality of power generators 1-1 and 1-2 to the plurality of loads 5-1 and 5-2.

Now, we describe exemplary operations of the code modulators 2A-1 and 2A-2 and the code demodulators 4A-1 and 4A-2 for transmitting powers generated by the power generators 1-1 and 1-2 to the loads 5-1 and 5-2.

In the third embodiment, we describe a case in which the power generators 1-1 and 1-2 output direct-current powers, direct-current power is inputted to the load 5-1, and alternating-current power is inputted to the load 5-2. That is, when transmitting power from the power generator 1-2 to the load 5-2, direct-current power is converted into alternating-current power.

Figure 17A:
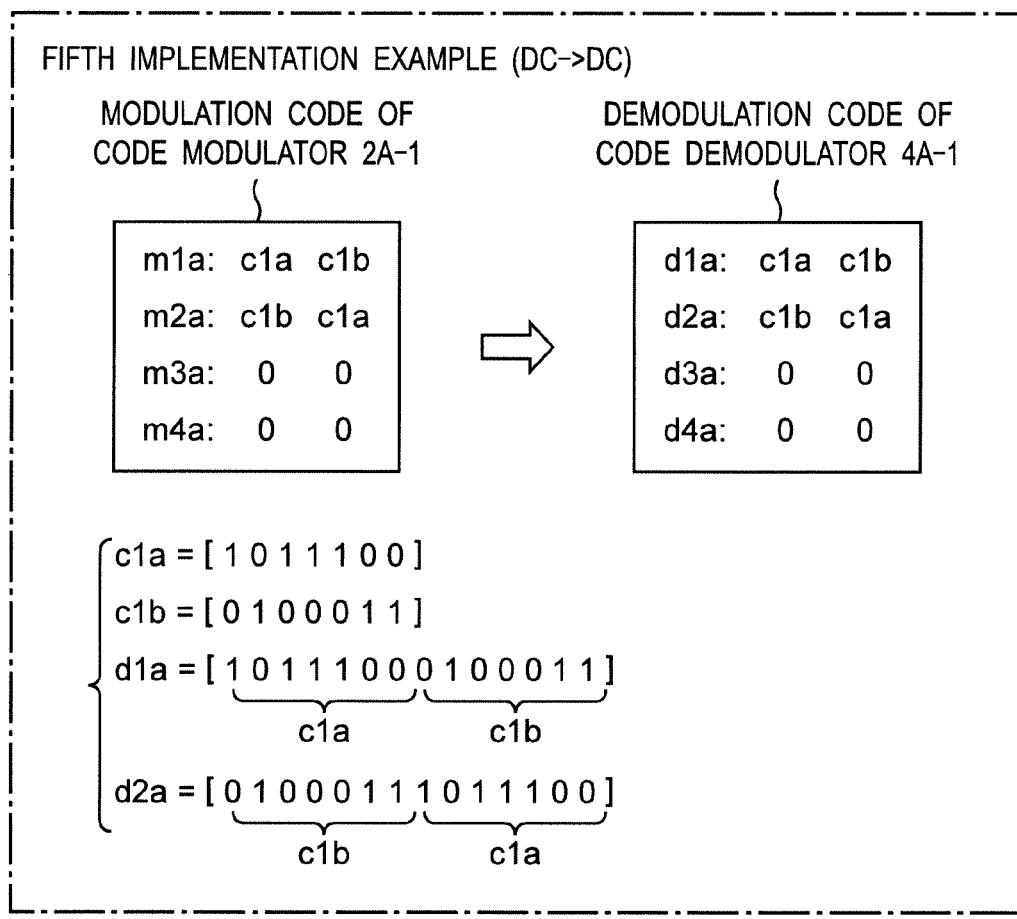
FIG. 17A is a diagram showing an example of a modulation code of a code modulator 2A-1 and a demodulation code of a code demodulator 4A-1 in the power transmission system of FIG. 16, as a fifth implementation example in which direct-current power is transmitted and received.

FIG. 17A is a diagram showing an example of a modulation code of the code modulator 2A-1 and a demodulation code of the code demodulator 4A-1 in the power transmission system of FIG. 16 according to the third embodiment, in which direct-current power is transmitted and received. In addition, FIG. 17B is a diagram showing an example of a modulation code of the code modulator 2A-2 and a demodulation code of the code demodulator 4A-2 in the power transmission system of FIG. 16 according to the third embodiment, in which direct-current power is transmitted and alternating-current power is received.

FIG. 17A shows modulation codes and demodulation codes inputted to the switch elements S1 to S44 of the code modulator 2A-1 and the code demodulator 4A-1. In this case, modulation codes m1a to m4a correspond to the modulation codes m1 to m4 of the code modulation circuit 23A of FIG. 10, respectively, and demodulation codes d1a to d4a correspond to the demodulation codes d1 to d4 of the code demodulation circuit 33A of FIG. 11, respectively. In this case, as described with reference to FIG. 12B, by setting all the code values of the modulation codes m3a and m4a and the demodulation codes d3a and d4a to "0", the switch elements S21 to S24 and S31 to S34 are turned off. In addition, the modulation codes m1a and m2a and the demodulation codes d1a and d2a are generated from the code sequence c1a and the code sequence c1b, as described with reference to FIG. 12B.

Figure 17B:
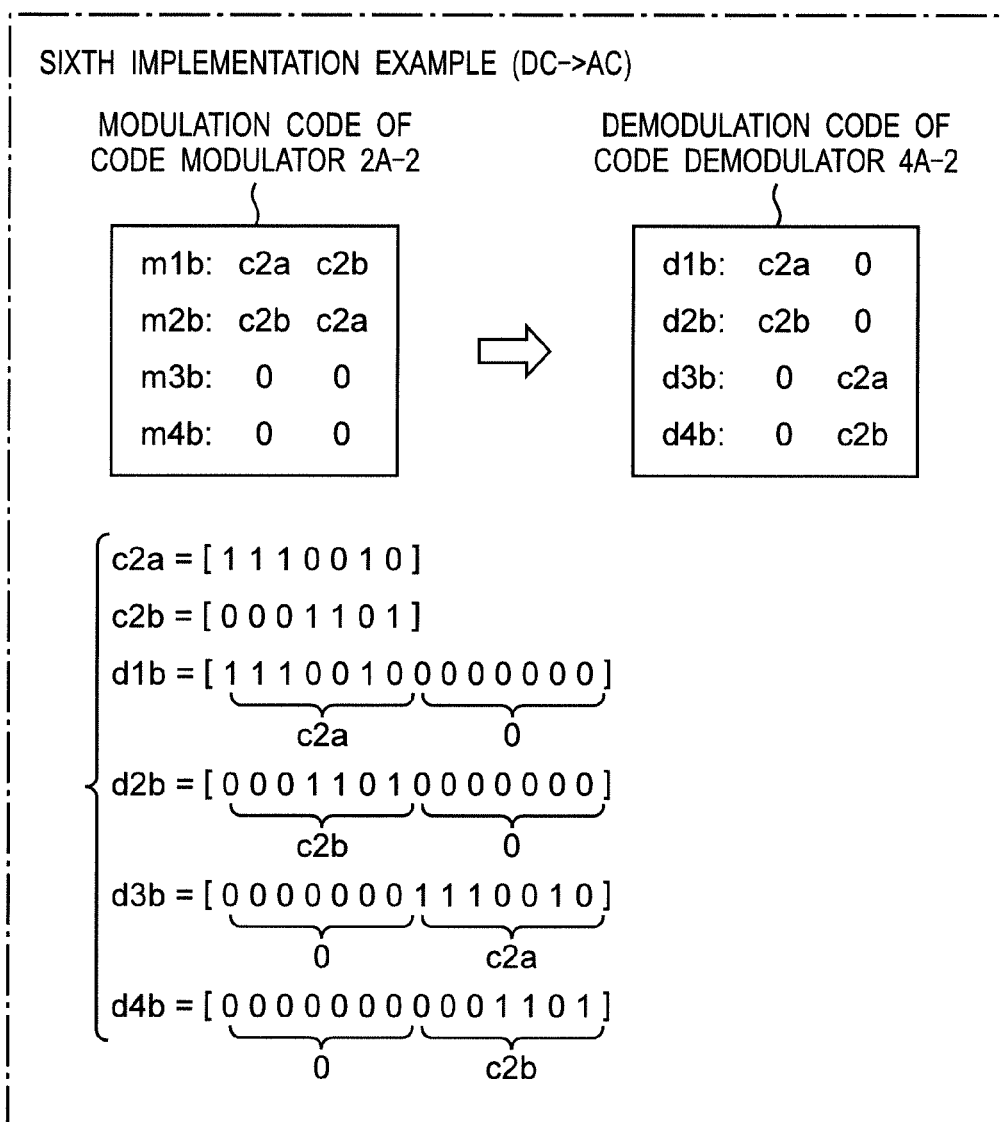
FIG. 17B is a diagram showing an example of a modulation code of the code modulator 2A-2 and a demodulation code of the code demodulator 4A-2 in the power transmission system of FIG. 16, as a sixth implementation example in which direct-current power is transmitted and alternating-current power is received.

Further, FIG. 17B shows modulation codes and demodulation codes inputted to the switch elements S1 to S44 of the code modulator 2A-2 and the code demodulator 4A-2. In this case, modulation codes m1a to m4a correspond to the modulation codes m1 to m4 of the code modulation circuit 23A of FIG. 10, respectively, and demodulation codes d1a to d4a correspond to the demodulation codes d1 to d4 of the code demodulation circuit 33A of FIG. 11, respectively. In this case, by setting all the code values of the modulation codes m3b and m4b to "0", the switch elements S21 to S24 are turned off. In addition, the modulation codes m1b and m2b and the demodulation codes d1b to d4b are generated from the code sequence c2a and the code sequence c2b. The principle of code modulation and code demodulation of currents is similar to that of the first and second embodiments, and therefore, its explanation is omitted here.

Figure 18:
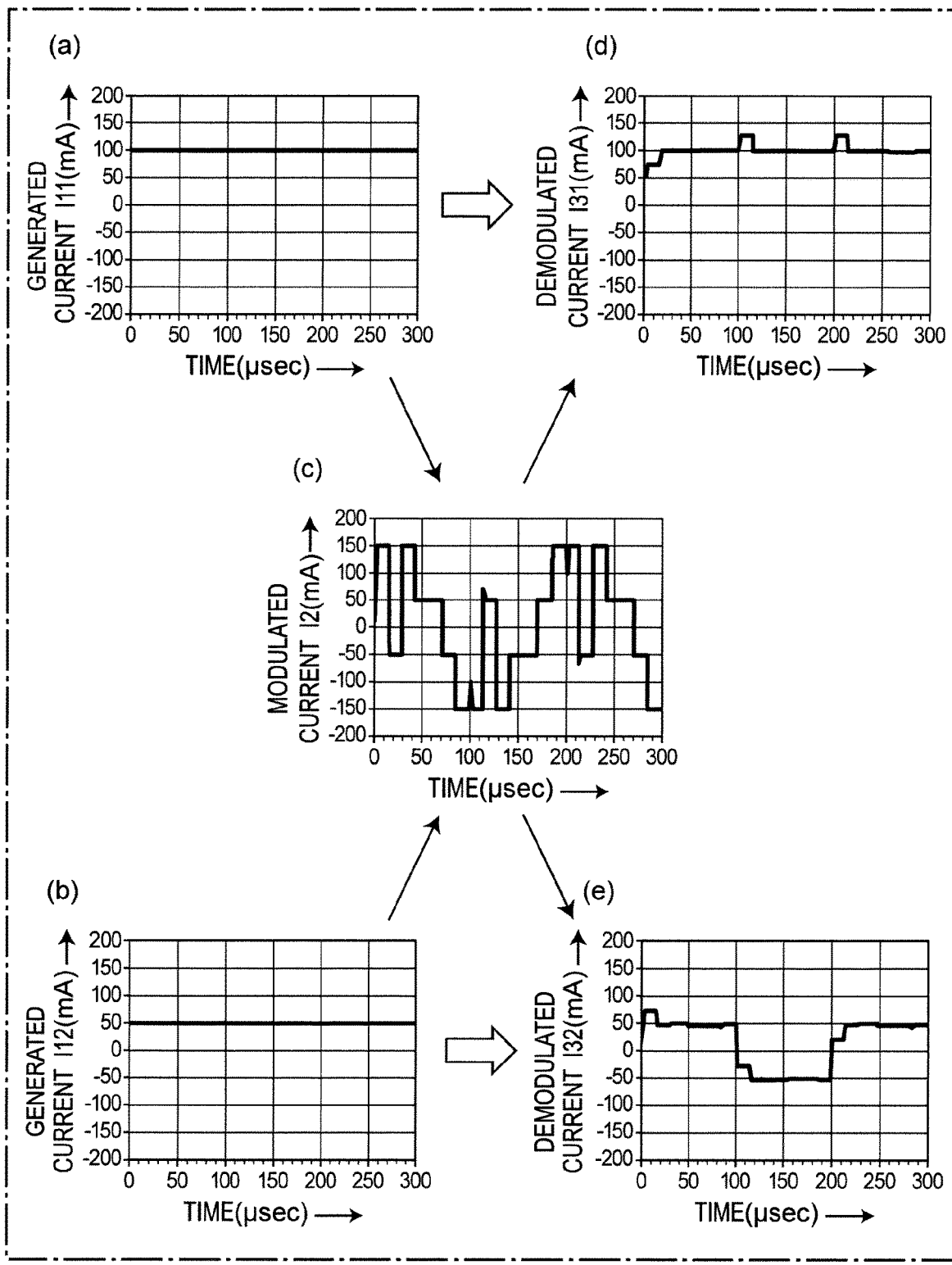
FIG. 18 is a waveform diagram showing exemplary signal waveforms in the power transmission system according to the third embodiment, in which: (a) shows a signal waveform of a generated current I11; (b) shows a signal waveform of a generated current I12; (c) shows a signal waveform of a modulated current I2; (d) shows a signal waveform of a demodulated current I31; and (e) shows a signal waveform of a demodulated current I32.

Now, with reference to FIG. 18, we describe an operation of transmitting powers from the plurality of power generators 1-1 and 1-2 to the plurality of loads 5-1 and 5-2.

FIG. 18 are waveform diagrams, where (a) to (e) show exemplary signal waveforms of the power transmission system according to the third embodiment. In FIG. 18, (a) shows a signal waveform of a generated current I11, (b) shows a signal waveform of a generated current I12, (c) shows a signal waveform of a modulated current I2, (d) shows a signal waveform of a demodulated current I31, and (e) shows a signal waveform of a demodulated current I32.

The code modulator 2A-1 modulates the direct-current generated current I11 by code modulation into an alternating-current code-modulated wave. Similarly, the code modulator 2A-2 modulates the direct-current generated current I12 by code modulation into an alternating-current code-modulated wave. As shown in FIG. 18(c), the code-modulated wave generated by the code modulator 2A-1 and the code-modulated wave generated by the code modulator 2A-2 are transmitted as the combined modulated current I2 via the transmission path 3.

As described above, the code modulators 2A-1 and 2A-2 have an identical configuration, and are configured in a manner similar to that of the code modulator 2A of FIG. 10. In addition, the code demodulators 4A-1 and 4A-2 also have an identical configuration, and are configured in a manner similar to that of the code demodulator 4A of FIG. 11. The difference between the code modulators 2A-1 and 2A-2, and the difference between the code demodulators 4A-1 and 4A-2 reside in the use of different sets of the code sequences c1a and c1b, and the code sequences c2a and c2b. The code modulator 2A-1 and the code demodulator 4A-1 use the code sequences c1a and c1b, and the code modulator 2A-2 and the code demodulator 4A-2 use the code sequences c2a and c2b. In this case, the code sequences c1a and c2a are orthogonal to each other, and therefore, the code sequences c1b and c2b are also orthogonal to each other. In this case, Gold sequences of seven stages are adopted, and different Gold sequences are set to the code sequences c1a and c2a.

The code demodulators 4A-1 and 4A-2 can demodulate the modulated current I2 to extract powers generated by the corresponding code modulators 2A-1 and 2A-2, respectively, by using the orthogonal code sequences c1a and c2a. Accordingly, as shown in FIGS. 18(d) and (e), the generated currents I11 and I12 are inputted to the code modulators 2A-1 and 2A-2, and then, the currents are transmitted as code-modulated waves, and then, the corresponding code demodulators 4A-1 and 4A-2 correctly demodulate and output the demodulated currents I31 and I32. As a result, the demodulated currents I31 and I32 having desired waveforms (direct current or alternating current) and desired magnitudes are supplied to the loads 5-1 and 5-2, respectively.

As described above, according to the present embodiment, it is possible to simultaneously perform two power transmissions via the one transmission path 3 in a multiplexed manner, and separate the transmitted powers from each other, by using the code modulators 2A-1 and 2A-2 and the code demodulators 4A-1 and 4A-2. Accordingly, it is possible to achieve a favorable power transmission system capable of simultaneously transmitting currents of desired magnitudes from the two power generators 1-1 and 1-2 to the two loads 5-1 and 5-2.

By measuring instantaneous powers at the code modulators 2A-1 and 2A-2 or the code demodulators 4A-1 and 4A-2 and comparing the instantaneous powers with the code sequences, it is possible to know which of the power generators 1-1 and 1-2 transmits power, which of the loads receives power, and what amount of power is transmitted. Accordingly, when a plurality of the different power generators 1-1 and 1-2 requiring different generation costs are connected, it is possible to conduct power business with electricity charges dependent on which of the power generators 1-1 and 1-2 transmits power. Alternatively, in case of a system having variable power transmission efficiency depending on which of the power generators 1-1 and 1-2 transmits power and which of the loads 5-1 and 5-2 receives the power, it is possible to achieve optimum power supply by managing and analyzing information on power transmission.

As described above, according to the present embodiment, it is possible to provide the power transmission system capable of efficiently supplying power from the one or more power generators 1-1 and 1-2 to the one or more loads 5-1 and 5-2, by using the code modulators 2A-1 and 2A-2 and the code demodulators 4A-1 and 4A-2.

In the above described embodiment, we indicated the example of the power transmission system including the two power generators 1-1 and 1-2 and the two loads 5-1 and 5-2, but the present disclosure is not limited thereto. It is possible to provide power transmission systems including the one power generator 1-2 and the two or more loads 5-1 and 5-2, or including two or more power generators 1-1 and 1-2 and the two or more loads 5-1 and 5-2. In this case, it is possible to simultaneously perform a number of power transmissions using one transmission path 3. Accordingly, it is possible to reduce costs for installation of the transmission path 3, and reduce costs by reducing the number of transmission paths 3, etc.

In the above described embodiment, we indicated the example in which each of the code modulators 2A-1 and 2A-2 of FIG. 16 is configured as the code modulation circuit 23A of FIG. 10, but the present disclosure is not limited thereto. For example, when the output powers from the power generators 1-1 and 1-2 are direct-current powers, each of the code modulators 2A-1 and 2A-2 may be configured as the code modulation circuit 23 of FIG. 7. In addition, when the input powers to the loads 5-1 and 5-2 are direct-current powers, each of the code demodulators 4A-1 and 4A-2 may be configured as the code demodulation circuit 33 of FIG. 7. In these cases, it is possible to simplify the circuit configurations of the code modulators 2A-1 and 2A-2 and the code demodulators 4A-1 and 4A-2, and accordingly, there are advantageous effects of reducing the number of parts, reducing costs, and reducing size of the apparatuses.

In the third embodiment, we indicated the example of the power transmission system which transmits powers from two power generators each having direct-current output power, to one load having direct-current input power, and to one load having alternating-current input power, but the present disclosure is not limited thereto. The power transmission system may receive powers from any number of power generators each having direct-current output power, and from any number of power generators each having alternating-current output power. In addition, the power transmission system may supply powers to any number of loads each having direct-current input power, and to any number of loads each having alternating-current input power.

Photovoltaic power generation, which generates most of natural energy, generates direct-current power. On the other hand, wind power generation and geothermal power generation generate alternating-current power. In this case, since it is not desirable that both direct-current power supplies and alternating-current power supplies are connected to the same power network, according to conventional power transmission systems, all power generators (power supplies) and loads should be of only direct current or only alternating current.

On the other hand, according to the power transmission system according to the present embodiment, by using code modulation and code demodulation, it is possible simultaneously transmit powers from a direct-current power supply to a direct-current load, from a direct-current power supply to an alternating-current load, from an alternating-current power supply to a direct-current load, and from an alternating-current power supply to an alternating-current load, via one transmission path.

Thus, according to the first to third embodiments, it is possible to provide a favorable power transmission system capable of correctly perform code modulation and code demodulation of power, and further, capable of simultaneously performing a plurality of power transmissions in a multiplexed manner via one transmission path.

Fourth Embodiment

Figure 19:
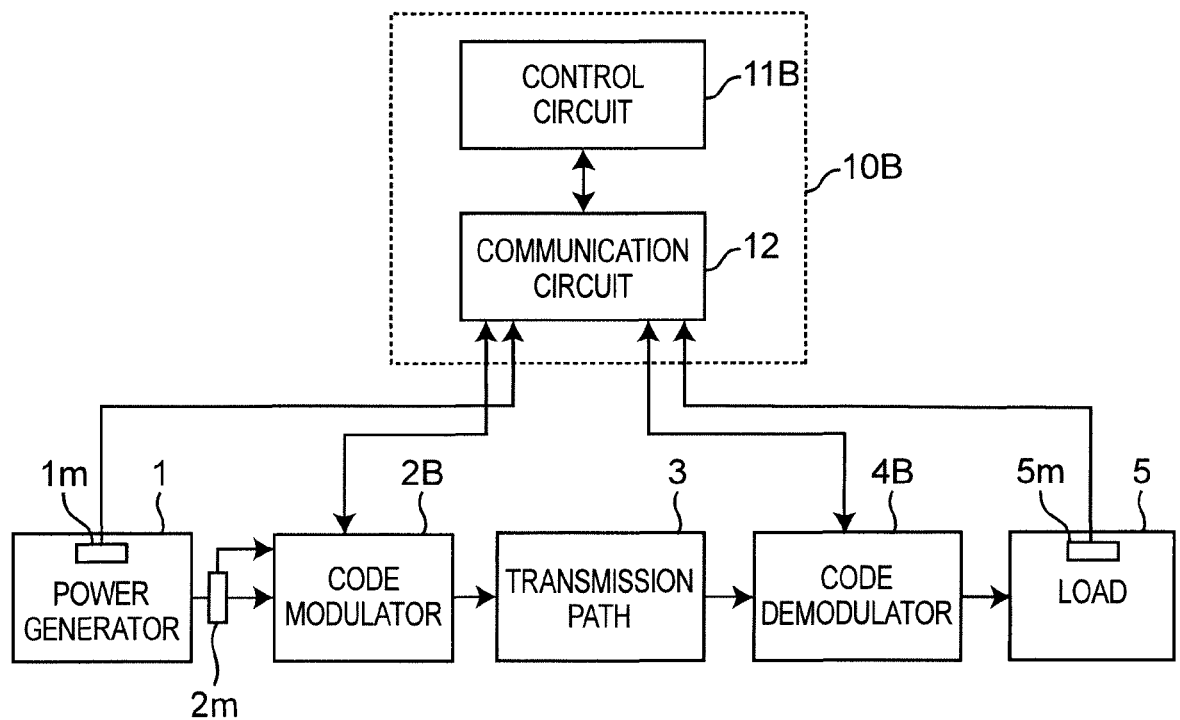
FIG. 19 is a block diagram showing a configuration of a power transmission system according to a fourth embodiment.

FIG. 19 is a block diagram showing a configuration of a power transmission system according to a fourth embodiment. Referring to FIG. 19, the power transmission system according to the fourth embodiment is provided with a power generator 1, a code modulator 2B, a transmission path 3, a code demodulator 4B, a load 5, and a controller 10B.

The controller 10B is provided with a control circuit 11B and a communication circuit 12. The control circuit 11B communicates with the code modulator 2B and the code demodulator 4B via the communication circuit 12, and controls operations of the code modulator 2B and the code demodulator 4B. The control circuit 11B controls the code modulator 2B and the code demodulator 4B in a manner similar to that of the control circuit of the controller according to the first and second embodiments, and further executes a process for synchronizing the code modulator 2B with the code demodulator 4B.

Figure 20:
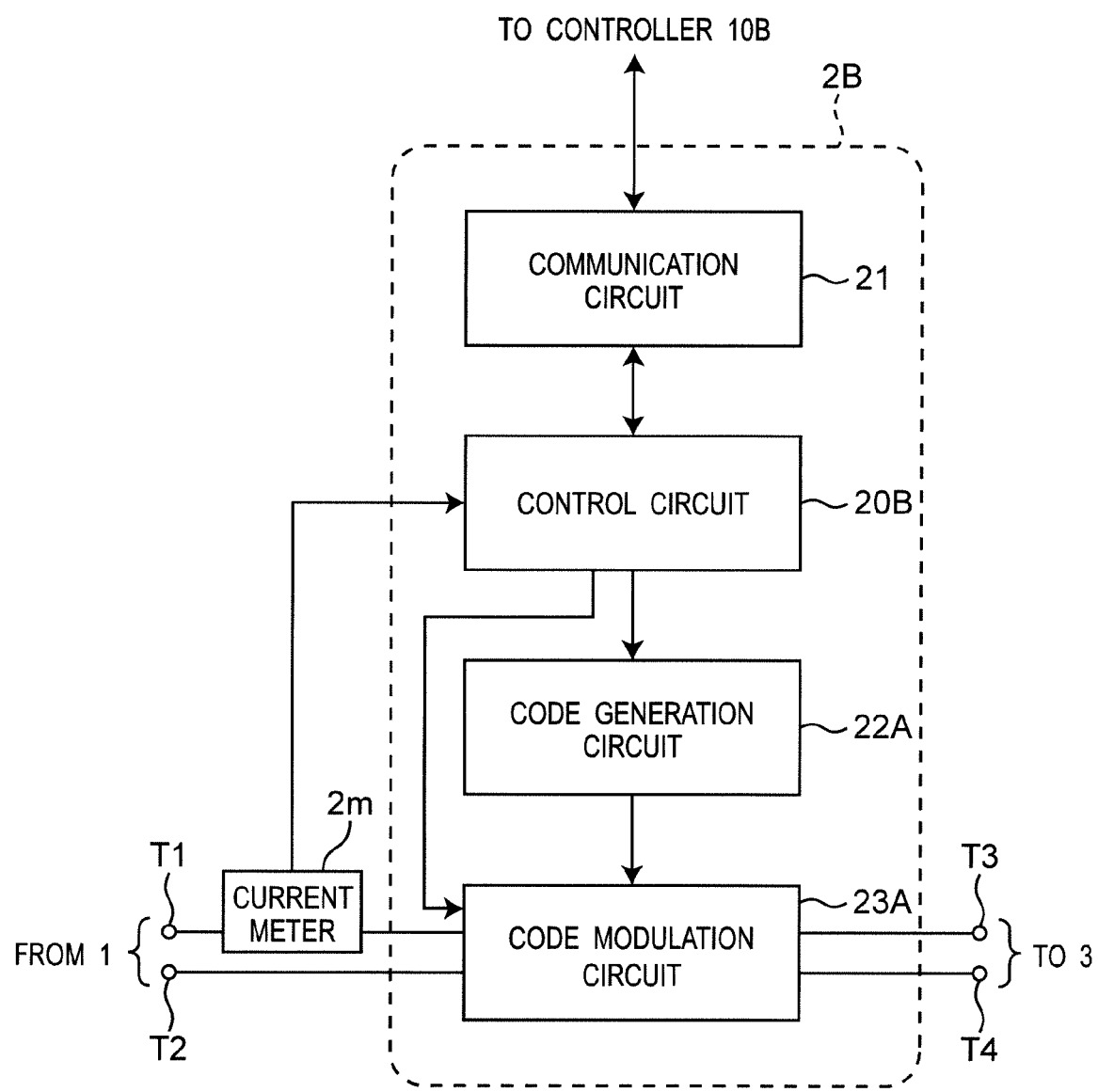
FIG. 20 is a block diagram showing a configuration of a code modulator 2B of FIG. 19.

FIG. 20 is a block diagram showing a configuration of the code modulator 2B of FIG. 19. The code modulator 2B of FIG. 20 is provided with a control circuit 20B, a communication circuit 21, a code generation circuit 22A, a code modulation circuit 23A, and a current meter 2m. The communication circuit 21, the code generation circuit 22A, and the code modulation circuit 23A of FIG. 20 are configured in a manner similar to that of the corresponding components of the code modulator according to the second embodiment. The current meter 2m is a measuring device which measures a current value of a generated current (input power inputted to the code modulator 2B). The control circuit 20B controls the code generation circuit 22A and the code modulation circuit 23A in a manner similar to that of the control circuit of the code modulator according to the second embodiment, and further executes a process for synchronizing the code modulator 2B with the code demodulator 4B.

Figure 21:
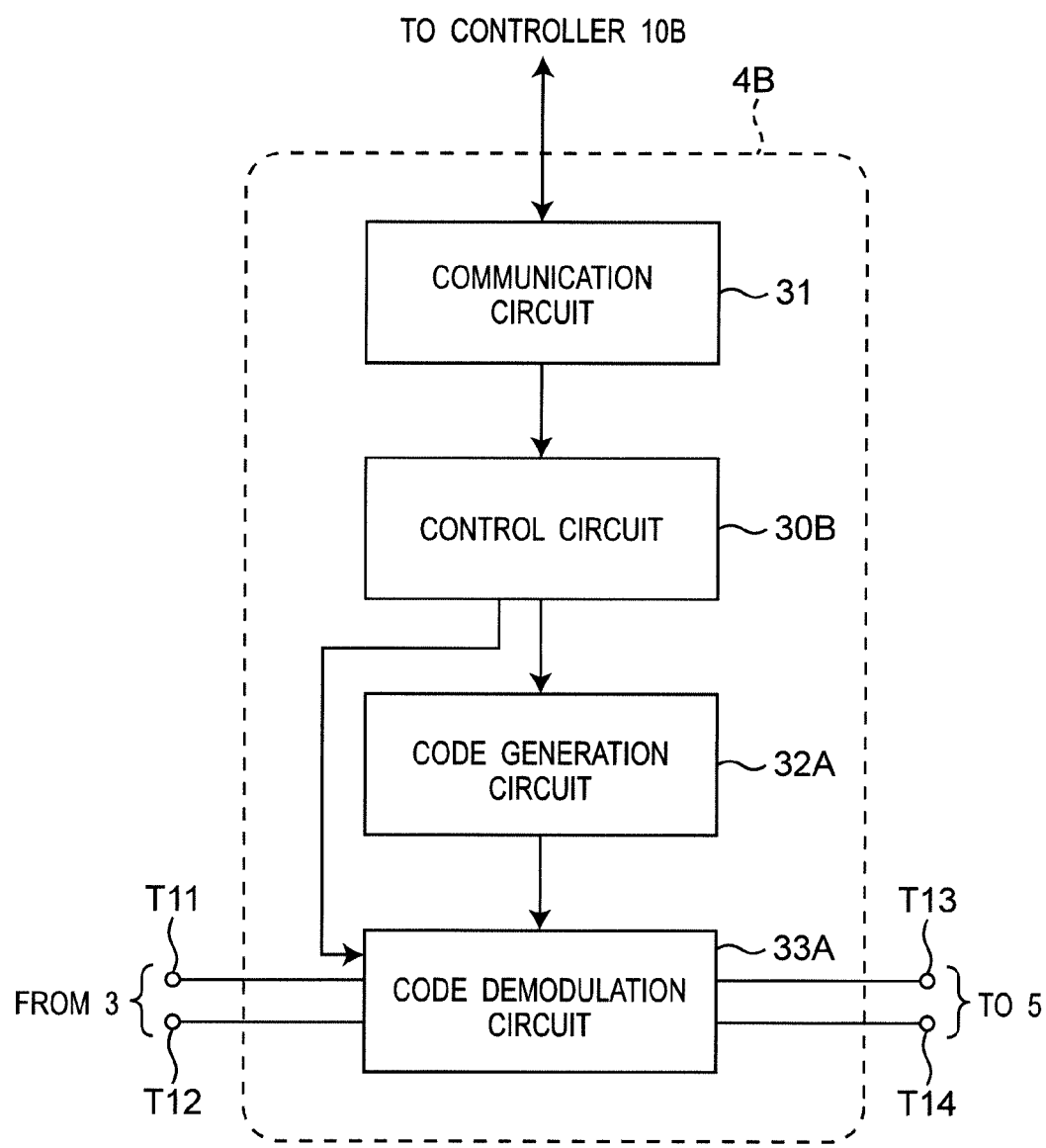
FIG. 21 is a block diagram showing a configuration of a code demodulator 4B of FIG. 19.

FIG. 21 is a block diagram showing a configuration of the code demodulator 4B of FIG. 19. The code demodulator 4B of FIG. 21 is provided with a control circuit 30B, a communication circuit 31, a code generation circuit 32A, and a code demodulation circuit 33A. The communication circuit 31, the code generation circuit 32A, and the code demodulation circuit 33A of FIG. 21 are configured in a manner similar to that of the corresponding components of the code demodulator according to the second embodiment. The control circuit 30B controls the code generation circuit 32A and the code demodulation circuit 33A in a manner similar to that of the control circuit of the code demodulator according to the second embodiment, and further executes a process for synchronizing the code modulator 2B with the code demodulator 4B.

In order to synchronize the code modulator 2B with the code demodulator 4B, at first, the control circuit 20B of the code modulator 2B synchronizes operation of the code modulation circuit 23A with a phase of a generated current. To this end, the control circuit 20B measures a current value of the generated current using the current meter 2m, and determines an operation mode of the code modulation circuit 23A based on the measured current value. On the other hand, the control circuit 30B of the code demodulator 4B can not determine a phase of a demodulated current based on a modulated current received via the transmission path 3. Accordingly, the code modulator 2B transmits information about the current value of the generated current to the code demodulator 4B via the controller 10B. Subsequently, the control circuit 30B of the code demodulator 4B determines an operation mode of the code demodulation circuit 33A based on the received information about the current value of the generated current.

Figure 22:
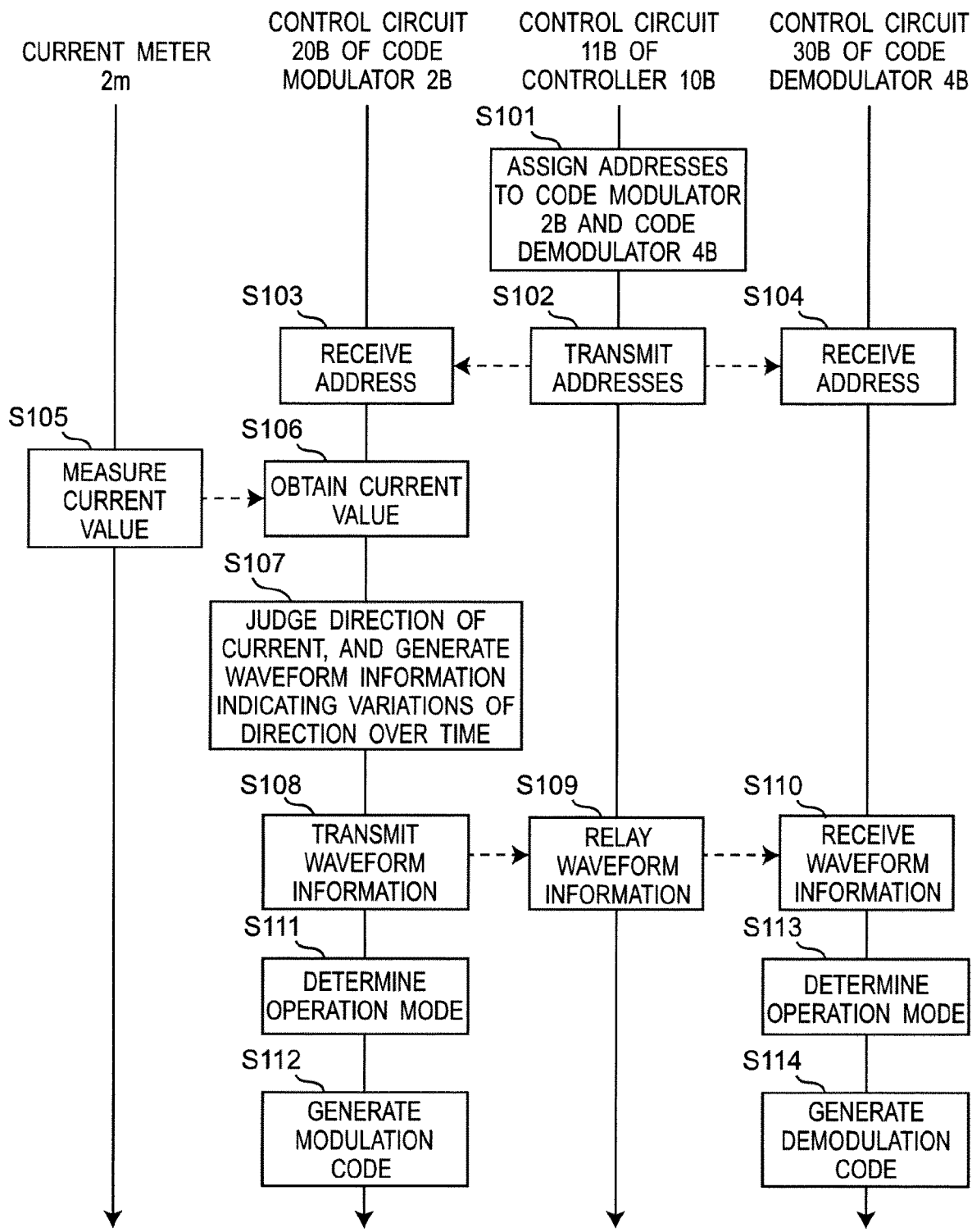
FIG. 22 is a sequence diagram showing generation of a modulation code and a demodulation code in the power transmission system of FIG. 19.

FIG. 22 is a sequence diagram showing generation of a modulation code and a demodulation code in the power transmission system of FIG. 19.

In step S101, the control circuit 11B of the controller 10B assigns addresses to the code modulator 2B and the code demodulator 4B, respectively, to pair the code modulator 2B with the code demodulator 4B between which power is transmitted. In step S102, the control circuit 11B of the controller 10B transmits the addresses to the code modulator 2B and the code demodulator 4B via the communication circuit 12, respectively. In step S103, the control circuit 20B of the code modulator 2B receives the address via the communication circuit 21. In step S104, the control circuit 30B of the code demodulator 4B receives the address via the communication circuit 31.

In step S105, the current meter 2m measures the current value of the generated current. In step S106, the control circuit 20B of the code modulator 2B obtains the current value from the current meter 2m. The control circuit 20B may directly process an analog current value, or may convert the analog current value to a digital value for processing. In step S107, the control circuit 20B judges a direction (i.e., polarity) of the current, and generates waveform information indicating variations of direction of the generated current over time. For example, the control circuit 20B generates the waveform information indicating the variations of the direction of the generated current over time, by detecting moments at which the direction of the current value measured by the current meter 2m changes. In step S108, the control circuit 20B of the code modulator 2B transmits the waveform information to the controller 10B via the communication circuit 21. In step S109, the control circuit 11B of the controller 10B relays the waveform information received from the code modulator 2B to transmit to the code demodulator 4B, via the communication circuit 12. In step S110, the control circuit 30B of the code demodulator 4B receives the waveform information via the communication circuit 31.

In step S111, the control circuit 20B of the code modulator 2B determines an operation mode of the code modulation circuit 23A based on the waveform information. In step S112, the control circuit 20B generates a modulation code using the code generation circuit 22A.

In step S113, the control circuit 30B of the code demodulator 4B determines an operation mode of the code demodulation circuit 33A based on the waveform information. In step S114, the control circuit 30B generates a demodulation code using the code generation circuit 32A.

Subsequently, the code modulator 2B and the code demodulator 4B transmit and receive power using the generated modulation code and demodulation code, respectively.

According to the operation of FIG. 22, the code modulator 2B and the code demodulator 4B can determine appropriate operation modes of the code modulator 2B and the code demodulator 4B in synchronization with the phase of the generated current, and surely synchronize with each other.

The control circuit 20B of the code modulator 2B may use either a normal comparator or a hysteresis comparator for judging the direction of the current in step S107.

If the cycle of the generated current is fixed, then it is not necessary to judge the direction of the current for each cycle. For example, the waveform information indicating the variations of the direction of the generated current over time may be generated during initialization of the code modulator 2B.

On the other hand, when the cycle of the generated current varies, for example, when a motor's regenerative current is used as a power supply, the following problems may arise. As described above, the current meter 2m measures the current value of the generated current, the control circuit 20B of the code modulator 2B generates the waveform information, and thereafter, the code modulator 2B transmits the waveform information to the code demodulator 4B via the controller 10B. In this case, the control circuit 30B of the code demodulator 4B may be unable to determine a correct operation mode due to a delay of signal transmission. When a motor's regenerative current is used as power supply, the delay should be sequentially compensated using, for example, hysteresis control. The control circuit 20B generates waveform information indicating the variations of the direction of the generated current over time, not by detecting moments at which of the direction of the current value changes, but by predicting moments at which the direction of the generated current changes, based on the current value.

Figure 23:
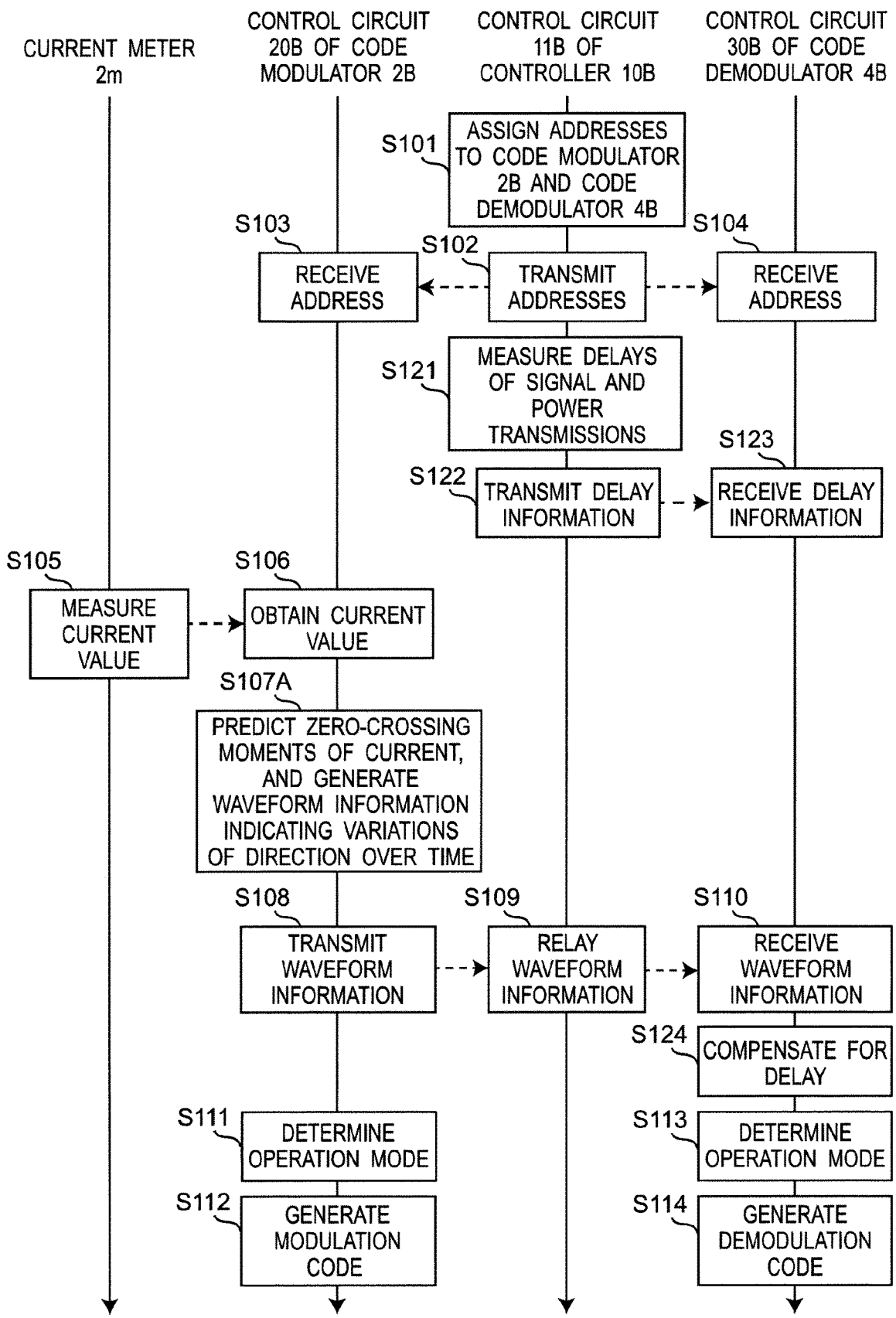
FIG. 23 is a sequence diagram showing a modified embodiment of generation of a modulation code and a demodulation code in the power transmission system of FIG. 19.

FIG. 23 is a sequence diagram showing a modified embodiment of generation of a modulation code and a demodulation code in the power transmission system of FIG. 19. Steps S101 to S106 and S108 to S114 of FIG. 23 are similar to the corresponding steps of FIG. 22.

In step S121, the control circuit 11B of the controller 10B measures a delay of signal transmission and a delay of power transmission. In step S122, the control circuit 11B transmits delay information to the code demodulator 4B via the communication circuit 12. In step S123, the control circuit 30B of the code demodulator 4B receives the delay information from the communication circuit 31.

The control circuit 20B of the code modulator 2B executes step S107A, instead of step S107 of FIG. 22. In step S107A, the control circuit 20B predicts zero-crossing moments of the current, and generates waveform information indicating variations of direction of the generated current over time.

In step S124, the control circuit 30B of the code demodulator 4B compensates for a delay based on the delay information, before determining an operation mode of a code demodulation circuit 33A. For example, the control circuit 30B compensates for the delay so as to reduce the delay of the code demodulation circuit 33A from a code modulation circuit 23A.

According to the operation of FIG. 23, the code modulator 2B and the code demodulator 4B can determine appropriate operation modes of the code modulator 2B and the code demodulator 4B in synchronization with the phase of the generated current, and surely synchronize with each other.

The current meter 2m is not limited to be provided outside the code modulator 2B as shown in FIG. 19, but may be integrated with or built in the code modulator 2B.

It is not essential that the code modulator 2B transmits the waveform information to the code demodulator 4B as shown in FIGS. 22 and 23. Alternatively, the control circuit 20B of code modulator 2B may determine the operation mode of the code demodulation circuit 33A of the code demodulator 4B, and the code modulator 2B notifies the code demodulator 4B of the determined operation mode.

Fifth Embodiment

A power transmission system according to a fifth embodiment is configured in a manner similar to that of the power transmission system of FIG. 19. According to the fourth embodiment, the code modulator 2B generates the waveform information. On the other hand, according to the fifth embodiment, the controller 10B generates the waveform information.

Figure 24:
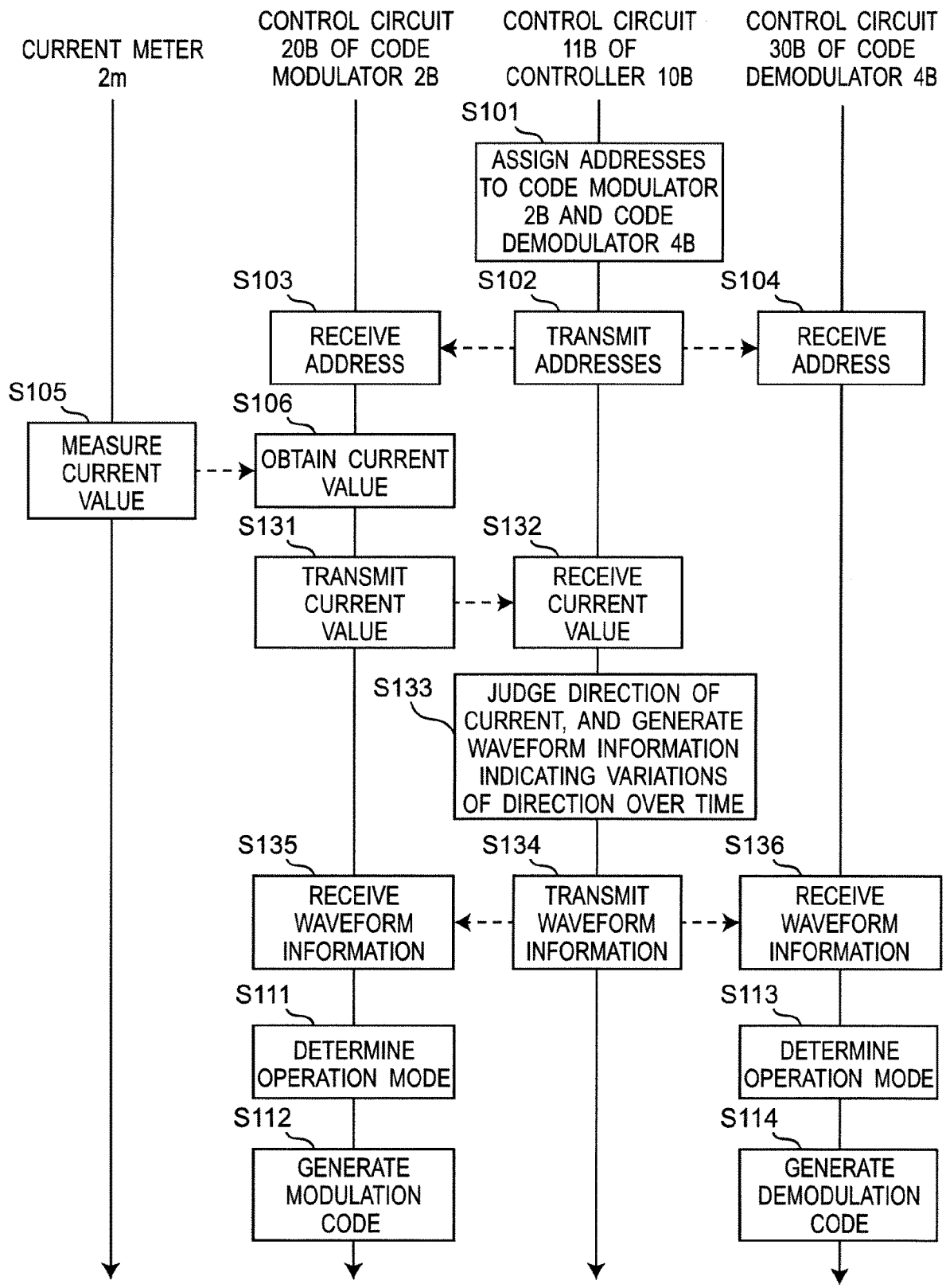
FIG. 24 is a sequence diagram showing generation of a modulation code and a demodulation code in a power transmission system according to a fifth embodiment.

FIG. 24 is a sequence diagram showing generation of a modulation code and a demodulation code in the power transmission system according to the fifth embodiment. Steps S101 to S106 and S111 to S114 of FIG. 24 are similar to the corresponding steps of FIG. 22.

In step S131, a control circuit 20B of a code modulator 2B transmits a current value to the controller 10B via a communication circuit 21. In step S132, a control circuit 11B of the controller 10B receives the current value via a communication circuit 12. In step S133, the control circuit 11B judges a direction of the current, and generates waveform information indicating variations of direction of the generated current over time, in a manner similar to that of step S107 of FIG. 22. In step S134, the control circuit 11B transmits waveform information to the code modulator 2B and a code demodulator 4B via the communication circuit 12. In step S135, the control circuit 20B of the code modulator 2B receives the waveform information via the communication circuit 21. In step S136, a control circuit 30B of the code demodulator 4B receives the waveform information via a communication circuit 31.

According to the operation of FIG. 24, the code modulator 2B and the code demodulator 4B can determine appropriate operation modes of the code modulator 2B and the code demodulator 4B in synchronization with the phase of the generated current, and surely synchronize with each other.

Figure 25:
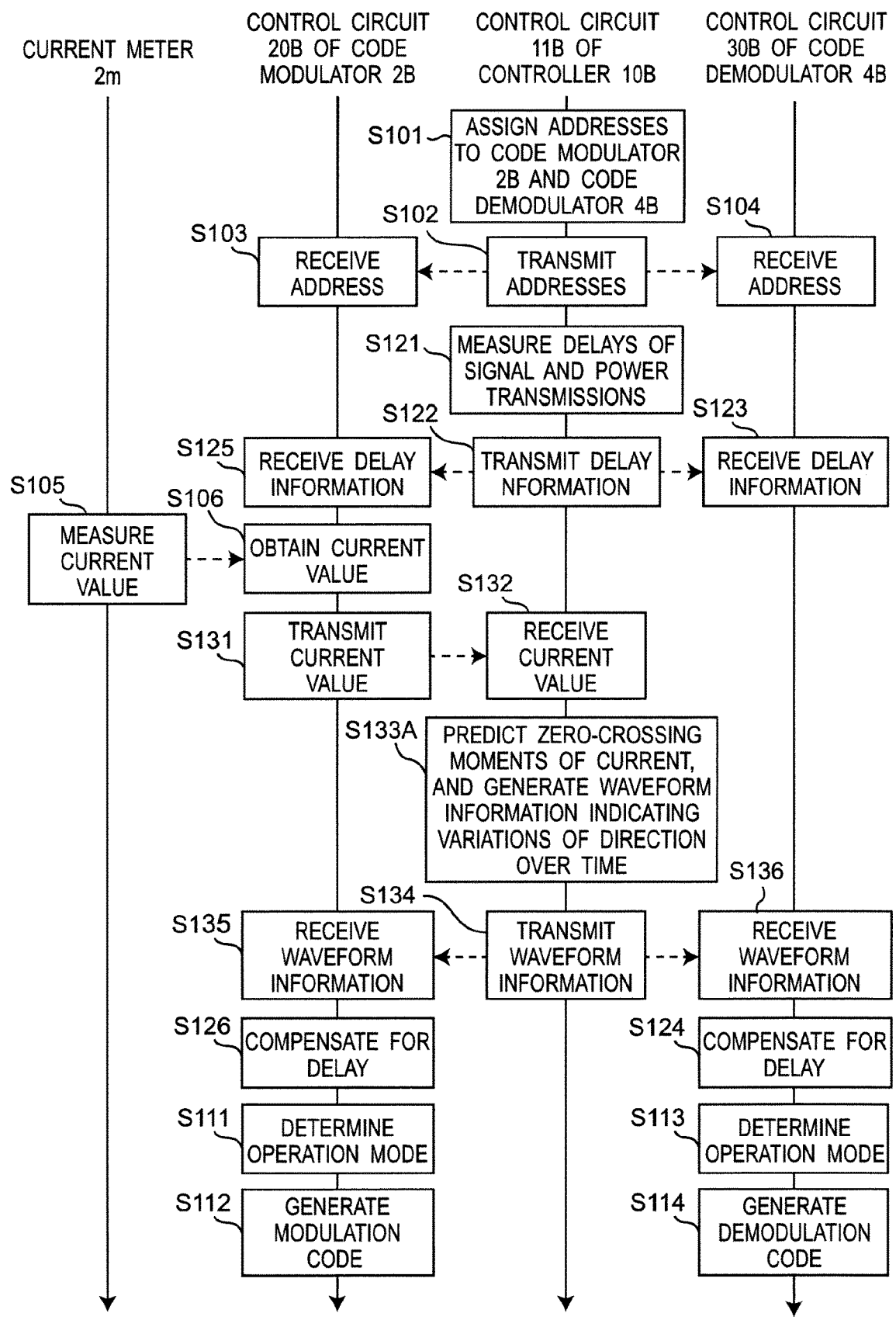
FIG. 25 is a sequence diagram showing generation of a modulation code and a demodulation code in a power transmission system according to a modified embodiment of the fifth embodiment.

FIG. 25 is a sequence diagram showing generation of a modulation code and a demodulation code in a power transmission system according to a modified embodiment of the fifth embodiment. Steps S101 to S106, S111 to S114, S131 to S132, and S134 to S136 of FIG. 25 are similar to the corresponding steps of FIG. 24.

In step S121, the control circuit 11B of the controller 10B measures a delay of signal transmission and a delay of power transmission. In step S122, the control circuit 11B transmits delay information to the code modulator 2B and the code demodulator 4B via the communication circuit 12. In step S125, the control circuit 20B of the code modulator 2B receives the delay information via the communication circuit 21. In step S123, the control circuit 30B of the code demodulator 4B receives the delay information via the communication circuit 31.

The control circuit 11B of the controller 10B executes step S133A, instead of step S133 of FIG. 24. In step S133A, the control circuit 11B predicts zero-crossing moments of the current, and generates waveform information indicating variations of direction of the generated current over time.

In step S126, the control circuit 20B of the code modulator 2B compensates for a delay based on the delay information, before determining an operation mode of a code modulation circuit 23A. In step S124, the control circuit 30B of the code demodulator 4B compensates for a delay based on the delay information, before determining an operation mode of a code demodulation circuit 33A.

According to the operation of FIG. 25, the code modulator 2B and the code demodulator 4B can determine appropriate operation modes of the code modulator 2B and the code demodulator 4B in synchronization with the phase of the generated current, and surely synchronize with each other.

In the power transmission system according to the fifth embodiment, the current meter 2m may be directly connected to the controller 10B, instead of being connected to the code modulator 2B.

Sixth Embodiment

A power transmission system according to a sixth embodiment is configured in a manner similar to that of the power transmission system of FIG. 19. According to the fourth embodiment, the code modulator 2B generates the waveform information, and according to the fifth embodiment, the controller 10B generates the waveform information. On the other hand, according to the sixth embodiment, both the code modulator 2B and the code demodulator 4B generate the wave information.

Figure 26:
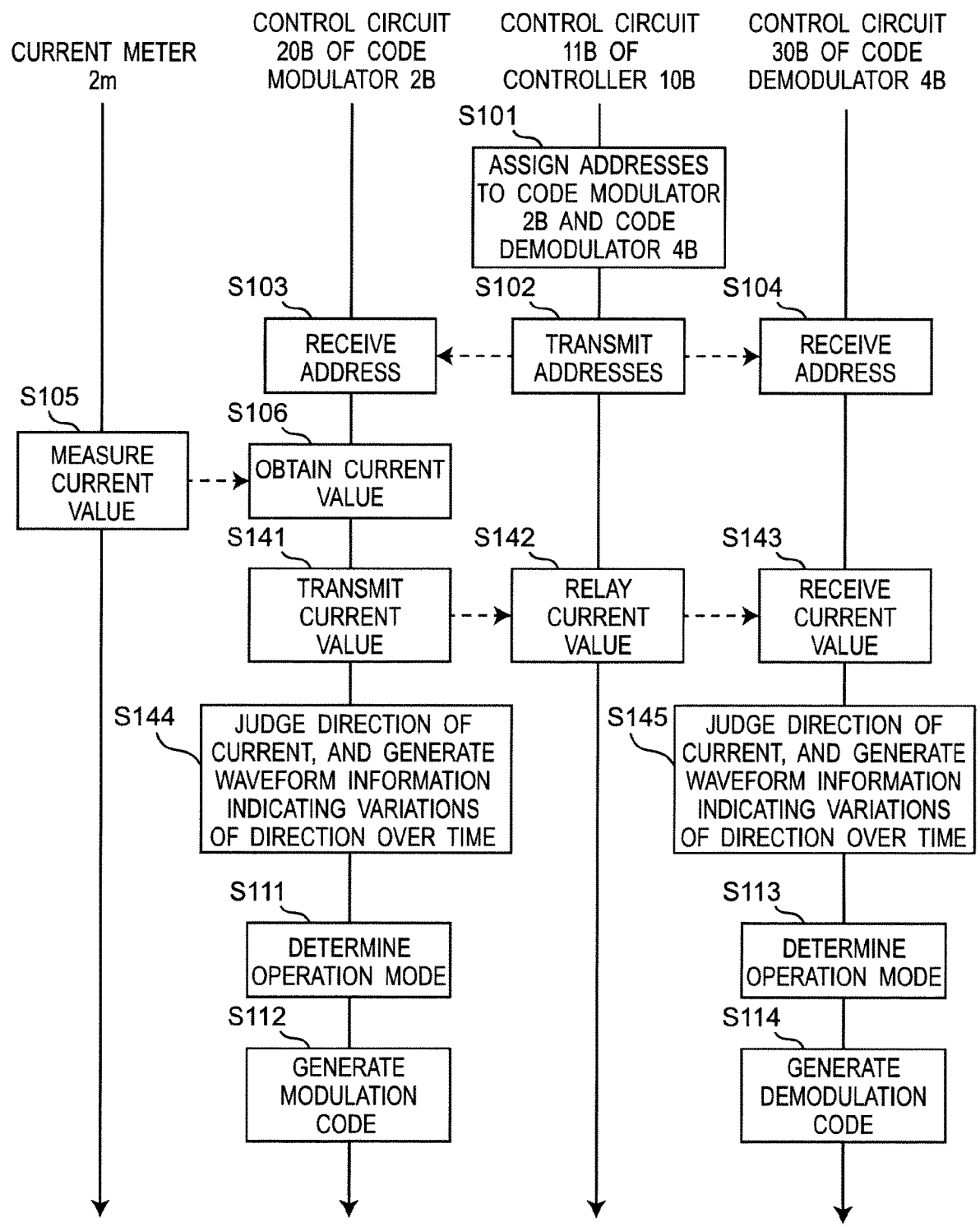
FIG. 26 is a sequence diagram showing generation of a modulation code and a demodulation code in a power transmission system according to a sixth embodiment.

FIG. 26 is a sequence diagram showing generation of a modulation code and a demodulation code in the power transmission system according to the sixth embodiment. Steps S101 to S106 and S111 to S114 of FIG. 26 are similar to the corresponding steps of FIG. 22.

In step S141, a control circuit 20B of the code modulator 2B transmits a current value via a communication circuit 21. In step S142, a control circuit 11B of a controller 10B relays the current value received from the code modulator 2B to transmit to the code demodulator 4B, via a communication circuit 12. In step S143, a control circuit 30B of the code demodulator 4B receives the current value via a communication circuit 31.

In step S144, the control circuit 20B of the code modulator 2B judges a direction of the current, and generates waveform information indicating variations of direction of the generated current over time.

In step S145, the control circuit 30B of the code demodulator 4B judges a direction of the current, and generates waveform information indicating variations of direction of the generated current over time.

According to the operation of FIG. 26, the code modulator 2B and the code demodulator 4B can determine appropriate operation modes of the code modulator 2B and the code demodulator 4B in synchronization with the phase of the generated current, and surely synchronize with each other.

Figure 27:
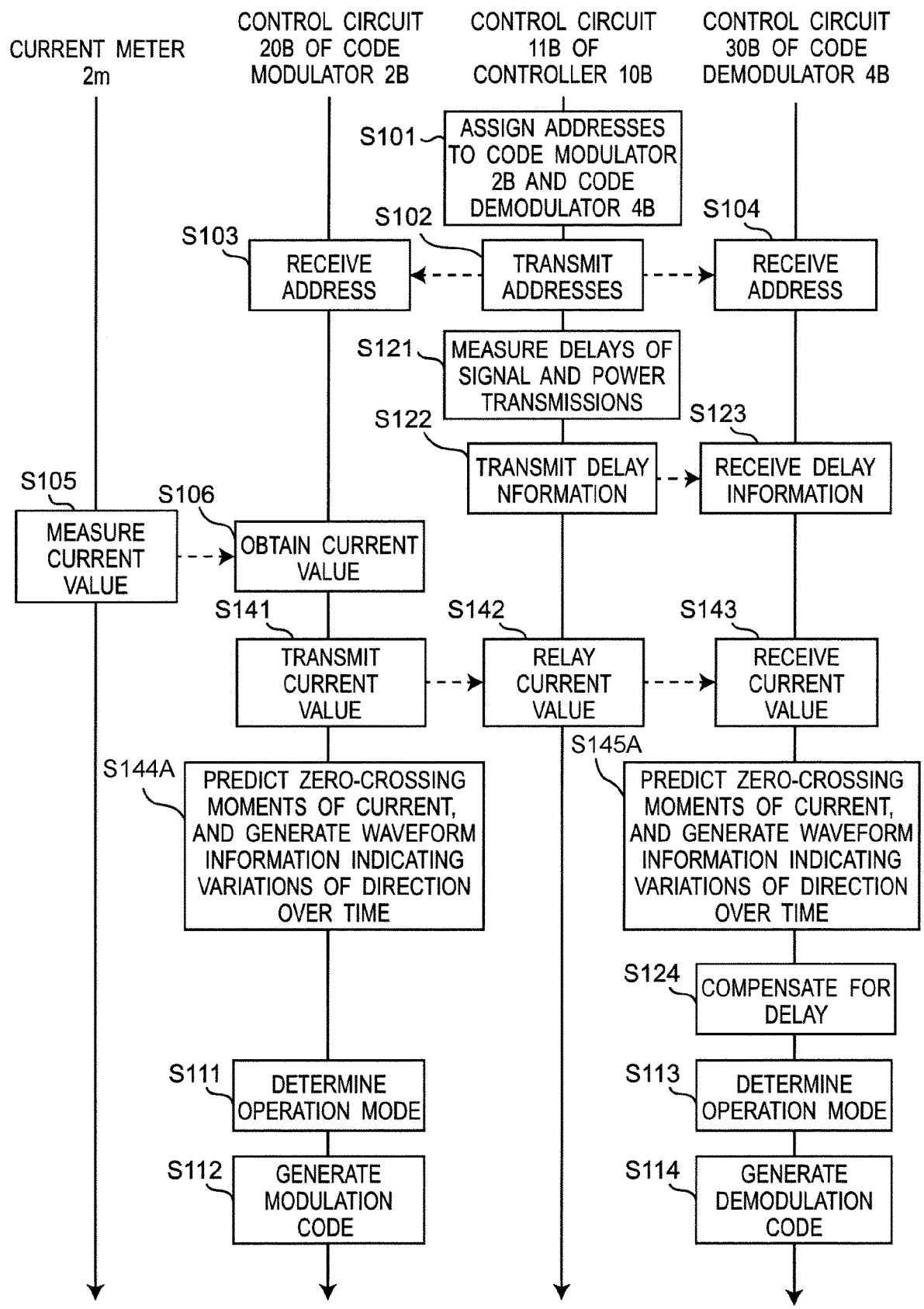
FIG. 27 is a sequence diagram showing generation of a modulation code and a demodulation code in a power transmission system according to a modified embodiment of the sixth embodiment.

FIG. 27 is a sequence diagram showing generation of a modulation code and a demodulation code in a power transmission system according to a modified embodiment of the sixth embodiment. Steps S101 to S106, S111 to S114, and S141 to S143 of FIG. 27 are similar to the corresponding steps of FIG. 26, and steps S121 to S124 of FIG. 27 are similar to the corresponding steps of FIG. 23. A control circuit 20B of the code modulator 2B executes step S144A, instead of step S144 of FIG. 26. In step S144A, the control circuit 20B predicts zero-crossing moments of the current, and generates waveform information indicating variations of phase of the generated current over time. A control circuit 30B of the code demodulator 4B executes step S145A, instead of step S145 of FIG. 26. In step S145A, the control circuit 30B predicts zero-crossing moments of the current, and generates waveform information indicating variations of phase of the generated current over time.

According to the operation of FIG. 27, the code modulator 2B and the code demodulator 4B can determine appropriate operation modes of the code modulator 2B and the code demodulator 4B in synchronization with the phase of the generated current, and surely synchronize with each other.

Seventh Embodiment

A power transmission system according to a seventh embodiment is configured in a manner similar to that of the power transmission system of FIG. 19. When a generated current has a fixed cycle, a phase of the current may be determined, instead of detecting or predicting moments at which the direction of a current value changes.

Figure 28:
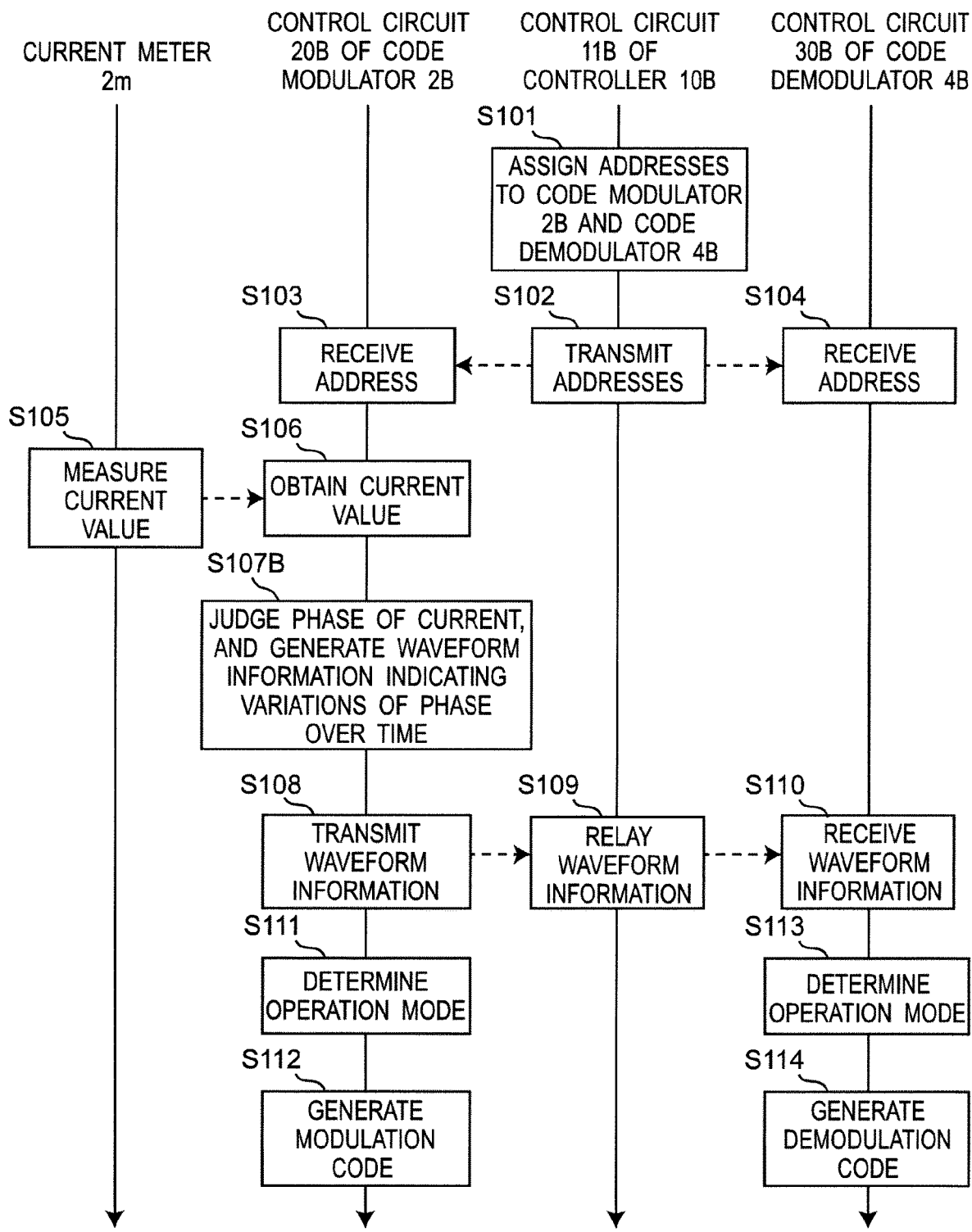
FIG. 28 is a sequence diagram showing generation of a modulation code and a demodulation code in a power transmission system according to a seventh embodiment.

FIG. 28 is a sequence diagram showing generation of a modulation code and a demodulation code in the power transmission system according to the seventh embodiment. Steps S101 to S106 and S111 to S114 of FIG. 28 are similar to the corresponding steps of FIG. 22.

A control circuit 20B of a code modulator 2B executes step S107B, instead of step S107 of FIG. 22. In step S107B, the control circuit 20B judges a phase of a current, and generates waveform information indicating variations of phase of a generated current over time.

According to the operation of FIG. 28, the code modulator 2B and the code demodulator 4B can determine appropriate operation modes of the code modulator 2B and the code demodulator 4B in synchronization with the phase of the generated current, and surely synchronize with each other.

Figure 29:
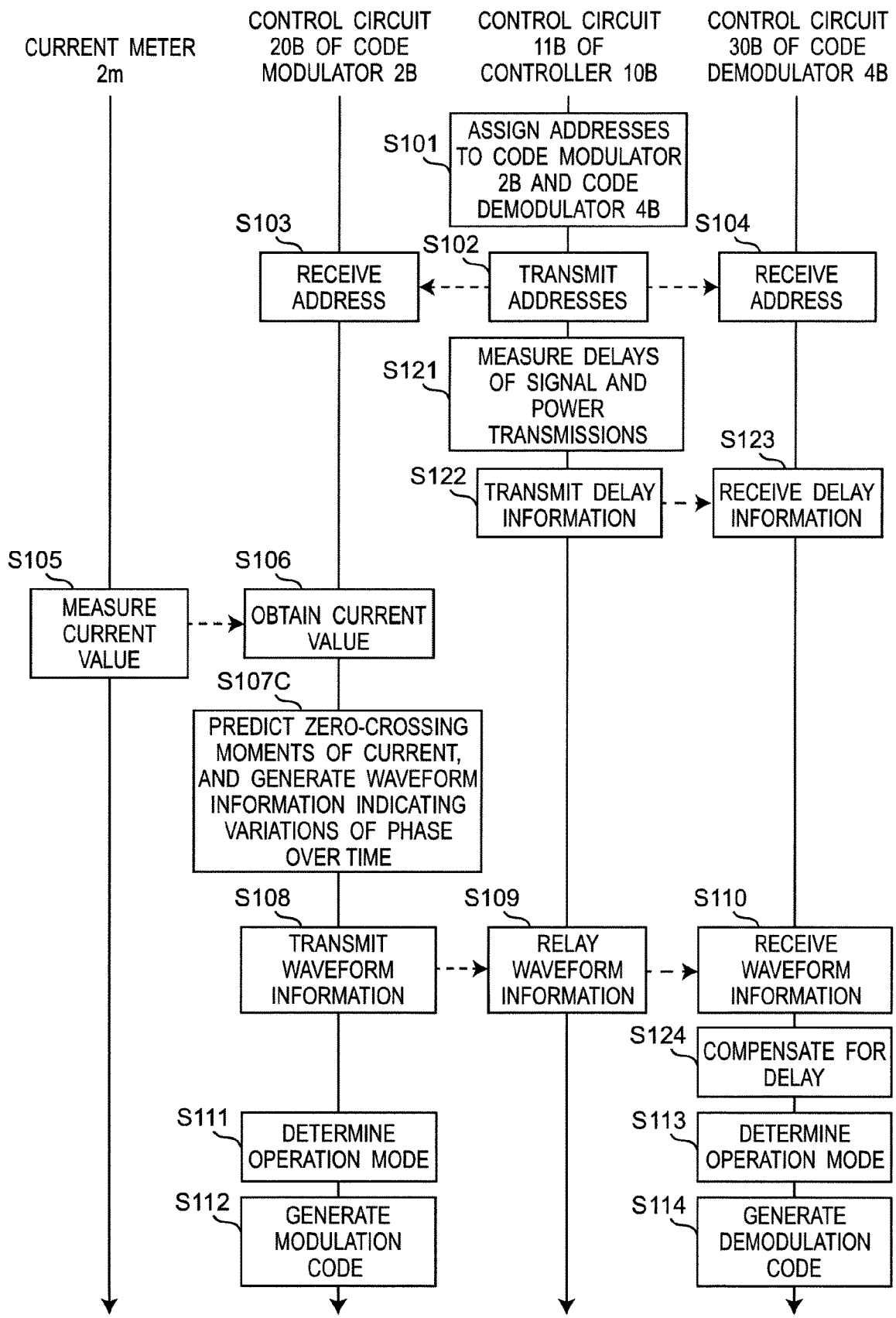
FIG. 29 is a sequence diagram showing generation of a modulation code and a demodulation code in a power transmission system according to a modified embodiment of the seventh embodiment.

FIG. 29 is a sequence diagram showing generation of a modulation code and a demodulation code in a power transmission system according to a modified embodiment of the seventh embodiment. Steps S101 to S106 and S108 to S114 of FIG. 29 are similar to the corresponding steps of FIG. 28.

In step S121, a control circuit 11B of a controller 10B measures a delay of signal transmission and a delay of power transmission. In step S122, the control circuit 11B transmits delay information to the code demodulator 4B via a communication circuit 12. In step S123, the control circuit 30B of the code demodulator 4B receives the delay information via the communication circuit 31.

A control circuit 20B of the code modulator 2B executes step S107C, instead of step S107B of FIG. 28. In step S107C, the control circuit 20B predicts zero-crossing moments of the current, and generates waveform information indicating variations of phase of the generated current over time.

In step S124, the control circuit 30B of the code demodulator 4B compensates for a delay based on the delay information, before determining an operation mode of a code demodulation circuit 33A.

According to the operation of FIG. 29, the code modulator 2B and the code demodulator 4B can determine appropriate operation modes of the code modulator 2B and the code demodulator 4B in synchronization with the phase of the generated current, and surely synchronize with each other.

Eighth Embodiment

Figure 30:
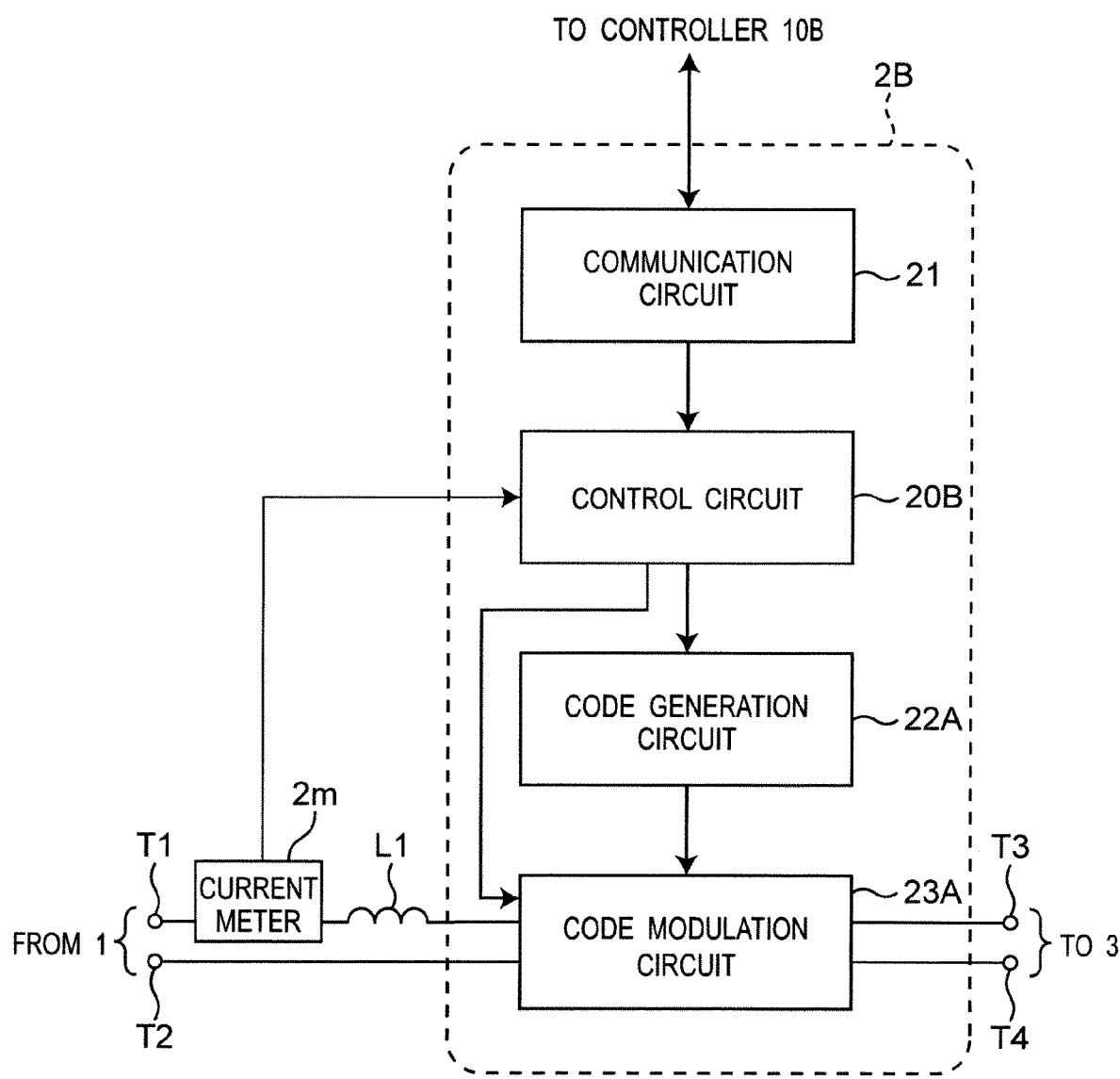
FIG. 30 is a block diagram showing a configuration of a code modulator 2B of a power transmission system according to an eighth embodiment.

FIG. 30 is a block diagram showing a configuration of a code modulator 2B of a power transmission system according to an eighth embodiment. A code modulator 2B (or code modulator 2 or 2A of the first to third embodiments) may be connected to a power generator 1 via a reactor L1. By providing the reactor L1, switching noise occurring in the code modulation circuit 23A is less likely to arrive at the power generator 1. Accordingly, it is possible to improve quality and safety of power transmission.

When the code modulator 2B is connected to the power generator 1 via the reactor L1, a current meter 2m is connected between the reactor and the power generator 1. Accordingly, the current meter 2m can accurately detect variations of direction of a generated current.

OTHER EMBODIMENTS

In the third to eighth embodiments, a plurality of code modulators may use the same code sequence, and a plurality of code demodulators may use the same code sequence. Thus, one code modulator may transmit powers to a plurality of code demodulators, a plurality of code modulators may transmit powers to one code demodulator, and a plurality of code modulators may transmit powers to a plurality of code demodulators.

In the first to eighth embodiments, we have indicated the example in which power is transmitted using code modulation and code demodulation of current, but the power transmission is not limited thereto. Power may be transmitted using code modulation and code demodulation of direct-current or alternating-current voltage. In this case, similar advantageous effects can be achieved.

In the fourth to eighth embodiments, we have described measurement of a current value of a generated current using the current meter 2m. Alternatively, a voltage value associated with source power may be measured to generate waveform information indicating variations of direction of voltage over time.

A power transmitter apparatus, a power receiver apparatus, and a power transmission system according to several aspects of the present disclosure have following configurations.

According to a power transmitter apparatus of a first aspect, a power transmitter apparatus transmits power to at least one power receiver apparatus via a transmission path. The power transmitter apparatus is provided with: a measuring device that measures a current value or voltage value associated with input power inputted to the power transmitter apparatus; a code modulation circuit that modulates the input power to generate a code-modulated wave by code modulation using a modulation code based on a code sequence, and transmits the code-modulated wave to the power receiver apparatus via the transmission path; and a control circuit that controls the code modulation circuit. The code modulation circuit has operation modes different from each other depending on a direction of the input power, and a direction of the code-modulated wave to be generated. The control circuit generates waveform information indicating variations of direction of the input power over time, based on the current value or voltage value measured by the measuring device, and determines the operation mode of the code modulation circuit based on the waveform information.

According to a power transmitter apparatus of a second aspect, in the power transmitter apparatus of the first aspect, the control circuit generates the waveform information indicating the variations of the direction of the input power over time, by detecting moments at which the direction of the current value or voltage value measured by the measuring device changes.

According to a power transmitter apparatus of a third aspect, in the power transmitter apparatus of the first aspect, the control circuit generates the waveform information indicating the variations of the direction of the input power over time, by predicting moments at which the direction of the input power changes, based on the current value or voltage value measured by the measuring device.

According to a power transmitter apparatus of a fourth aspect, in the power transmitter apparatus of one of the first to third aspects, the power transmitter apparatus is connected to a power supply for the input power, via a reactor. The measuring device is connected between the reactor and the power supply.

According to a power transmitter apparatus of a fifth aspect, a power transmitter apparatus transmits power to at least one power receiver apparatus via a transmission path. The power transmitter apparatus is provided with: a communication circuit that receives waveform information indicating variations of direction of input power over time, the input power being inputted to the power transmitter apparatus; a code modulation circuit that modulates the input power to generate a code-modulated wave by code modulation using a modulation code based on a code sequence, and transmits the code-modulated wave to the at least one power receiver apparatus via the transmission path; and a control circuit that controls the code modulation circuit. The code modulation circuit has operation modes different from each other depending on a direction of the input power, and a direction of the code-modulated wave to be generated. The control circuit determines the operation mode of the code modulation circuit based on the waveform information.

According to a power transmitter apparatus of a sixth aspect, in the power transmitter apparatus of one of the first to fifth aspects, the control circuit compensates for a delay occurring due to transmission of the waveform information.

According to a power receiver apparatus of a seventh aspect, a power receiver apparatus receives a code-modulated wave from at least one power transmitter apparatus via a transmission path, the code-modulated wave including power modulated by code modulation using a modulation code based on a code sequence. The power receiver apparatus is provided with: a communication circuit that receives a current value or voltage value associated with input power inputted to the power transmitter apparatus; a code demodulation circuit that demodulates the received code-modulated wave to generate output power by code demodulation using a demodulation code based on a code sequence identical to the code sequence of the modulation code used for the code modulation, and supplies the demodulated power to the load; and a control circuit that controls the code demodulation circuit. The code demodulation circuit has operation modes different from each other depending on a direction of the code-modulated wave, and a direction of the output power to be generated. The control circuit generates waveform information indicating variations of direction of the input power over time, based on the current value or voltage value received by the communication circuit, and determines the operation mode of the code demodulation circuit based on the waveform information.

According to a power receiver apparatus of an eighth aspect, in the power receiver apparatus of the seventh aspect, the control circuit generates the waveform information indicating the variations of the direction of the input power over time, by detecting moments at which the direction of the current value or voltage value received by the communication circuit changes.

According to a power receiver apparatus of a ninth aspect, in the power receiver apparatus of the seventh aspect, the control circuit generates the waveform information indicating the variations of the direction of the input power over time, by predicting moments at which the direction of the input power changes, based on the current value or voltage value received by the communication circuit.

According to a power receiver apparatus of a 10th aspect, a power receiver apparatus receives a code-modulated wave from at least one power transmitter apparatus via a transmission path, the code-modulated wave including power modulated by code modulation using a modulation code based on a code sequence. The power receiver apparatus is provided with: a communication circuit that receives waveform information indicating variations of direction of input power over time, the input power being inputted to the power transmitter apparatus; a code demodulation circuit that demodulates the received code-modulated wave to generate output power by code demodulation using a demodulation code based on a code sequence identical to the code sequence of the modulation code used for the code modulation, and supplies the demodulated power to the load; and a control circuit that controls the code demodulation circuit. The code demodulation circuit has operation modes different from each other depending on a direction of the code-modulated wave, and a direction of the output power to be generated. The control circuit determines the operation mode of the code demodulation circuit based on the waveform information.

According to a power receiver apparatus of a 11th aspect, in the power receiver apparatus of one of the seventh to 10th aspects, the control circuit compensates for a delay occurring due to transmission of the waveform information.

According to a controller of a 12th aspect, a controller is provided for a power transmission system, the power transmission system including a power transmitter apparatus of the fifth aspect, and a power receiver apparatus of the 10th aspect. The controller is provided with: a communication circuit that receives a current value or voltage value associated with input power inputted to the power transmitter apparatus; and a control circuit. The control circuit of the controller generates waveform information indicating variations of direction of the input power over time, based on the current value or voltage value received by the communication circuit of the controller, and transmits the waveform information to the power transmitter apparatus and the power receiver apparatus via the communication circuit.

According to a controller of a 13th aspect, in the controller of the 12th aspect, the control circuit generates the waveform information indicating the variations of the direction of the input power over time, by detecting moments at which the direction of the current value or voltage value received by the communication circuit changes.

According to a controller of a 14th aspect, in the controller of the 12th aspect, the control circuit generates the waveform information indicating the variations of the direction of the input power over time, by predicting moments at which the direction of the input power changes, based on the current value or voltage value received by the communication circuit.

According to a power transmission system of a 15th aspect, a power transmission system includes: a power transmitter apparatus of one of the first to fourth aspects; and a power receiver apparatus of the 10th aspect.

According to a power transmission system of a 16th aspect, a power transmission system includes: a power transmitter apparatus of the fifth aspect; a power receiver apparatus of the 10th aspect; and a controller of one of the 12th to 14th aspects.

According to a power transmission system of a 17th aspect, a power transmission system includes: a power transmitter apparatus of one of the first to fourth aspects; and a power receiver apparatus of one of the seventh to ninth aspects.

INDUSTRIAL APPLICABILITY

A power transmission system according to the present disclosure is suitable for power transmission from a power generator, such as solar power generation, wind power generation, and hydroelectric power generation, to a load, such as a railway and an electric vehicle (EV).

A power transmission system according to the present disclosure can achieve efficient and reliable power transmission in an environment including a combination of direct-current power supplies, such as rechargeable batteries, solar power generation, fuel cells, etc., and/or alternating-current power supplies, such as commercial power, regenerative power of a motor, etc.

REFERENCE SIGNS LIST 1, 1-1 to 1-2: POWER GENERATOR
1m, 1m-1, 1m-2: POWER METER
2, 2A, 2A-1 to 2A-2, 2B: CODE MODULATOR
3: TRANSMISSION PATH
4, 4A, 4A-1 to 4A-2, 4B: CODE DEMODULATOR
5, 5-1 to 5-2: LOAD
5m, 5m-1 to 5m-2: POWER METER
10, 10A to 10B: CONTROLLER
11, 11B: CONTROL CIRCUIT
12, 12A: COMMUNICATION CIRCUIT
20, 20B: CONTROL CIRCUIT
21: COMMUNICATION CIRCUIT
22, 22A: CODE GENERATION CIRCUIT
23, 23A: CODE MODULATION CIRCUIT
30, 30B: CONTROL CIRCUIT
31: COMMUNICATION CIRCUIT
32, 32A: CODE GENERATION CIRCUIT
33, 33A: CODE DEMODULATION CIRCUIT
D1 to D34: DIODE
S1 to S74: SWITCH ELEMENT
SS1 to SS34, SS21A to SS34A: SWITCH CIRCUIT
T1 to T14: PORT

The invention claimed is:

1. A power transmitter apparatus for transmitting power to at least one power receiver apparatus via a transmission path, the power transmitter apparatus comprising:

a measuring device that measures a current value or voltage value associated with input power inputted to the power transmitter apparatus;

a code modulation circuit that modulates the input power to generate a code-modulated wave by code modulation using a modulation code based on a code sequence, and transmits the code-modulated wave to the power receiver apparatus via the transmission path; and a control circuit that controls the code modulation circuit, wherein the code modulation circuit has operation modes different from each other depending on a direction of the input power, and a direction of the code-modulated wave to be generated, and wherein the control circuit generates waveform information indicating variations of direction of the input power over time, based on the current value or voltage value measured by the measuring device, and determines the operation mode of the code modulation circuit based on the waveform information.

2. The power transmitter apparatus as claimed in claim 1, wherein the control circuit generates the waveform information indicating the variations of the direction of the input power over time, by detecting moments at which the direction of the current value or voltage value measured by the measuring device changes.

3. The power transmitter apparatus as claimed in claim 1, wherein the control circuit generates the waveform information indicating the variations of the direction of the input power over time, by predicting moments at which the direction of the input power changes, based on the current value or voltage value measured by the measuring device.

4. The power transmitter apparatus as claimed in claim 1, wherein the power transmitter apparatus is connected to a power supply for the input power, via a reactor, and wherein the measuring device is connected between the reactor and the power supply.

5. A power transmitter apparatus for transmitting power to at least one power receiver apparatus via a transmission path, the power transmitter apparatus comprising:

a communication circuit that receives waveform information indicating variations of direction of input power over time, the input power being inputted to the power transmitter apparatus;

a code modulation circuit that modulates the input power to generate a code-modulated wave by code modulation using a modulation code based on a code sequence, and transmits the code-modulated wave to the at least one power receiver apparatus via the transmission path; and a control circuit that controls the code modulation circuit, wherein the code modulation circuit has operation modes different from each other depending on a direction of the input power, and a direction of the code-modulated wave to be generated, and wherein the control circuit determines the operation mode of the code modulation circuit based on the waveform information.

6. The power transmitter apparatus as claimed in claim 1, wherein the control circuit compensates for a delay occurring due to transmission of the waveform information.

7. A power receiver apparatus for receiving a code-modulated wave from at least one power transmitter apparatus via a transmission path, the code-modulated wave including power modulated by code modulation using a modulation code based on a code sequence, the power receiver apparatus comprising:

a communication circuit that receives a current value or voltage value associated with input power inputted to the power transmitter apparatus;

a code demodulation circuit that demodulates the received code-modulated wave to generate output power by code demodulation using a demodulation code based on a code sequence identical to the code sequence of the modulation code used for the code modulation, and supplies the demodulated power to the load; and a control circuit that controls the code demodulation circuit, wherein the code demodulation circuit has operation modes different from each other depending on a direction of the code-modulated wave, and a direction of the output power to be generated, and wherein the control circuit generates waveform information indicating variations of direction of the input power over time, based on the current value or voltage value received by the communication circuit, and determines the operation mode of the code demodulation circuit based on the waveform information.

8. The power receiver apparatus as claimed in claim 7, wherein the control circuit generates the waveform information indicating the variations of the direction of the input power over time, by detecting moments at which the direction of the current value or voltage value received by the communication circuit changes.

9. The power receiver apparatus as claimed in claim 7, wherein the control circuit generates the waveform information indicating the variations of the direction of the input power over time, by predicting moments at which the direction of the input power changes, based on the current value or voltage value received by the communication circuit.

10. A power receiver apparatus for receiving a code-modulated wave from at least one power transmitter apparatus via a transmission path, the code-modulated wave including power modulated by code modulation using a modulation code based on a code sequence, the power receiver apparatus comprising:

a communication circuit that receives waveform information indicating variations of direction of input power over time, the input power being inputted to the power transmitter apparatus;

a code demodulation circuit that demodulates the received code-modulated wave to generate output power by code demodulation using a demodulation code based on a code sequence identical to the code sequence of the modulation code used for the code modulation, and supplies the demodulated power to the load; and a control circuit that controls the code demodulation circuit, wherein the code demodulation circuit has operation modes different from each other depending on a direction of the code-modulated wave, and a direction of the output power to be generated, and wherein the control circuit determines the operation mode of the code demodulation circuit based on the waveform information.

11. The power receiver apparatus as claimed in claim 7, wherein the control circuit compensates for a delay occurring due to transmission of the waveform information.

12. A controller for a power transmission system, the power transmission system including a power transmitter apparatus, and a power receiver apparatus, wherein the power transmitter apparatus comprises:

a first communication circuit that receives waveform information indicating variations of direction of input power over time, the input power being inputted to the power transmitter apparatus;

a code modulation circuit that modulates the input power to generate a code-modulated wave by code modulation using a modulation code based on a code sequence, and transmits the code-modulated wave to the at least one power receiver apparatus via a transmission path; and a first control circuit that controls the code modulation circuit, wherein the code modulation circuit has operation modes different from each other depending on a direction of the input power, and a direction of the code-modulated wave to be generated, wherein the first control circuit determines the operation mode of the code modulation circuit based on the waveform information, wherein the power receiver apparatus comprises:

a second communication circuit that receives the waveform information;

a code demodulation circuit that demodulates the received code-modulated wave to generate output power by code demodulation using a demodulation code based on a code sequence identical to the code sequence of the modulation code used for the code modulation, and supplies the demodulated power to a load; and a second control circuit that controls the code demodulation circuit, wherein the code demodulation circuit has operation modes different from each other depending on a direction of the code-modulated wave, and a direction of the output power to be generated, wherein the second control circuit determines the operation mode of the code demodulation circuit based on the waveform information, wherein the controller comprises:

a third communication circuit that receives a current value or voltage value associated with input power inputted to the power transmitter apparatus; and a third control circuit, wherein the third control circuit of the controller generates the waveform information based on the current value or voltage value received by the third communication circuit of the controller, and transmits the waveform information to the power transmitter apparatus and the power receiver apparatus via the third communication circuit.

13. The controller as claimed in claim 12, wherein the third control circuit generates the waveform information indicating the variations of the direction of the input power over time, by detecting moments at which the direction of the current value or voltage value received by the third communication circuit changes.

14. The controller as claimed in claim 12, wherein the third control circuit generates the waveform information indicating the variations of the direction of the input power over time, by predicting moments at which the direction of the input power changes, based on the current value or voltage value received by the third communication circuit.

15. A power transmission system including: a power transmitter apparatus and a power receiver apparatus, wherein the power transmitter apparatus comprises:

a measuring device that measures a current value or voltage value associated with input power inputted to the power transmitter apparatus;

a code modulation circuit that modulates the input power to generate a code-modulated wave by code modulation using a modulation code based on a code sequence, and transmits the code-modulated wave to the power receiver apparatus via a transmission path; and a first control circuit that controls the code modulation circuit, wherein the code modulation circuit has operation modes different from each other depending on a direction of the input power, and a direction of the code-modulated wave to be generated, wherein the first control circuit generates waveform information indicating variations of direction of the input power over time, based on the current value or voltage value measured by the measuring device, and determines the operation mode of the code modulation circuit based on the waveform information, wherein the power receiver apparatus comprises:

a communication circuit that receives the waveform information;

a code demodulation circuit that demodulates the received code-modulated wave to generate output power by code demodulation using a demodulation code based on a code sequence identical to the code sequence of the modulation code used for the code modulation, and supplies the demodulated power to the load; and a second control circuit that controls the code demodulation circuit, wherein the code demodulation circuit has operation modes different from each other depending on a direction of the code-modulated wave, and a direction of the output power to be generated, and wherein the second control circuit determines the operation mode of the code demodulation circuit based on the waveform information.

16. A power transmission system including: a power transmitter apparatus; a power receiver apparatus; and a controller, wherein the power transmitter apparatus comprises:

a first communication circuit that receives waveform information indicating variations of direction of input power over time, the input power being inputted to the power transmitter apparatus;

a code modulation circuit that modulates the input power to generate a code-modulated wave by code modulation using a modulation code based on a code sequence, and transmits the code-modulated wave to the at least one power receiver apparatus via a transmission path; and a first control circuit that controls the code modulation circuit, wherein the code modulation circuit has operation modes different from each other depending on a direction of the input power, and a direction of the code-modulated wave to be generated, wherein the first control circuit determines the operation mode of the code modulation circuit based on the waveform information, wherein the power receiver apparatus comprises:

a second communication circuit that receives the waveform information;

a code demodulation circuit that demodulates the received code-modulated wave to generate output power by code demodulation using a demodulation code based on a code sequence identical to the code sequence of the modulation code used for the code modulation, and supplies the demodulated power to a load; and a second control circuit that controls the code demodulation circuit, wherein the code demodulation circuit has operation modes different from each other depending on a direction of the code-modulated wave, and a direction of the output power to be generated, wherein the second control circuit determines the operation mode of the code demodulation circuit based on the waveform information, wherein the controller comprises:

a third communication circuit that receives a current value or voltage value associated with input power inputted to the power transmitter apparatus; and a third control circuit, wherein the third control circuit of the controller generates the waveform information based on the current value or voltage value received by the third communication circuit of the controller, and transmits the waveform information to the power transmitter apparatus and the power receiver apparatus via the third communication circuit.

17. A power transmission system including: a power transmitter apparatus and a power receiver apparatus wherein the power transmitter apparatus comprises:

a measuring device that measures a current value or voltage value associated with input power inputted to the power transmitter apparatus;

a code modulation circuit that modulates the input power to generate a code-modulated wave by code modulation using a modulation code based on a code sequence, and transmits the code-modulated wave to the power receiver apparatus via a transmission path; and a first control circuit that controls the code modulation circuit, wherein the code modulation circuit has operation modes different from each other depending on a direction of the input power, and a direction of the code-modulated wave to be generated, wherein the first control circuit generates waveform information indicating variations of direction of the input power over time, based on the current value or voltage value measured by the measuring device, and determines the operation mode of the code modulation circuit based on the waveform information, wherein the power receiver apparatus comprises:

a communication circuit that receives the current value or voltage value associated with the input power inputted to the power transmitter apparatus;

a code demodulation circuit that demodulates the received code-modulated wave to generate output power by code demodulation using a demodulation code based on a code sequence identical to the code sequence of the modulation code used for the code modulation, and supplies the demodulated power to the load; and a second control circuit that controls the code demodulation circuit, wherein the code demodulation circuit has operation modes different from each other depending on a direction of the code-modulated wave, and a direction of the output power to be generated, and wherein the second control circuit generates the waveform information based on the current value or voltage value received by the communication circuit, and determines the operation mode of the code demodulation circuit based on the waveform information.

* * * * *

UNITED STATES PATENT AND TRADEMARK OFFICE
CERTIFICATE OF CORRECTION

Page 1 of 1

PATENT NO. : 11,018,509 B2
APPLICATION NO. : 16/490491
DATED : May 25, 2021
INVENTOR(S) : Taiki Nishimoto et al.

It is certified that error appears in the above-identified patent and that said Letters Patent is hereby corrected as shown below:

On the Title Page

In the Title and in the Specification, Column 1, Lines 1-6 should read:
POWER TRANSMISSION SYSTEM CAPABLE OF SYNCHRONIZING POWER TRANSMITTER APPARATUS HAVING MULTIPLE OPERATION MODES, WITH
POWER RECEIVER APPARATUS HAVING MULTIPLE OPERATION MODES Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*